(12) United States Patent
Taylor et al.

(10) Patent No.: US 12,346,070 B2
(45) Date of Patent: Jul. 1, 2025

(54) VARIABLE FRICTIONAL FEEDBACK DEVICE FOR A DIGITAL CROWN OF AN ELECTRONIC WATCH

(71) Applicant: Apple Inc., Cupertino, CA (US)

(72) Inventors: Steven J. Taylor, San Jose, CA (US); Brenton A. Baugh, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/391,139

(22) Filed: Dec. 20, 2023

(65) Prior Publication Data

US 2024/0126219 A1 Apr. 18, 2024

Related U.S. Application Data

(63) Continuation of application No. 17/528,046, filed on Nov. 16, 2021, now Pat. No. 11,860,587, which is a
(Continued)

(51) Int. Cl.
*G04G 21/08* (2010.01)
*G06F 3/01* (2006.01)
(Continued)

(52) U.S. Cl.
CPC ............. *G04G 21/08* (2013.01); *G06F 3/016* (2013.01); *G06F 3/0481* (2013.01); *G06F 3/04883* (2013.01); *G01D 5/3473* (2013.01)

(58) Field of Classification Search
None
See application file for complete search history.

(56) References Cited

U.S. PATENT DOCUMENTS

| 2,237,860 A | 4/1941 | Bolle |
| 2,288,215 A | 6/1942 | Taubert et al. |
(Continued)

FOREIGN PATENT DOCUMENTS

| CH | 1888928 | 1/1937 |
| CN | 1302740 | 9/2001 |
(Continued)

OTHER PUBLICATIONS

Author Unknown, "Desirable Android Wear smartwatch from LG," Gulf News, Dubai, 3 pages, Jan. 30, 2015.
(Continued)

*Primary Examiner* — Hua Lu
(74) *Attorney, Agent, or Firm* — Brownstein Hyatt Farber Schreck, LLP

(57) ABSTRACT

An electronic device, such as a watch, has a variable friction mechanism for providing variable frictional feedback as an input mechanism, such as a crown, is rotated. The variable frictional feedback may correspond to operational states, events, or other conditions at the electronic watch. The variable frictional feedback may be provided by changing a frictional force between the crown and the variable friction mechanism. The variable friction mechanism may include a friction element adapted to contact a shaft of the crown and an actuator adapted to change a frictional force between the friction element and the shaft.

20 Claims, 21 Drawing Sheets

Related U.S. Application Data continuation of application No. 16/399,868, filed on Apr. 30, 2019, now Pat. No. 11,194,299.

(60) Provisional application No. 62/804,628, filed on Feb. 12, 2019.

(51) Int. Cl.
*G06F 3/0481* (2022.01)
*G06F 3/04883* (2022.01)
*G01D 5/347* (2006.01)

(56) References Cited

U.S. PATENT DOCUMENTS

| | | | |
|---|---|---|---|
| 2,497,935 A | 2/1950 | Feurer | |
| 2,771,734 A | 11/1956 | Morf | |
| 2,788,236 A | 4/1957 | Kafowi | |
| 2,797,592 A | 7/1957 | Marrapese | |
| 3,040,514 A | 6/1962 | Dinstman | |
| 3,056,030 A | 9/1962 | Kelchner | |
| 3,130,539 A | 4/1964 | Davis | |
| 3,355,873 A | 12/1967 | Morf | |
| 3,362,154 A | 1/1968 | Perret | |
| 3,410,247 A | 11/1968 | Dronberger | |
| 3,495,398 A | 2/1970 | Widmer et al. | |
| 3,577,876 A | 5/1971 | Spadini | |
| 3,621,649 A | 11/1971 | Vulcan et al. | |
| 3,662,618 A | 5/1972 | Kroll et al. | |
| 3,733,803 A | 5/1973 | Hiraga | |
| 3,937,002 A | 2/1976 | Van Haaften | |
| 4,007,347 A | 2/1977 | Haber | |
| 4,031,341 A | 6/1977 | Wuthrich et al. | |
| 4,037,068 A | 7/1977 | Gaynor | |
| 4,051,665 A | 10/1977 | Arn | |
| 4,077,200 A | 3/1978 | Schneider | |
| 4,133,404 A | 1/1979 | Griffin | |
| 4,170,104 A | 10/1979 | Yamagata | |
| 4,258,096 A | 3/1981 | LaMarche | |
| 4,274,152 A | 6/1981 | Ikegami | |
| 4,287,400 A | 9/1981 | Kitik | |
| 4,289,400 A | 9/1981 | Kubola et al. | |
| 4,311,026 A | 1/1982 | Ochoa | |
| 4,311,990 A | 1/1982 | Burke | |
| 4,324,956 A | 4/1982 | Sakakino et al. | |
| 4,345,119 A | 8/1982 | Latasiewicz | |
| 4,364,674 A | 12/1982 | Tesch | |
| 4,379,642 A | 4/1983 | Meyrat | |
| 4,395,134 A | 7/1983 | Luce | |
| 4,396,298 A | 8/1983 | Ripley | |
| 4,417,824 A | 11/1983 | Paterson et al. | |
| 4,448,199 A | 5/1984 | Schmid | |
| 4,520,306 A | 5/1985 | Kirby | |
| 4,581,509 A | 4/1986 | Sanford et al. | |
| 4,600,316 A | 7/1986 | Besson | |
| 4,617,461 A | 10/1986 | Subbarao et al. | |
| 4,634,861 A | 1/1987 | Ching et al. | |
| 4,641,026 A | 2/1987 | Garcia, Jr. | |
| 4,670,737 A | 6/1987 | Rilling | |
| 4,766,642 A | 8/1988 | Gaffney et al. | |
| 4,783,772 A | 11/1988 | Umemoto et al. | |
| 4,884,073 A | 11/1989 | Souloumiac | |
| 4,914,831 A | 4/1990 | Kanezashi et al. | |
| 4,922,070 A | 5/1990 | Dorkinski | |
| 4,931,794 A | 6/1990 | Haag | |
| 4,952,799 A | 8/1990 | Loewen | |
| 4,980,685 A | 12/1990 | Souloumiac et al. | |
| 4,987,299 A | 1/1991 | Kobayashi et al. | |
| 5,001,687 A | 3/1991 | Brien | |
| 5,034,602 A | 7/1991 | Garcia et al. | |
| 5,177,355 A | 1/1993 | Branan | |
| 5,214,278 A | 5/1993 | Banda | |
| 5,258,592 A | 11/1993 | Nishikawa et al. | |
| 5,288,993 A | 2/1994 | Bidiville et al. | |
| 5,347,123 A | 9/1994 | Jackson et al. | |
| 5,383,166 A | 1/1995 | Gallay | |
| 5,471,054 A | 11/1995 | Watanabe | |
| 5,477,508 A | 12/1995 | Will | |
| 5,509,174 A | 4/1996 | Worrell | |
| 5,559,761 A | 9/1996 | Frenkel et al. | |
| 5,572,314 A | 11/1996 | Hyman et al. | |
| 5,583,560 A | 12/1996 | Florin et al. | |
| 5,631,881 A | 5/1997 | Pessey et al. | |
| 5,726,645 A | 3/1998 | Kamon et al. | |
| 5,738,104 A | 4/1998 | Lo | |
| 5,748,111 A | 5/1998 | Bates | |
| 5,825,353 A | 10/1998 | Will | |
| 5,841,050 A | 11/1998 | Clift et al. | |
| 5,847,335 A | 12/1998 | Sugahara et al. | |
| 5,867,082 A | 2/1999 | Van Zeeland | |
| 5,943,233 A | 8/1999 | Ebina | |
| 5,953,001 A | 9/1999 | Challener et al. | |
| 5,960,366 A | 9/1999 | Duwaer et al. | |
| 5,963,332 A | 10/1999 | Feldman et al. | |
| 5,999,168 A * | 12/1999 | Rosenberg | G06F 3/016 |
| | | | 345/161 |
| 6,069,567 A | 5/2000 | Zawilski | |
| 6,128,006 A | 10/2000 | Rosenberg et al. | |
| 6,134,189 A | 10/2000 | Carrard | |
| 6,154,201 A | 11/2000 | Levin et al. | |
| 6,175,679 B1 | 1/2001 | Veligdan et al. | |
| 6,203,190 B1 | 3/2001 | Stotz | |
| 6,241,684 B1 | 6/2001 | Amano | |
| 6,246,050 B1 | 6/2001 | Tullis et al. | |
| 6,252,825 B1 | 6/2001 | Perotto | |
| 6,304,247 B1 | 10/2001 | Black | |
| 6,355,891 B1 | 3/2002 | Ikunami | |
| 6,361,502 B1 | 3/2002 | Puolakanaho et al. | |
| 6,377,239 B1 | 4/2002 | Isikawa | |
| 6,392,640 B1 | 5/2002 | Will | |
| 6,396,006 B1 | 5/2002 | Yokoji et al. | |
| 6,422,740 B1 | 7/2002 | Leuenberger | |
| 6,477,117 B1 | 11/2002 | Narayanaswami et al. | |
| 6,502,982 B1 | 1/2003 | Bach et al. | |
| 6,525,278 B2 | 2/2003 | Villain et al. | |
| 6,556,222 B1 | 4/2003 | Narayanaswami | |
| 6,575,618 B1 | 6/2003 | Inoue et al. | |
| 6,587,400 B1 | 7/2003 | Line | |
| 6,636,197 B1 | 10/2003 | Goldenberg et al. | |
| 6,646,635 B2 | 11/2003 | Pogatetz et al. | |
| 6,661,438 B1 | 11/2003 | Shiraishi et al. | |
| 6,672,758 B2 | 1/2004 | Ehrsam et al. | |
| 6,794,992 B1 | 9/2004 | Rogers | |
| 6,809,275 B1 | 10/2004 | Cheng et al. | |
| 6,834,430 B2 | 12/2004 | Worrell | |
| 6,846,998 B2 | 1/2005 | Hasumi et al. | |
| 6,882,596 B2 | 4/2005 | Guanter | |
| 6,888,076 B2 | 5/2005 | Hetherington | |
| 6,896,403 B1 | 5/2005 | Gau | |
| 6,909,378 B1 | 6/2005 | Lambrechts et al. | |
| 6,914,551 B2 | 7/2005 | Vidal | |
| 6,950,695 B2 | 9/2005 | Chen | |
| 6,961,099 B2 | 11/2005 | Takano et al. | |
| 6,963,039 B1 | 11/2005 | Weng et al. | |
| 6,967,903 B2 | 11/2005 | Guanter | |
| 6,977,868 B2 | 12/2005 | Brewer et al. | |
| 6,982,930 B1 | 1/2006 | Hung | |
| 6,985,107 B2 | 1/2006 | Anson | |
| 6,987,568 B2 | 1/2006 | Dana | |
| 6,998,553 B2 | 2/2006 | Hisamune et al. | |
| 7,009,915 B2 | 3/2006 | Brewer et al. | |
| 7,016,263 B2 | 3/2006 | Gueissaz et al. | |
| 7,021,442 B2 | 4/2006 | Borgerson | |
| 7,031,228 B2 | 4/2006 | Born et al. | |
| 7,034,237 B2 | 4/2006 | Ferri et al. | |
| 7,081,905 B1 | 7/2006 | Raghunath et al. | |
| 7,102,626 B2 | 9/2006 | Denny, III | |
| 7,106,307 B2 | 9/2006 | Cok | |
| 7,111,365 B1 | 9/2006 | Howie, Jr. | |
| 7,113,450 B2 * | 9/2006 | Plancon | G04B 47/008 |
| | | | 368/80 |
| 7,119,289 B2 | 10/2006 | Lacroix | |
| 7,135,673 B2 | 11/2006 | Saint Clair | |
| 7,167,083 B2 | 1/2007 | Giles | |
| 7,187,359 B2 | 3/2007 | Numata | |

(56) References Cited

U.S. PATENT DOCUMENTS

| | | |
|---|---|---|
| 7,244,927 B2 | 7/2007 | Huynh |
| 7,255,473 B2 | 8/2007 | Hiranuma et al. |
| 7,265,336 B2 | 9/2007 | Hataguchi et al. |
| 7,274,303 B2 | 9/2007 | Dresti et al. |
| 7,285,738 B2 | 10/2007 | Lavigne et al. |
| 7,286,063 B2 | 10/2007 | Gauthey |
| 7,292,741 B2 | 11/2007 | Ishiyama et al. |
| 7,358,481 B2 | 4/2008 | Yeoh et al. |
| 7,369,308 B2 | 5/2008 | Tsuruta et al. |
| 7,371,745 B2 | 5/2008 | Ebright et al. |
| 7,385,874 B2 | 6/2008 | Vuilleumier |
| 7,404,667 B2 | 7/2008 | Born et al. |
| 7,465,917 B2 | 12/2008 | Chin et al. |
| 7,468,036 B1 | 12/2008 | Rulkov et al. |
| 7,474,592 B2 | 1/2009 | Lyon |
| 7,506,269 B2 | 3/2009 | Lang et al. |
| 7,520,664 B2 | 4/2009 | Wai |
| 7,528,824 B2 | 5/2009 | Kong |
| 7,545,367 B2 | 6/2009 | Sunda et al. |
| 7,591,582 B2 | 9/2009 | Hiranuma et al. |
| 7,593,755 B2 | 9/2009 | Colando et al. |
| 7,605,846 B2 | 10/2009 | Watanabe |
| 7,634,263 B2 | 12/2009 | Louch et al. |
| 7,646,677 B2 | 1/2010 | Nakamura |
| 7,655,874 B2 | 2/2010 | Akieda |
| 7,682,070 B2 | 3/2010 | Burton |
| 7,708,457 B2 | 5/2010 | Girardin |
| 7,710,456 B2 | 5/2010 | Koshiba et al. |
| 7,732,724 B2 | 6/2010 | Otani et al. |
| 7,761,246 B2 | 7/2010 | Matsui |
| 7,763,819 B2 | 7/2010 | Ieda et al. |
| 7,772,507 B2 | 8/2010 | Orr |
| 7,778,115 B2 | 8/2010 | Ruchonnet |
| 7,781,726 B2 | 8/2010 | Matsui et al. |
| RE41,637 E | 9/2010 | O'Hara et al. |
| 7,791,587 B2 | 9/2010 | Kosugi |
| 7,791,588 B2 | 9/2010 | Tierling et al. |
| 7,791,597 B2 | 9/2010 | Silverstein et al. |
| 7,822,469 B2 | 10/2010 | Lo |
| 7,856,255 B2 | 12/2010 | Tsuchiya et al. |
| 7,858,583 B2 | 12/2010 | Schmidt et al. |
| 7,865,324 B2 | 1/2011 | Lindberg |
| 7,894,957 B2 | 2/2011 | Carlson |
| 7,946,758 B2 | 5/2011 | Mooring |
| 8,063,892 B2 | 11/2011 | Shahoian et al. |
| 8,138,488 B2 | 3/2012 | Grot |
| 8,143,981 B2 | 3/2012 | Washizu et al. |
| 8,167,126 B2 | 5/2012 | Stiehl |
| 8,169,402 B2 | 5/2012 | Shahoian et al. |
| 8,188,989 B2 | 5/2012 | Levin et al. |
| 8,195,313 B1 | 6/2012 | Fadell et al. |
| 8,220,987 B2 | 7/2012 | Kimura et al. |
| 8,229,535 B2 | 7/2012 | Mensinger et al. |
| 8,248,815 B2 | 8/2012 | Yang et al. |
| 8,263,886 B2 | 9/2012 | Lin et al. |
| 8,263,889 B2 | 9/2012 | Takahashi et al. |
| 8,275,327 B2 | 9/2012 | Yi et al. |
| 8,294,670 B2 | 10/2012 | Griffin et al. |
| 8,312,495 B2 | 11/2012 | Vanderhoff |
| 8,318,340 B2 | 11/2012 | Stimits |
| 8,368,677 B2 | 2/2013 | Yamamoto |
| 8,371,745 B2 | 2/2013 | Manni |
| 8,373,661 B2 | 2/2013 | Lan et al. |
| 8,405,618 B2 | 3/2013 | Colgate |
| 8,410,971 B2 | 4/2013 | Friedlander |
| 8,432,368 B2 | 4/2013 | Momeyer et al. |
| 8,439,559 B2 | 5/2013 | Luk et al. |
| 8,441,450 B2 | 5/2013 | Degner et al. |
| 8,446,713 B2 | 5/2013 | Lai |
| 8,456,430 B2 | 6/2013 | Oliver et al. |
| 8,477,118 B2 | 7/2013 | Lan et al. |
| 8,493,190 B2 | 7/2013 | Periquet et al. |
| 8,508,511 B2 | 8/2013 | Tanaka et al. |
| 8,525,777 B2 | 9/2013 | Stavely et al. |
| 8,562,489 B2 | 10/2013 | Burton et al. |
| 8,568,313 B2 | 10/2013 | Sadhu |
| 8,576,044 B2 | 11/2013 | Chapman |
| 8,593,598 B2 | 11/2013 | Chen et al. |
| 8,607,662 B2 | 12/2013 | Huang |
| 8,614,881 B2 | 12/2013 | Yoo |
| 8,624,836 B1 | 1/2014 | Miller et al. |
| 8,666,682 B2 | 3/2014 | LaVigne et al. |
| 8,677,285 B2 | 3/2014 | Tsern et al. |
| 8,704,787 B2 | 4/2014 | Yamamoto |
| 8,711,093 B2 | 4/2014 | Ong et al. |
| 8,717,151 B2 | 5/2014 | Forutanpour et al. |
| 8,724,087 B2 | 5/2014 | Van De Kerkhof et al. |
| 8,730,167 B2 | 5/2014 | Ming et al. |
| 8,743,088 B2 | 6/2014 | Watanabe |
| 8,783,944 B2 | 7/2014 | Doi |
| 8,797,153 B2 | 8/2014 | Vanhelle et al. |
| 8,804,993 B2 | 8/2014 | Shukla et al. |
| 8,810,514 B2 | 8/2014 | Zhao et al. |
| 8,816,962 B2 | 8/2014 | Obermeyer et al. |
| 8,824,245 B2 | 9/2014 | Lau et al. |
| 8,847,741 B2 | 9/2014 | Birnbaum et al. |
| 8,851,372 B2 | 10/2014 | Zhou |
| 8,859,971 B2 | 10/2014 | Weber |
| 8,860,674 B2 | 10/2014 | Lee et al. |
| 8,863,219 B2 | 10/2014 | Brown et al. |
| D717,679 S | 11/2014 | Anderssen |
| 8,878,657 B2 | 11/2014 | Periquet et al. |
| 8,885,856 B2 | 11/2014 | Sacha |
| 8,895,911 B2 | 11/2014 | Takahashi |
| 8,905,631 B2 | 12/2014 | Sakurazawa et al. |
| 8,908,477 B2 | 12/2014 | Peters |
| 8,920,022 B2 | 12/2014 | Ishida et al. |
| 8,922,399 B2 | 12/2014 | Bajaj et al. |
| 8,928,452 B2 | 1/2015 | Kim et al. |
| 8,948,832 B2 | 2/2015 | Hong et al. |
| 8,954,135 B2 | 2/2015 | Yuen et al. |
| 8,975,543 B2 | 3/2015 | Hakemeyer |
| 8,994,827 B2 | 3/2015 | Mistry et al. |
| 9,001,625 B2 | 4/2015 | Essery et al. |
| 9,024,733 B2 | 5/2015 | Wouters |
| 9,028,134 B2 | 5/2015 | Koshoji et al. |
| 9,030,446 B2 | 5/2015 | Mistry et al. |
| 9,034,666 B2 | 5/2015 | Vaganov et al. |
| 9,039,614 B2 | 5/2015 | Yuen et al. |
| 9,041,663 B2 | 5/2015 | Westerman |
| 9,042,971 B2 | 5/2015 | Brumback et al. |
| 9,049,998 B2 | 6/2015 | Brumback et al. |
| 9,052,696 B2 | 6/2015 | Breuillot et al. |
| 9,086,717 B2 | 7/2015 | Meerovitsch |
| 9,086,738 B2 | 7/2015 | Leung et al. |
| 9,091,309 B2 | 7/2015 | Battlogg |
| 9,100,493 B1 | 8/2015 | Zhou |
| 9,101,184 B2 | 8/2015 | Wilson |
| 9,105,413 B2 | 8/2015 | Hiranuma et al. |
| 9,123,483 B2 | 9/2015 | Ferri et al. |
| 9,134,807 B2 | 9/2015 | Shaw et al. |
| 9,141,087 B2 | 9/2015 | Brown et al. |
| 9,176,577 B2 | 11/2015 | Jangaard et al. |
| 9,176,598 B2 | 11/2015 | Sweetser et al. |
| 9,202,372 B2 | 12/2015 | Reams et al. |
| 9,213,409 B2 | 12/2015 | Redelsheimer et al. |
| 9,223,296 B2 | 12/2015 | Yang et al. |
| 9,241,635 B2 | 1/2016 | Yuen et al. |
| 9,244,438 B2 | 1/2016 | Hoover et al. |
| 9,256,209 B2 | 2/2016 | Yang et al. |
| 9,277,156 B2 | 3/2016 | Bennett et al. |
| 9,348,322 B2 | 5/2016 | Fraser et al. |
| 9,350,850 B2 | 5/2016 | Pope et al. |
| 9,367,146 B2 | 6/2016 | Piot |
| 9,386,932 B2 | 7/2016 | Chatterjee et al. |
| 9,426,275 B2 | 8/2016 | Eim et al. |
| 9,430,042 B2 | 8/2016 | Levin |
| 9,437,357 B2 | 9/2016 | Furuki et al. |
| 9,449,770 B2 | 9/2016 | Sanford et al. |
| 9,501,044 B2 | 11/2016 | Jackson et al. |
| 9,520,100 B2 | 12/2016 | Houjou et al. |
| 9,532,723 B2 | 1/2017 | Kim |
| 9,542,016 B2 | 1/2017 | Armstrong-Muntner |
| 9,545,541 B2 | 1/2017 | Aragones et al. |

(56) References Cited

U.S. PATENT DOCUMENTS

| | | | |
|---|---|---|---|
| 9,552,023 B2 | 1/2017 | Joo et al. | |
| 9,599,964 B2 | 3/2017 | Gracia | |
| 9,600,071 B2 | 3/2017 | Rothkopf | |
| 9,607,505 B2 | 3/2017 | Rothkopf et al. | |
| 9,620,312 B2* | 4/2017 | Ely | H01H 3/122 |
| 9,627,163 B2 | 4/2017 | Ely | |
| 9,632,318 B2* | 4/2017 | Goto | G02B 27/017 |
| 9,632,537 B2 | 4/2017 | Memering | |
| 9,638,587 B2 | 5/2017 | Marquas et al. | |
| 9,651,922 B2 | 5/2017 | Hysek et al. | |
| 9,659,482 B2 | 5/2017 | Yang et al. | |
| 9,680,831 B2 | 6/2017 | Jooste et al. | |
| 9,709,956 B1 | 7/2017 | Ely et al. | |
| 9,753,436 B2 | 9/2017 | Ely et al. | |
| D800,172 S | 10/2017 | Akana | |
| 9,800,717 B2 | 10/2017 | Ma et al. | |
| 9,836,025 B2 | 12/2017 | Ely et al. | |
| 9,873,711 B2 | 1/2018 | Hoover et al. | |
| 9,874,945 B2 | 1/2018 | Fukumoto | |
| 9,886,006 B2 | 2/2018 | Ely et al. | |
| 9,891,590 B2 | 2/2018 | Shim et al. | |
| 9,891,651 B2 | 2/2018 | Jackson et al. | |
| 9,891,667 B2 | 2/2018 | Jung et al. | |
| 9,898,032 B2 | 2/2018 | Hafez et al. | |
| 9,913,591 B2 | 3/2018 | Lapetina et al. | |
| 9,921,548 B2 | 3/2018 | Mitani | |
| 9,927,902 B2 | 3/2018 | Burr et al. | |
| 9,939,923 B2* | 4/2018 | Sharma | G06F 3/0312 |
| 9,946,297 B2 | 4/2018 | Nazzaro et al. | |
| 9,952,558 B2 | 4/2018 | Ely | |
| 9,952,682 B2 | 4/2018 | Zhang et al. | |
| 9,971,305 B2 | 5/2018 | Ely et al. | |
| 9,971,405 B2 | 5/2018 | Salo et al. | |
| 9,971,407 B2 | 5/2018 | Holenarsipur et al. | |
| 9,979,426 B2 | 5/2018 | Na et al. | |
| 10,001,817 B2 | 6/2018 | Zambetti et al. | |
| 10,012,550 B2 | 7/2018 | Yang | |
| 10,018,966 B2 | 7/2018 | Ely et al. | |
| 10,019,097 B2 | 7/2018 | Ely et al. | |
| 10,037,006 B2 | 7/2018 | Ely | |
| 10,037,081 B2 | 7/2018 | Grant | |
| 10,048,802 B2 | 8/2018 | Shedletsky | |
| 10,057,470 B2 | 8/2018 | Kim et al. | |
| 10,061,399 B2 | 8/2018 | Bushnell et al. | |
| 10,066,970 B2 | 9/2018 | Gowreesunker et al. | |
| 10,092,203 B2 | 10/2018 | Mirov | |
| 10,108,016 B2* | 10/2018 | Bosveld | A41D 20/00 |
| 10,114,342 B2 | 10/2018 | Kim et al. | |
| 10,145,711 B2 | 12/2018 | Boonsom et al. | |
| 10,175,652 B2 | 1/2019 | Ely et al. | |
| 10,190,891 B1 | 1/2019 | Rothkopf et al. | |
| 10,191,455 B2 | 1/2019 | Shim et al. | |
| 10,203,662 B1 | 2/2019 | Lin et al. | |
| 10,209,148 B2 | 2/2019 | Lyon et al. | |
| 10,216,147 B2 | 2/2019 | Ely et al. | |
| 10,222,755 B2 | 3/2019 | Coakley et al. | |
| 10,222,756 B2 | 3/2019 | Ely et al. | |
| 10,222,909 B2 | 3/2019 | Shedletsky et al. | |
| 10,234,828 B2 | 3/2019 | Ely et al. | |
| 10,241,593 B2 | 3/2019 | Chen | |
| 10,274,905 B2 | 4/2019 | Chung | |
| 10,296,125 B2 | 5/2019 | Ely et al. | |
| 10,331,081 B2 | 6/2019 | Ely et al. | |
| 10,331,082 B2 | 6/2019 | Ely et al. | |
| 10,332,111 B2 | 6/2019 | Mokhasi et al. | |
| 10,353,487 B2 | 7/2019 | Chung et al. | |
| 10,379,629 B2 | 8/2019 | Bushnell et al. | |
| 10,386,940 B2 | 8/2019 | Kim | |
| 10,401,961 B2 | 9/2019 | Cruz-Hernandez et al. | |
| 10,429,959 B2 | 10/2019 | Battlogg | |
| 10,474,194 B1 | 11/2019 | Ell et al. | |
| 10,503,258 B2 | 12/2019 | Holenarsipur et al. | |
| 10,509,486 B2 | 12/2019 | Bushnell et al. | |
| 10,524,671 B2 | 1/2020 | Lamego | |
| 10,534,320 B2 | 1/2020 | Ferri | |
| 10,551,798 B1 | 2/2020 | Bushnell et al. | |
| 10,572,053 B2 | 2/2020 | Ely et al. | |
| 10,593,617 B2 | 3/2020 | Ashikaga et al. | |
| 10,599,101 B2 | 3/2020 | Rothkopf et al. | |
| 10,610,157 B2 | 4/2020 | Pandya et al. | |
| 10,613,685 B2 | 4/2020 | Shedletsky | |
| 10,627,781 B2* | 4/2020 | Ichimura | G04B 37/08 |
| 10,627,783 B2 | 4/2020 | Rothkopf et al. | |
| 10,655,988 B2 | 5/2020 | Boonsom et al. | |
| 10,664,074 B2 | 5/2020 | Moussette et al. | |
| 10,732,571 B2 | 8/2020 | Ely et al. | |
| 10,765,019 B2 | 9/2020 | Werner | |
| 10,840,041 B1 | 11/2020 | Harms | |
| 10,845,764 B2 | 11/2020 | Ely et al. | |
| 10,852,700 B2* | 12/2020 | Abramov | G04G 21/04 |
| 10,852,855 B2 | 12/2020 | Niu | |
| 10,871,385 B2 | 12/2020 | Kok | |
| 10,884,549 B2 | 1/2021 | Shedletsky et al. | |
| 10,936,071 B2 | 3/2021 | Pandya et al. | |
| 10,942,491 B2 | 3/2021 | Rothkopf | |
| 10,948,880 B2 | 3/2021 | Ely et al. | |
| 10,955,937 B2 | 3/2021 | Bushnell et al. | |
| 10,962,930 B2 | 3/2021 | Ely et al. | |
| 10,962,935 B1 | 3/2021 | Ely et al. | |
| 10,987,054 B2 | 4/2021 | Pandya et al. | |
| 11,000,193 B2 | 5/2021 | Tal et al. | |
| 11,002,572 B2 | 5/2021 | Boonsom et al. | |
| 11,029,831 B2 | 6/2021 | Block et al. | |
| 11,036,318 B2 | 6/2021 | Bokma et al. | |
| 11,148,292 B2 | 10/2021 | Bryner et al. | |
| 11,181,863 B2 | 11/2021 | Ely et al. | |
| 11,194,298 B2 | 12/2021 | Roach et al. | |
| 11,209,777 B2 | 12/2021 | Minakuchi et al. | |
| 11,221,590 B2 | 1/2022 | Rothkopf et al. | |
| 11,347,189 B1 | 5/2022 | Herrera et al. | |
| 11,350,869 B2 | 6/2022 | Rasmussen et al. | |
| 11,360,440 B2 | 6/2022 | Perkins et al. | |
| 11,385,599 B2 | 7/2022 | Ely et al. | |
| 11,474,483 B2 | 10/2022 | Rothkopf | |
| 11,531,306 B2 | 12/2022 | Ely et al. | |
| 11,537,082 B2 | 12/2022 | Ferri et al. | |
| 11,556,095 B2 | 1/2023 | Hiemstra et al. | |
| 11,561,515 B2 | 1/2023 | Beyhs | |
| 11,567,457 B2 | 1/2023 | Rothkopf et al. | |
| 11,669,205 B2 | 6/2023 | Shedletsky et al. | |
| 11,720,064 B2 | 8/2023 | Ely | |
| 11,754,981 B2 | 9/2023 | Perkins et al. | |
| 11,762,342 B2 | 9/2023 | Rothkopf et al. | |
| 11,796,961 B2 | 10/2023 | Ely et al. | |
| 11,815,860 B2 | 11/2023 | Pandya et al. | |
| 11,860,587 B2 | 1/2024 | Taylor et al. | |
| 2002/0101457 A1 | 8/2002 | Lang | |
| 2003/0174590 A1 | 9/2003 | Arikawa et al. | |
| 2004/0047244 A1 | 3/2004 | Iino et al. | |
| 2004/0082414 A1 | 4/2004 | Knox | |
| 2004/0130971 A1 | 7/2004 | Ecoffet et al. | |
| 2004/0264301 A1 | 12/2004 | Howard et al. | |
| 2005/0075558 A1 | 4/2005 | Vecerina et al. | |
| 2005/0088417 A1 | 4/2005 | Mulligan | |
| 2005/0134561 A1* | 6/2005 | Tierling | G06F 3/016 345/156 |
| 2005/0205377 A1* | 9/2005 | Borgerson | F16D 28/00 192/48.92 |
| 2006/0250377 A1 | 11/2006 | Zadesky et al. | |
| 2007/0013775 A1 | 1/2007 | Shin | |
| 2007/0050054 A1 | 3/2007 | Sambandam Guruparan et al. | |
| 2007/0182708 A1 | 8/2007 | Poupyrev et al. | |
| 2007/0211042 A1 | 9/2007 | Kim et al. | |
| 2007/0222756 A1 | 9/2007 | Wu et al. | |
| 2007/0229671 A1 | 10/2007 | Takeshita et al. | |
| 2007/0236450 A1* | 10/2007 | Colgate | G06F 3/041 345/156 |
| 2007/0242569 A1 | 10/2007 | Inoue | |
| 2007/0247421 A1 | 10/2007 | Orsley et al. | |
| 2008/0130914 A1 | 6/2008 | Cho | |
| 2008/0181059 A1 | 7/2008 | Wai | |
| 2008/0185272 A1 | 8/2008 | Otani et al. | |
| 2009/0051649 A1 | 2/2009 | Rondel | |
| 2009/0073119 A1 | 3/2009 | Le et al. | |

(56) References Cited

U.S. PATENT DOCUMENTS

| | | |
|---|---|---|
| 2009/0115748 A1 | 5/2009 | Tanaka et al. |
| 2009/0122656 A1 | 5/2009 | Bonnet et al. |
| 2009/0146975 A1 | 6/2009 | Chang |
| 2009/0152452 A1 | 6/2009 | Lee et al. |
| 2009/0188226 A1* | 7/2009 | Carlson .............. B62D 6/008 56/10.2 R |
| 2009/0217207 A1 | 8/2009 | Kagermeier et al. |
| 2009/0285443 A1 | 11/2009 | Camp et al. |
| 2009/0312051 A1 | 12/2009 | Hansson et al. |
| 2010/0033430 A1 | 2/2010 | Kakutani et al. |
| 2010/0053468 A1 | 3/2010 | Harvill |
| 2010/0079225 A1 | 4/2010 | Washizu et al. |
| 2010/0081375 A1 | 4/2010 | Rosenblatt et al. |
| 2010/0149099 A1 | 6/2010 | Elias |
| 2011/0007468 A1 | 1/2011 | Burton et al. |
| 2011/0090148 A1 | 4/2011 | Li et al. |
| 2011/0158057 A1 | 6/2011 | Brewer et al. |
| 2011/0242064 A1 | 10/2011 | Ono et al. |
| 2011/0249378 A1 | 10/2011 | Yoo |
| 2011/0270358 A1 | 11/2011 | Davis et al. |
| 2012/0067711 A1 | 3/2012 | Yang |
| 2012/0068857 A1 | 3/2012 | Rothkopf et al. |
| 2012/0075082 A1 | 3/2012 | Rothkopf et al. |
| 2012/0092383 A1* | 4/2012 | Hysek .............. G04G 9/00 368/10 |
| 2012/0112859 A1 | 5/2012 | Park et al. |
| 2012/0113044 A1 | 5/2012 | Strazisar et al. |
| 2012/0206248 A1 | 8/2012 | Biggs |
| 2012/0272784 A1 | 11/2012 | Bailey et al. |
| 2013/0037396 A1 | 2/2013 | Yu |
| 2013/0087443 A1 | 4/2013 | Kikuchi |
| 2013/0191220 A1 | 7/2013 | Dent et al. |
| 2013/0235704 A1 | 9/2013 | Grinberg |
| 2013/0261405 A1 | 10/2013 | Lee et al. |
| 2013/0335196 A1 | 12/2013 | Zhang et al. |
| 2014/0009397 A1 | 1/2014 | Gillespie |
| 2014/0045547 A1 | 2/2014 | Singamsetty et al. |
| 2014/0071098 A1 | 3/2014 | You |
| 2014/0073486 A1 | 3/2014 | Ahmed et al. |
| 2014/0132516 A1 | 5/2014 | Tsai et al. |
| 2014/0143784 A1 | 5/2014 | Mistry |
| 2014/0197936 A1 | 7/2014 | Biggs et al. |
| 2014/0340318 A1 | 11/2014 | Stringer et al. |
| 2014/0347289 A1* | 11/2014 | Suh .............. G06F 3/04847 345/3.1 |
| 2014/0368442 A1* | 12/2014 | Vahtola .............. G06F 3/013 345/173 |
| 2014/0375579 A1* | 12/2014 | Fujiwara .............. G06F 3/041 345/173 |
| 2015/0026647 A1 | 1/2015 | Park |
| 2015/0041289 A1* | 2/2015 | Ely .............. G06F 3/0488 200/4 |
| 2015/0042573 A1* | 2/2015 | Grant .............. G06F 3/016 345/173 |
| 2015/0049059 A1* | 2/2015 | Zadesky .............. H04M 1/0202 345/173 |
| 2015/0098309 A1 | 4/2015 | Adams et al. |
| 2015/0124415 A1 | 5/2015 | Goyal et al. |
| 2015/0186609 A1 | 7/2015 | Utter, II |
| 2015/0221460 A1 | 8/2015 | Teplitxky et al. |
| 2015/0293592 A1* | 10/2015 | Cheong .............. G06F 1/163 345/173 |
| 2015/0320346 A1 | 11/2015 | Chen |
| 2015/0338642 A1 | 11/2015 | Sanford |
| 2015/0366098 A1 | 12/2015 | Lapetina et al. |
| 2016/0018846 A1 | 1/2016 | Zenoff |
| 2016/0054570 A1* | 2/2016 | Bosveld .............. A41D 20/00 2/209.3 |
| 2016/0054813 A1 | 2/2016 | Shediwy et al. |
| 2016/0058375 A1 | 3/2016 | Rothkopf et al. |
| 2016/0061636 A1 | 3/2016 | Gowreesunker et al. |
| 2016/0062623 A1 | 3/2016 | Howard et al. |
| 2016/0063850 A1* | 3/2016 | Yang .............. H04M 1/72454 340/539.22 |
| 2016/0069713 A1 | 3/2016 | Ruh et al. |
| 2016/0098016 A1* | 4/2016 | Ely .............. G04G 21/00 368/308 |
| 2016/0109861 A1 | 4/2016 | Kim et al. |
| 2016/0116306 A1 | 4/2016 | Ferri et al. |
| 2016/0147432 A1 | 5/2016 | Shi et al. |
| 2016/0170598 A1 | 6/2016 | Zambetti et al. |
| 2016/0170608 A1 | 6/2016 | Zambetti et al. |
| 2016/0170624 A1 | 6/2016 | Zambetti et al. |
| 2016/0241688 A1 | 8/2016 | Vossoughi |
| 2016/0253487 A1 | 9/2016 | Sarkar et al. |
| 2016/0306446 A1 | 10/2016 | Chung et al. |
| 2016/0320583 A1 | 11/2016 | Hall, Jr. |
| 2016/0327911 A1* | 11/2016 | Eim .............. G04B 37/1486 |
| 2016/0338642 A1 | 11/2016 | Parara et al. |
| 2016/0378069 A1 | 12/2016 | Rothkopf et al. |
| 2016/0378070 A1 | 12/2016 | Rothkopf et al. |
| 2017/0011210 A1* | 1/2017 | Cheong .............. A61B 5/681 |
| 2017/0027461 A1 | 2/2017 | Shin et al. |
| 2017/0031449 A1 | 2/2017 | Karsten et al. |
| 2017/0045958 A1* | 2/2017 | Battlogg .............. G06F 1/169 |
| 2017/0061863 A1 | 3/2017 | Eguchi |
| 2017/0069443 A1 | 3/2017 | Wang et al. |
| 2017/0069444 A1 | 3/2017 | Wang et al. |
| 2017/0069447 A1 | 3/2017 | Wang et al. |
| 2017/0089735 A1 | 3/2017 | Ruh |
| 2017/0090572 A1* | 3/2017 | Holenarsipur .......... G06F 3/0362 |
| 2017/0090599 A1 | 3/2017 | Kuboyama |
| 2017/0104902 A1 | 4/2017 | Kim et al. |
| 2017/0123520 A1* | 5/2017 | Kim .............. G06F 3/016 |
| 2017/0139489 A1 | 5/2017 | Chen et al. |
| 2017/0216519 A1 | 8/2017 | Vouillamoz |
| 2017/0216668 A1 | 8/2017 | Burton et al. |
| 2017/0227980 A1* | 8/2017 | Hafez .............. F16F 9/535 |
| 2017/0238138 A1 | 8/2017 | Aminzade |
| 2017/0248986 A1* | 8/2017 | Jackson .............. G05G 5/03 |
| 2017/0251561 A1 | 8/2017 | Fleck et al. |
| 2017/0255266 A1* | 9/2017 | Holenarsipur .......... G06F 3/016 |
| 2017/0269715 A1 | 9/2017 | Kim et al. |
| 2017/0285404 A1 | 10/2017 | Kubota et al. |
| 2017/0301314 A1 | 10/2017 | Kim et al. |
| 2017/0307414 A1 | 10/2017 | Ferri et al. |
| 2017/0319082 A1 | 11/2017 | Sayme |
| 2017/0331869 A1 | 11/2017 | Bendahan et al. |
| 2017/0357465 A1 | 12/2017 | Dzeryn et al. |
| 2018/0018026 A1 | 1/2018 | Bushnell et al. |
| 2018/0052428 A1* | 2/2018 | Abramov .............. G06F 1/163 |
| 2018/0059624 A1 | 3/2018 | James |
| 2018/0136686 A1* | 5/2018 | Jackson .............. G06F 3/016 |
| 2018/0196517 A1* | 7/2018 | Tan .............. G06F 1/163 |
| 2018/0225701 A1 | 8/2018 | Han |
| 2018/0235491 A1 | 8/2018 | Bayley et al. |
| 2018/0337551 A1* | 11/2018 | Park .............. H02S 10/10 |
| 2019/0025940 A1 | 1/2019 | Shim et al. |
| 2019/0056700 A1 | 2/2019 | Matsuno |
| 2019/0072911 A1 | 3/2019 | Ely et al. |
| 2019/0072912 A1 | 3/2019 | Pandya et al. |
| 2019/0082547 A1 | 3/2019 | Werner et al. |
| 2019/0088583 A1 | 3/2019 | Ashikaga et al. |
| 2019/0278232 A1 | 9/2019 | Ely et al. |
| 2019/0317454 A1 | 10/2019 | Holenarsipur et al. |
| 2019/0391539 A1 | 12/2019 | Perkins et al. |
| 2020/0041962 A1 | 2/2020 | Beyhs |
| 2020/0053463 A1* | 2/2020 | Daley .............. H04R 1/1075 |
| 2020/0064774 A1 | 2/2020 | Ely et al. |
| 2020/0064779 A1 | 2/2020 | Pandya et al. |
| 2020/0073339 A1 | 3/2020 | Roach et al. |
| 2020/0085331 A1 | 3/2020 | Chou |
| 2020/0110473 A1 | 4/2020 | Bushnell et al. |
| 2020/0150815 A1 | 5/2020 | Ely et al. |
| 2020/0159172 A1 | 5/2020 | Bushnell et al. |
| 2020/0233380 A1 | 7/2020 | Rothkopf |
| 2020/0233529 A1 | 7/2020 | Shedletsky et al. |
| 2020/0310609 A1 | 10/2020 | Ham |
| 2021/0055696 A1 | 2/2021 | Ely |
| 2021/0060783 A1 | 3/2021 | Bryner et al. |
| 2021/0096688 A1 | 4/2021 | Shedletsky et al. |
| 2021/0157278 A1 | 5/2021 | Xue |
| 2021/0181682 A1 | 6/2021 | Ely et al. |

(56) References Cited

U.S. PATENT DOCUMENTS

| | | | |
|---|---|---|---|
| 2021/0181688 A1 | 6/2021 | Ely et al. |
| 2021/0181690 A1 | 6/2021 | Rothkopf et al. |
| 2021/0181691 A1 | 6/2021 | Rothkopf et al. |
| 2021/0181692 A1 | 6/2021 | Rothkopf et al. |
| 2021/0181865 A1 | 6/2021 | Bushnell et al. |
| 2021/0255590 A1 | 8/2021 | Ely et al. |
| 2021/0303081 A1 | 9/2021 | Kuboyama et al. |
| 2021/0325168 A1 | 10/2021 | Lv et al. |
| 2021/0353226 A1 | 11/2021 | Hiemstra |
| 2021/0405594 A1 | 12/2021 | Holenarsipur et al. |
| 2022/0043397 A1 | 2/2022 | Ely et al. |
| 2022/0043402 A1 | 2/2022 | Roach et al. |
| 2022/0074731 A1 | 3/2022 | Jang et al. |
| 2022/0261111 A1 | 8/2022 | Shedletsky et al. |
| 2022/0299944 A1 | 9/2022 | Ely |
| 2022/0326660 A1 | 10/2022 | Perkins |
| 2022/0413446 A1 | 12/2022 | Rothkopf |
| 2023/0012897 A1 | 1/2023 | Bushnell |
| 2023/0013283 A1 | 1/2023 | Herrera |
| 2023/0028554 A1 | 1/2023 | Rothkopf |
| 2023/0077241 A1 | 3/2023 | Pandya et al. |
| 2023/0097827 A1 | 3/2023 | Rothkopf |
| 2023/0101015 A1 | 3/2023 | Ely |
| 2023/0161299 A1 | 5/2023 | Beyhs |
| 2023/0168635 A1 | 6/2023 | Hiemstra et al. |
| 2023/0213893 A1 | 7/2023 | Rothkopf et al. |
| 2023/0259235 A1 | 8/2023 | Shedletsky et al. |
| 2023/0341819 A1 | 10/2023 | Ely et al. |
| 2023/0393536 A1 | 12/2023 | Perkins et al. |
| 2023/0400818 A1 | 12/2023 | Davis et al. |
| 2023/0408984 A1 | 12/2023 | Liang et al. |
| 2023/0418230 A1 | 12/2023 | Ely et al. |
| 2024/0036523 A1 | 2/2024 | Pandya et al. |
| 2024/0045383 A1 | 2/2024 | Roach et al. |
| 2024/0053707 A1 | 2/2024 | Ely et al. |
| 2024/0152100 A1 | 5/2024 | Beyhs |
| 2024/0192804 A1 | 6/2024 | Shedletsky et al. |
| 2024/0264568 A1 | 8/2024 | Ely |
| 2024/0264569 A1 | 8/2024 | Davis et al. |
| 2024/0393747 A1 | 8/2024 | Ely et al. |
| 2025/0013202 A1 | 1/2025 | Ely et al. |

FOREIGN PATENT DOCUMENTS

| | | |
|---|---|---|
| CN | 1445627 | 10/2003 |
| CN | 1504843 | 6/2004 |
| CN | 1601408 | 3/2005 |
| CN | 1624427 | 6/2005 |
| CN | 1792295 | 6/2006 |
| CN | 1825224 | 8/2006 |
| CN | 101035148 | 9/2007 |
| CN | 101201587 | 6/2008 |
| CN | 201081979 | 7/2008 |
| CN | 101404928 | 4/2009 |
| CN | 201262741 | 6/2009 |
| CN | 101641663 | 2/2010 |
| CN | 101750958 | 6/2010 |
| CN | 201638168 | 11/2010 |
| CN | 101923314 | 12/2010 |
| CN | 102067070 | 5/2011 |
| CN | 102216959 | 10/2011 |
| CN | 202008579 | 10/2011 |
| CN | 102590925 | 7/2012 |
| CN | 102741772 | 10/2012 |
| CN | 102890443 | 1/2013 |
| CN | 202710937 | 1/2013 |
| CN | 103177891 | 6/2013 |
| CN | 103191557 | 7/2013 |
| CN | 103253067 | 8/2013 |
| CN | 103645804 | 3/2014 |
| CN | 203564224 | 4/2014 |
| CN | 103852090 | 6/2014 |
| CN | 203630524 | 6/2014 |
| CN | 103919536 | 7/2014 |
| CN | 103956006 | 7/2014 |
| CN | 203693601 | 7/2014 |
| CN | 203705837 | 7/2014 |
| CN | 203732900 | 7/2014 |
| CN | 103995456 | 8/2014 |
| CN | 104020660 | 9/2014 |
| CN | 203941395 | 11/2014 |
| CN | 104777987 | 4/2015 |
| CN | 104685794 | 6/2015 |
| CN | 204479929 | 7/2015 |
| CN | 204496177 | 7/2015 |
| CN | 104880937 | 9/2015 |
| CN | 104898406 | 9/2015 |
| CN | 204650147 | 9/2015 |
| CN | 105022947 | 11/2015 |
| CN | 105096979 | 11/2015 |
| CN | 105339871 | 2/2016 |
| CN | 105446125 | 3/2016 |
| CN | 205121417 | 3/2016 |
| CN | 105547146 | 5/2016 |
| CN | 105556433 | 5/2016 |
| CN | 105683876 | 6/2016 |
| CN | 105683877 | 6/2016 |
| CN | 105760067 | 7/2016 |
| CN | 105955519 | 9/2016 |
| CN | 205645648 | 10/2016 |
| CN | 205721636 | 11/2016 |
| CN | 205750744 | 11/2016 |
| CN | 106236051 | 12/2016 |
| CN | 106557218 | 4/2017 |
| CN | 206147524 | 5/2017 |
| CN | 206209589 | 5/2017 |
| CN | 107111342 | 8/2017 |
| CN | 107122088 | 9/2017 |
| CN | 107966895 | 4/2018 |
| CN | 209560397 | 10/2019 |
| CN | 209625187 | 11/2019 |
| CN | 111752138 | 10/2020 |
| CN | 215494568 | 1/2022 |
| CN | 114220694 | 3/2022 |
| CN | 106125968 | 11/2022 |
| CN | 218675709 | 3/2023 |
| DE | 2352016 | 4/1975 |
| DE | 3706194 | 9/1988 |
| DE | 102008023651 | 11/2009 |
| DE | 102016215087 | 3/2017 |
| EP | 0165548 | 12/1985 |
| EP | 0556155 | 8/1993 |
| EP | 1345095 | 9/2003 |
| EP | 1519452 | 3/2005 |
| EP | 1669724 | 6/2006 |
| EP | 1832969 | 9/2007 |
| EP | 2375295 | 10/2011 |
| EP | 2579186 | 4/2013 |
| EP | 2720129 | 4/2014 |
| EP | 2884239 | 6/2015 |
| FR | 2030093 | 10/1970 |
| FR | 2801402 | 5/2001 |
| GB | 887369 | 1/1962 |
| GB | 2433211 | 6/2007 |
| JP | S52151058 | 12/1977 |
| JP | S52164551 | 12/1977 |
| JP | S53093067 | 8/1978 |
| JP | S5478178 | 6/1979 |
| JP | S54087779 | 6/1979 |
| JP | S5708582 | 1/1982 |
| JP | S5734457 | 2/1982 |
| JP | S60103936 | 6/1985 |
| JP | S60103937 | 6/1985 |
| JP | H02285214 | 11/1990 |
| JP | H04093719 | 3/1992 |
| JP | H04157319 | 5/1992 |
| JP | H05203465 | 8/1993 |
| JP | H05312595 | 11/1993 |
| JP | H06050927 | 12/1994 |
| JP | H06331761 | 12/1994 |
| JP | H06347293 | 12/1994 |
| JP | H07116141 | 5/1995 |
| JP | H10161811 | 6/1998 |
| JP | H11121210 | 4/1999 |

(56) References Cited

FOREIGN PATENT DOCUMENTS

| | | |
|---|---|---|
| JP | H11191508 | 7/1999 |
| JP | 2000258559 | 9/2000 |
| JP | 2000316824 | 11/2000 |
| JP | 2000337892 | 12/2000 |
| JP | 2001084934 | 3/2001 |
| JP | 2001167651 | 6/2001 |
| JP | 2001202178 | 7/2001 |
| JP | 2001215288 | 8/2001 |
| JP | 2001289977 | 10/2001 |
| JP | 2001524206 | 11/2001 |
| JP | 2002071480 | 3/2002 |
| JP | 2002165768 | 6/2002 |
| JP | 2003036144 | 2/2003 |
| JP | 2003050668 | 2/2003 |
| JP | 2003151410 | 5/2003 |
| JP | 2003215271 | 7/2003 |
| JP | 2003331693 | 11/2003 |
| JP | 2004079410 | 3/2004 |
| JP | 2004184396 | 7/2004 |
| JP | 2004028979 | 11/2004 |
| JP | 2005017011 | 1/2005 |
| JP | 2005063200 | 3/2005 |
| JP | 2005099023 | 4/2005 |
| JP | 2005108630 | 4/2005 |
| JP | 2006101505 | 4/2006 |
| JP | 2006164275 | 6/2006 |
| JP | 3852854 | 12/2006 |
| JP | 2007101380 | 4/2007 |
| JP | 2007149620 | 6/2007 |
| JP | 2007248176 | 9/2007 |
| JP | 2007285748 | 11/2007 |
| JP | 2007311153 | 11/2007 |
| JP | 2008053980 | 3/2008 |
| JP | 2008122124 | 5/2008 |
| JP | 2008122377 | 5/2008 |
| JP | 2008170436 | 7/2008 |
| JP | 2008235226 | 10/2008 |
| JP | 2009009382 | 1/2009 |
| JP | 2009070657 | 4/2009 |
| JP | 2009519737 | 5/2009 |
| JP | 2009540399 | 11/2009 |
| JP | 2010032545 | 2/2010 |
| JP | 2010515153 | 5/2010 |
| JP | 2010165001 | 7/2010 |
| JP | 2010186572 | 8/2010 |
| JP | 2010243344 | 10/2010 |
| JP | 2010244797 | 10/2010 |
| JP | 2011021929 | 2/2011 |
| JP | 2011165468 | 8/2011 |
| JP | 2011221659 | 11/2011 |
| JP | 2012053801 | 3/2012 |
| JP | 2012221905 | 11/2012 |
| JP | 2013057516 | 3/2013 |
| JP | 2013079961 | 5/2013 |
| JP | 2013524189 | 6/2013 |
| JP | 3190075 | 4/2014 |
| JP | 5477393 | 4/2014 |
| JP | 2014512556 | 5/2014 |
| JP | 2014112222 | 6/2014 |
| JP | 2014174031 | 9/2014 |
| JP | 2016532266 | 10/2016 |
| JP | 2017219448 | 12/2017 |
| JP | 2018510451 | 4/2018 |
| KR | 20010030477 | 4/2001 |
| KR | 200278568 | 3/2002 |
| KR | 20030083340 | 10/2003 |
| KR | 20070011685 | 1/2007 |
| KR | 20070014247 | 2/2007 |
| KR | 100754674 | 9/2007 |
| KR | 20080028935 | 4/2008 |
| KR | 20080045397 | 5/2008 |
| KR | 100849684 | 8/2008 |
| KR | 1020080111563 | 12/2008 |
| KR | 2020100007563 | 7/2010 |
| KR | 20110011393 | 2/2011 |
| KR | 20110012784 | 2/2011 |
| KR | 20110103761 | 9/2011 |
| KR | 20110113368 | 10/2011 |
| KR | 20130036038 | 4/2013 |
| KR | 20130131873 | 12/2013 |
| KR | 20140051391 | 4/2014 |
| KR | 20140064689 | 5/2014 |
| KR | 20140104388 | 8/2014 |
| KR | 20160017070 | 2/2016 |
| KR | 20160048967 | 5/2016 |
| KR | 20170106395 | 9/2017 |
| KR | 1020170127744 | 11/2017 |
| KR | 102136836 | 7/2020 |
| NL | 1040225 | 11/2014 |
| RO | 129033 | 11/2013 |
| TW | 200633681 | 10/2006 |
| WO | WO2001/022038 | 3/2001 |
| WO | WO2001/069567 | 9/2001 |
| WO | WO2003/032538 | 4/2003 |
| WO | WO2010/058376 | 5/2010 |
| WO | WO2012/083380 | 6/2012 |
| WO | WO2012/094805 | 7/2012 |
| WO | WO2014/018118 | 1/2014 |
| WO | WO2014/200766 | 12/2014 |
| WO | WO2015/034149 | 3/2015 |
| WO | WO2015/116111 | 8/2015 |
| WO | WO2015122885 | 8/2015 |
| WO | WO2015/147756 | 10/2015 |
| WO | WO2016080669 | 5/2016 |
| WO | WO2016/104922 | 6/2016 |
| WO | WO2016155761 | 10/2016 |
| WO | WO2016196171 | 12/2016 |
| WO | WO2016208835 | 12/2016 |
| WO | WO2017013278 | 1/2017 |
| WO | WO2019/050778 | 3/2019 |
| WO | WO2020173085 | 9/2020 |

OTHER PUBLICATIONS

Author Unknown, "Fossil Q ups smartwatch game with handsome design and build," Business Mirror, Makati City, Philippines, 3 pages, Dec. 20, 2016.

Author Unknown, "How Vesag Helps Kids Women and Visitors," http://www.sooperarticles.com/health-fitness-articles/children-health-articles/how-vesag-helps-kids-women-visitors-218542.html, 2 pages, at least as early as May 20, 2015.

Author Unknown, "mHealth," http://mhealth.vesag.com/?m=201012, 7 pages, Dec. 23, 2010.

Author Unknown, "mHealth Summit 2010," http://www.virtualpressoffice.com/eventsSubmenu.do?page=exhibitorPage&showId=1551&companyId=5394, 5 pages, Nov. 18, 2010.

Author Unknown, "MyKronoz ZeTime: World's Most Funded Hybrid Smartwatch Raised over $3M on Kickstarter, Running until Apr. 27th," Business Wire, New York, New York, 3 pages, Apr. 21, 2017.

Author Unknown, "RedEye mini Plug-in Universal Remote Adapter for iPhone, iPod touch and iPad," Amazon.com, 4 pages, date unknown.

Author Unknown, "Re iPhone Universal Remote Control—Infrared Remote Control Accessory for iPhone and iPod touch," http://www.amazon.com/iPhone-Universal-Remote-Control-Accessory/dp/tech-data/B0038Z4 . . . , 2 pages, at least as early as Jul. 15, 2010.

Author Unknown, "Vesag Wrist Watch for Dementia Care from VYZIN," http://vyasa-kaaranam-ketkadey.blogspot.com/2011/03/vesag-wrist-watch-for-dementia-care.html, 2 pages, Mar. 31, 2011.

Author Unknown, "Vyzin Electronics Private Limited launches Vesag Watch," http://www.virtualpressoffice.com/showJointPage.do?page=jp&showId=1544, 5 pages, Jan. 6, 2011.

Author Unknown, "Vyzin Unveiled Personal Emergency Response System (PERS) with Remote Health Monitoring That Can be Used for Entire Family," http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.

(56) References Cited

OTHER PUBLICATIONS

Author Unknown, "DeskThorityNet, Optical Switch Keyboards," http://deskthority.net/keyboards-f2/optical-switch-keyboards-t1474.html, 22 pages, Jul. 11, 2015.
Epstein et al., "Economical, High-Performance Optical Encoders," Hewlett-Packard Journal, pp. 99-106, Oct. 1988. [text only version].
GreyB, "Google Watch: Convert your arm into a keyboard," http://www.whatafuture.com/2014/02/28/google-smartwatch/#sthash.Yk35cDXK.dpbs, 3 pages, Feb. 28, 2014.
IBM, "Additional Functionality Added to Cell Phone via "Learning" Function Button," www.ip.com, 2 pages, Feb. 21, 2007.
Kim, Joseph, "2010 mHealth Summit Emerges as Major One-Stop U.S. Venue for Mobile Health," http://www.medicineandtechnology.com/2010/08/2010-mhealth-summit-emerges-as-major.html, 3 pages, Aug. 26, 2010.
Krishnan et al., "A Miniature Surface Mount Reflective Optical Shaft Encoder," Hewlett-Packard Journal, Article 8, pp. 1-6, Dec. 1996.
Narayanaswami et al., "Challenges and considerations for the design and production of a purpose-optimized body-worn wristwatch computer," Defense, Security, and Cockpit Displays, 2004.
M.T. Raghunath et al., User Interfaces for Applications on a Wrist Watch, Personal and Ubiquitous Computing, vol. 6, No. 1, 2002, Springer.
Rick, "How VESAG Helps Health Conscious Citizens," http://sensetekgroup.com/2010/11/29/wireless-health-monitoring-system/, 2 pages, Nov. 29, 2010.
Sadhu, Rajendra, "How VESAG Helps People Who Want to 'Be There'?," http://ezinearticles.com/?How-Vesag-Helps-People-Who-Want-to-Be-There?&id-5423873, 1 page, Nov. 22, 2010.
Sadhu, Rajendra, "Mobile Innovation Helps Dementia and Alzheimer's Patients," http://www.itnewsafrica.com/2010/11/mobile-innovation-helps-dementia-andalzheimer%E2%80%99s-patients/, 3 pages, Nov. 22, 2010.
Sherr, Sol, "Input Devices," p. 55, Mar. 1988.
Tran et al., "Universal Programmable Remote Control/Telephone," www.ip.com, 2 pages, May 1, 1992.

* cited by examiner

VARIABLE FRICTIONAL FEEDBACK DEVICE FOR A DIGITAL CROWN OF AN ELECTRONIC WATCH

CROSS-REFERENCE TO RELATED APPLICATIONS

This application is a continuation patent application of, and claims benefit to U.S. Non-Provisional patent application Ser. No. 17/528,046, filed Nov. 16, 2021, and titled "VARIABLE FRICTIONAL FEEDBACK DEVICE FOR A DIGITAL CROWN OF AN ELECTRONIC WATCH," which is a continuation of Ser. No. 16/399,868, filed Apr. 30, 2019, and titled "VARIABLE FRICTIONAL FEEDBACK DEVICE FOR A DIGITAL CROWN OF AN ELECTRONIC WATCH," which issued as U.S. Pat. No. 11,194,299 on Dec. 7, 2021, which claims the benefit of U.S. Provisional Patent Application No. 62/804,628, filed Feb. 12, 2019, and titled "VARIABLE FRICTIONAL FEEDBACK DEVICE FOR A DIGITAL CROWN OF AN ELECTRONIC WATCH," the disclosures of which are hereby incorporated herein by reference in their entireties.

FIELD

The described embodiments relate generally to an electronic watch or other electronic device (e.g., another type of wearable electronic device). More particularly, the described embodiments relate to providing variable frictional feedback at a crown or other rotational input device.

BACKGROUND

Wearable devices, like an electronic watch, may have one or more input mechanisms that allow a user to provide input to the wearable device. In general, it may be beneficial for an input mechanism to provide tactile feedback to the user to let the user know that the input is being received by the device. Some traditional input mechanisms may provide tactile feedback to the user, but the tactile feedback is typically fixed and cannot be varied or configured for a particular mode or operation being performed on the device. The systems and techniques described herein overcome some of these limitations with traditional input devices (e.g., watch crowns) by providing haptic or tactile feedback using a variable frictional feedback device.

SUMMARY

Embodiments of the systems, devices, methods, and apparatuses described in the present disclosure are directed to a crown, an electronic watch or other electronic device having a crown and a variable friction mechanism, and methods for providing variable frictional feedback using the variable friction mechanism as the crown is rotated.

In a first aspect, the present disclosure describes an electronic watch. The electronic watch includes an enclosure defining an opening, a processing unit positioned within the enclosure, and a crown operably coupled to the processing unit and configured to receive a rotational input. The crown includes a user-rotatable crown body and a shaft coupled to the crown body and extending through the opening in the enclosure. The electronic watch further includes a rotation sensor positioned within the enclosure and operably coupled to the processing unit. The rotation sensor is configured to detect the rotational input. The electronic watch further includes a variable friction mechanism positioned around a portion of the crown and operably coupled to the processing unit. The variable friction mechanism is configured to produce a variable frictional feedback as the crown is rotated by the rotational input.

In some cases, the processing unit may be configured to determine a characteristic of the rotational input, determine an amount of the variable frictional feedback to be produced based, at least in part, on the determined characteristic, and output a signal to the variable friction mechanism causing the variable friction mechanism to produce the variable frictional feedback.

In another aspect, the electronic watch further comprises a touch-sensitive display operably coupled to the processing unit and at least partially surrounded by the enclosure. The touch-sensitive display is configured to receive a touch input and provide a graphical output that is responsive to each of the touch input and the rotational input.

In another aspect, the variable friction mechanism comprises a friction element at least partially surrounding the shaft of the crown and configured to contact the shaft and an actuator configured to change a friction between the friction element and the shaft to produce the variable frictional feedback.

In some cases, producing the variable frictional feedback comprises varying a resistive torque associated with rotating the crown.

In some cases, the variable friction mechanism is configured to, in response to receiving a first signal from the processing unit, increase the resistive torque for a first portion of the rotational input, and in response to receiving a second signal from the processing unit, decrease the resistive torque for a second portion of the rotational input.

In some cases, the variable friction mechanism is configured to alternately increase and decrease the resistive torque in accordance with at least one of a predetermined number of times per complete rotation of the crown or at predetermined intervals of time.

In another aspect, the electronic watch has a first graphical output mode and a second graphical output mode. In the first graphical output mode, the variable friction mechanism is configured to alternately increase and decrease the resistive torque in accordance with at least one of a first predetermined number of times per complete rotation of the crown or at first predetermined intervals of time having a first duration. In the second graphical output mode, the variable friction mechanism is configured to alternately increase and decrease the resistive torque in accordance with at least one of a second predetermined number of times per complete rotation of the crown or at second predetermined intervals of time having a second duration.

In another aspect, the present disclosure describes an electronic device. The electronic device includes an enclosure, a processing unit within the enclosure, and a touch-sensitive display operably coupled to the processing unit and positioned at least partially within the enclosure. The touch-sensitive display is configured to receive a touch input and provide a graphical output. The electronic device further includes a crown extending through an opening of the enclosure and configured to receive a rotational input. The electronic device further includes a variable friction mechanism positioned at least partially about the crown and operably coupled to the processing unit. The variable friction mechanism is configured to provide a variable frictional feedback at the crown in response to a signal received from the processing unit. The variable frictional feedback corresponds to at least one of the graphical output or the rotational input.

In some cases, the graphical output comprises a first selectable element and a second selectable element. In a first state, the first selectable element is selected, and in a second state, the second selectable element is selected. The rotational input causes a transition from the first state to the second state and the variable frictional feedback is produced during the transition from the first state to the second state.

In another aspect, the variable frictional feedback is a first variable frictional feedback and the signal is a first signal. In a first mode, the variable friction mechanism is configured to provide the first variable frictional feedback in response to the signal received from the processing unit. In a second mode, the variable friction mechanism is configured to provide a second variable frictional feedback in response to a second signal received from the processing unit.

In some cases, in the first mode, the graphical output comprises a first scrollable list of graphical elements, the first scrollable list having a first length and the variable friction mechanism exerts a first force on the crown. In the second mode, the graphical output comprises a second scrollable list of graphical elements, the second scrollable list having a second length shorter than the first length and the variable friction mechanism exerts a second force greater than the first force on the crown.

In some cases, the graphical output comprises a scrollable list of selectable elements. In the first mode, a first selectable element that is not a last item of the scrollable list is selected and the variable friction mechanism allows rotation of the crown in a first direction and a second direction. In the second mode, a second selectable element that is the last item of the scrollable list is selected and the variable friction mechanism prevents the crown from being rotated in at least one of the first direction or the second direction.

In another aspect, providing the variable frictional feedback comprises continuously increasing a frictional force between the variable friction mechanism and the crown as the crown is rotated in a first direction and continuously decreasing the frictional force between the variable friction mechanism and the crown as the crown is rotated in a second direction. In some cases, rotating the crown in the first direction increases at least one of a volume level, a display brightness, or a zoom and rotating the crown in the second direction decreases the at least one of the volume level, the display brightness, or the zoom.

In still another aspect of the disclosure, a method for producing variable frictional feedback as a crown of an electronic watch is rotated. The method includes the step of detecting a rotational input at the crown. The method further includes the step of, determining, by a processing unit of the electronic watch, a variable frictional feedback to produce as the crown rotates. The method further includes the step of varying, by a variable friction mechanism, a resistive torque associated with rotating the crown to produce the variable frictional feedback.

In some cases, varying the resistive torque comprises varying a friction between the variable friction mechanism and the crown. In some cases, varying the friction comprises at least one of continuously increasing or decreasing the frictional as the crown is rotated.

The method may further include the steps of receiving the signal at an actuator of the variable friction mechanism, and in response to receiving the signal, varying the friction between the variable friction mechanism and the crown using the actuator.

In some cases, determining the variable frictional feedback corresponding to the detected rotational movement comprises detecting at least one of an input received by the electronic watch, an output provided by the electronic watch, or a user interface command.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
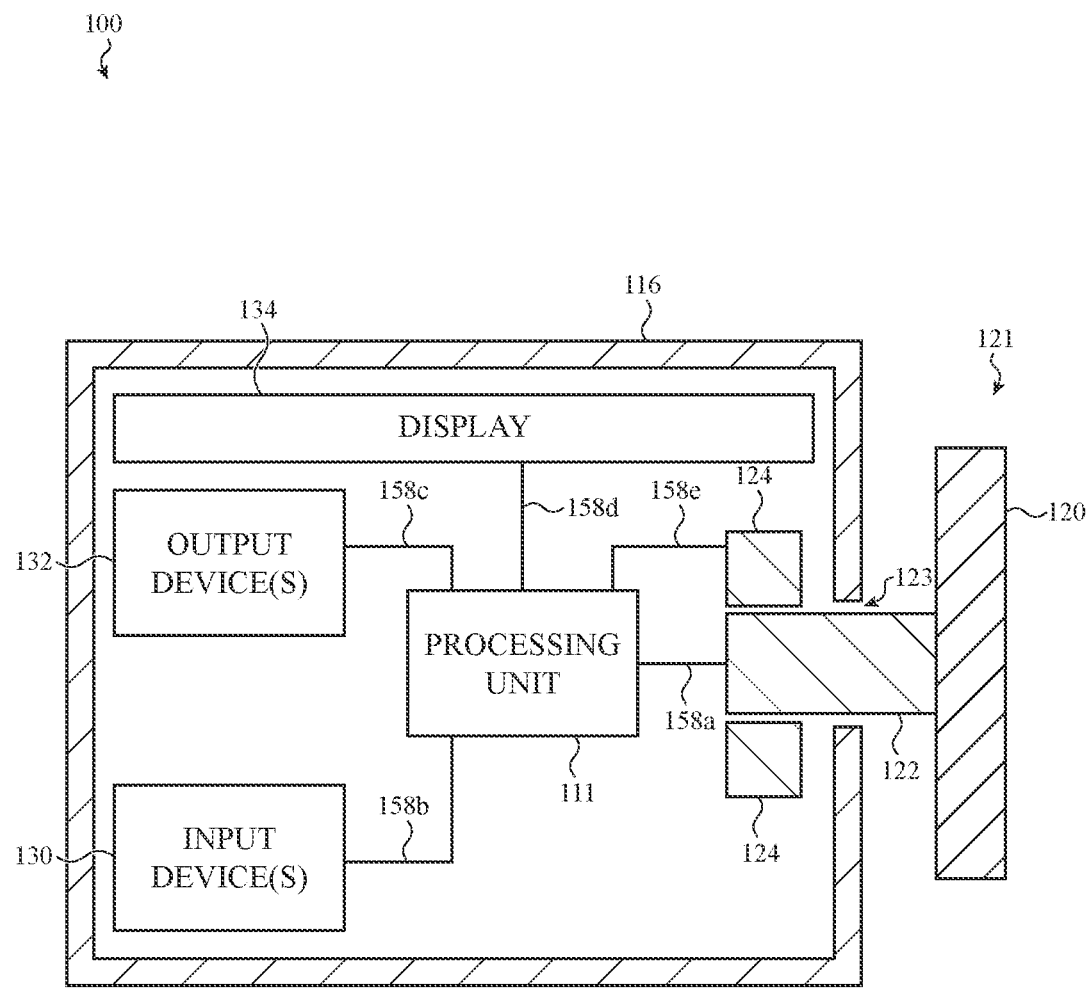
FIG. 1 shows a functional block diagram of an electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The following disclosure relates to an electronic device (e.g., an electronic watch) having an input mechanism, such as a crown, that may receive translational inputs, rotational inputs, and/or touch inputs and a variable friction mechanism that may produce variable frictional feedback as the crown is rotated. Inputs received at the crown may result in changes in operation of the electronic device and/or outputs, such as graphical outputs, provided by the electronic device. In various embodiments, the crown includes a shaft extending through an opening in a device enclosure of an electronic device and a user-rotatable crown body coupled to the shaft and positioned at least partially outside of the device enclosure.

In some cases, rotational and/or translational inputs provided at the user-rotatable crown body cause the shaft to translate and/or rotate. In general, the term "rotational input" may be used to refer to an input that causes a rotation of the crown and the term "translational input" may be used to refer to an input that causes a linear translation or displacement of the crown. One or more sensors may detect the rotation and/or translation and, in response, provide signal(s) to one or more circuits of the electronic device, such as a processing unit, for processing of the received input(s). In some cases, electronic sensors used to precisely detect rotation (e.g., optical rotation sensors) do not cause friction on the crown, for example because the sensors do not contact the crown. This allows for easy rotation, but it does not provide tactile feedback to the user.

As noted above, the electronic watch may include a variable friction mechanism that produces a variable frictional feedback as the crown is rotated by varying a frictional force between the crown and the variable friction mechanism. As used herein, the term "variable frictional feedback" may be used to refer to a variable resistance to a rotational input, which may be perceived by the user as a variable frictional force or resistive torque. Because the output may be perceived through user touch, the output may also be referred to as a "tactile output" or a "haptic output." In some cases, the variable frictional feedback may result in a change in a resistive torque (e.g., a torque that resists rotation of the crown). In some cases, the variable frictional feedback may cause the crown to require more or less torque to rotate. In some cases, the variable frictional feedback may cause the crown to be easier or harder to rotate. In some cases, the variable frictional feedback may simulate one or more mechanisms, such as detents, ratchets, brakes, and the like.

The variable friction mechanism may produce variable frictional feedback in response to receiving signals, such as from a processing unit of the electronic watch. The variable frictional feedback may correspond to operational states, events, or other conditions at the electronic watch, including inputs received at the electronic watch (e.g., touch inputs, rotational inputs, translational inputs), outputs of the electronic watch (e.g., graphical outputs, audio outputs, haptic outputs), applications and processes executing on the electronic watch, predetermined sequences, a rotational position of the crown, user interface commands (e.g., volume, zoom, or brightness controls, audio or video controls, scrolling on a list or page, and the like), and the like.

The variable friction mechanism may be positioned about or at least partially surround a portion of the crown. In some cases, the variable friction mechanism may contact and exert a variable force on the crown (e.g., a variable force having a component that is normal to a surface of the shaft, the crown body, and/or another component of the crown). The friction between the variable friction mechanism and the crown may be correlated with the force exerted on the crown by the variable friction mechanism. As a result, the force exerted on the crown may be varied to vary the friction between the crown and the variable friction mechanism. The varying friction may be used to provide the variable frictional feedback as the crown is rotated. As used herein, the terms "friction" or "frictional force" may be used to refer to a force that resists or impedes the relative motion of two surface or elements sliding against each other.

The variable friction mechanism may include one or more friction elements that contact the crown and one or more actuators coupled to the friction elements. In some cases, the variable friction mechanism is positioned around a periphery of the shaft, and the friction elements at least partially surround the shaft. The actuators may apply a force to the friction elements that causes the friction elements to press against the shaft, resulting in a force exerted on the shaft by each friction element. The force applied by the actuators may be varied to vary the friction between the friction elements and the shaft and to produce the variable frictional feedback.

In some cases, the actuator causes the friction element to deform and press against the shaft. In some cases, the actuator compresses and/or decompresses the friction element along an axis that is substantially parallel to the shaft to change the force exerted by the friction element on the shaft. Compressing the friction element along an axis that is substantially parallel to the shaft may change a shape of the friction element and cause it to press against the shaft and increase the force. Decompressing or stretching the friction element along the axis that is substantially parallel to the shaft may change the shape of the friction element and reduce or eliminate the force exerted on the shaft.

In some cases, the actuator applies a force to the friction element along an axis that is substantially perpendicular to a surface of the shaft. For example, the actuator may compress the friction element inward and/or move the friction element toward the shaft to increase the force exerted on the shaft and decompress (or stretch) the friction element and/or move the friction element away from the shaft to decrease the force. The force applied by the actuator(s) need not be parallel or perpendicular to the shaft. In various cases, the force exerted by the friction element on the shaft may be varied by applying a force to the friction element in any of several directions. Similarly, the friction element contacting the shaft is not required. In various cases, the friction element may contact a component of the crown that is coupled to the shaft or crown body, such as a shaft retainer or the like. In some cases, the friction element may be brought out of contact with the shaft, crown body, and/or shaft retainer such that there is no friction between the variable friction mechanism and the crown.

The crown body may include a conductive portion, such as an inner crown body, that defines a conductive surface, such as a touch-sensitive surface, for receiving touch inputs. In general, the term "touch input" may be used to refer to a touch or gesture applied to the crown by a finger, thumb, or other body part of the user. The touch input may be momentary or sustained, depending on the user's interaction with the device. The conductive portion having a conductive surface may be configured to measure an electrical property associated with the touch. For example, the conductive surface may function as an electrode to sense voltages or signals indicative of one or more touch inputs and/or biological parameters, such as an electrocardiogram, of a user in contact with the conductive surface.

The conductive portion or conductive surface may be electrically coupled to one or more circuits of the electronic device to transmit signals from the conductive surface for detection and processing as touch inputs and/or biological parameters. For example, the conductive surface may be electrically coupled to the shaft, and an end of the shaft interior to the enclosure, or a conductive shaft retainer interior to the enclosure, may be in mechanical and electrical contact with a connector (e.g., a spring-biased conductor) that carries electrical signals between the shaft or shaft retainer and a circuit (e.g., a processing unit), thereby providing electrical communication between the crown and the circuit.

As discussed above, the conductive portion may be an inner crown body of the crown body. The crown body may also include an outer crown body at least partially surrounding the inner crown body. In some embodiments, the outer crown body is electrically isolated from the shaft and/or inner crown body to prevent electrical grounding of the inner crown body with other components of the electronic device, such as the device enclosure, and/or to allow users to provide rotational and/or translational inputs at the crown without accidentally providing touch inputs by contacting the conductive surface of the inner crown body. Similarly, the crown may be electrically isolated from the enclosure.

Generally, the crown body is attached to and/or coupled with the shaft to form the crown. The term "attached," as used herein, may be used to refer to two or more elements, structures, objects, components, parts or the like that are physically affixed, fastened, and/or retained to one another. The term "coupled," as used herein, may be used to refer to two or more elements, structures, objects, components, parts or the like that are physically attached to one another, operate with one another, communicate with one another, are in electrical connection with one another, and/or otherwise interact with one another. Accordingly, while elements attached to one another are coupled to one another, the reverse is not required. As used herein, "operably coupled" may be used to refer to two or more devices that are coupled in any suitable manner for operation and/or communication, including wiredly, wirelessly, or some combination thereof.

In various cases, one or more components of the crown may be integrally formed with one another. As used herein, the term "integrally formed with" may be used to refer to defining or forming a unitary structure. For example, the crown body may be integrally formed with the shaft (e.g., the shaft and the crown body are a single part).

These and other embodiments are discussed with reference to FIGS. 1-15. However, those skilled in the art will readily appreciate that the detailed description given herein with respect to these figures is for explanatory purposes only and should not be construed as limiting.

FIG. 1 shows a functional block diagram of an electronic device 100. In some examples, the device 100 may be an electronic watch. The electronic device 100 may include a device enclosure 116 and a crown 121, one or more input devices 130, one or more output devices 132, a display 134, and a processing unit 111 positioned at least partially within the enclosure 116.

In some cases, the electronic device 100 includes a crown 121 configured to receive translational inputs, rotational inputs, and/or touch inputs. Inputs received at the crown 121 may result in changes in outputs provided by the electronic device 100 such as a graphical output of the display 134, and/or otherwise modify operations of the electronic device. In some cases, the crown 121 may be positioned along a side of the enclosure 116, and may extend through an opening 123 defined in the enclosure. The crown 121 may include a user-rotatable crown body 120 and a shaft 122. The crown body may be positioned at least partially outside of the device enclosure 116 and may be coupled to the shaft 122. In some cases, the shaft 122 extends from the crown body and extends through the opening 123.

In some embodiments, the electronic device 100 includes a variable friction mechanism 124 for providing variable frictional feedback at the crown 121 as the crown is rotated by a rotational input. In some cases, the variable friction mechanism 124 is positioned around or at least partially surrounds a portion of the crown 121, such as the shaft 122. The variable friction mechanism 124 may vary a frictional force between the crown 121 and the variable friction mechanism as the crown is rotated to change a resistive torque and/or simulate one or more mechanisms, such as detents, ratchets, brakes, and the like.

In various embodiments, the variable friction mechanism 124 may produce variable frictional feedback in response to receiving signals from the processing unit 111 and/or other sources. The variable frictional feedback may correspond to operational states, events, or other conditions at the electronic watch, including a rotational position of the crown 121, inputs received at the input devices 130, outputs provided by the output devices 132, and the like. The variable friction mechanism 124 may be electrically coupled to the processing unit 111 or another circuit of the electronic device 100, for example via a connector 158*e* and/or the shaft 122.

In some cases, the crown 121 may include a conductive portion that may be used to perform an ECG measurement. The crown body 120 may define a conductive surface for receiving touch inputs. In some cases, the conductive surface functions as an electrode to sense voltages or signals indicative of one or more touch inputs and/or biological parameters, such as an electrocardiogram, of a user in contact with the conductive surface.

The enclosure 116 may define another touch-sensitive or conductive surface that is electrically coupled to the processing unit 111 and also functions as an electrode. The processing unit 111 may determine an electrocardiogram using outputs of the electrodes of the crown body 120 and the enclosure 116. In various embodiments, the crown 121 is electrically isolated from the enclosure 116, for example to allow separate measurements at the electrodes. In various embodiments, the crown body 120 may be electrically coupled to the processing unit 111 or another circuit of the electronic device 100, for example via a connector 158*a* and/or the shaft 122.

In various embodiments, the display 134 may be disposed at least partially within the enclosure 116. The display 134 provides a graphical output, for example associated with an operating system, user interface, and/or applications of the electronic device 100. In one embodiment, the display 134 includes one or more sensors and is configured as a touch-sensitive (e.g., single-touch, multi-touch) and/or force-sensitive display to receive inputs from a user. The display 134 is operably coupled to the processing unit 111 of the electronic device 100, for example by a connector 158*d*.

In various embodiments, a graphical output of the display 134 is responsive to inputs provided at the crown 121, the display, or another input device 130. For example, the processing unit 111 may be configured to modify the graphical output of the display 134 in response to determining an electrocardiogram, receiving rotational inputs, receiving translational inputs, or receiving touch inputs. In some cases, the variable frictional feedback produced by the variable friction mechanism 124 is responsive to or otherwise corresponds to the graphical output of the display 134.

The display 134 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 134 is positioned beneath and viewable through a cover sheet that forms at least a portion of the enclosure 116.

Broadly, the input devices 130 may detect various types of input, and the output devices 132 may provide various types of output. The processing unit 111 may be operably coupled to the input devices 130 and the output devices 132, for example by connectors 158*b* and 158*c*. The processing unit 111 may receive input signals from the input devices 130, in response to inputs detected by the input devices. The processing unit 111 may interpret input signals received from one or more of the input devices 130 and transmit output signals to one or more of the output devices 132. The output signals may cause the output devices 132 to provide one or more outputs. Detected input at one or more of the input devices 130 may be used to control one or more functions of the device 100. In some cases, one or more of the output devices 132 may be configured to provide outputs that are dependent on, or manipulated in response to, the input detected by one or more of the input devices 130. The outputs provided by one or more of the output devices 132 may also be responsive to, or initiated by, a program or application executed by the processing unit 111 and/or an associated companion device. Examples of suitable processing units, input device, output devices, and displays, are discussed in more detail below with respect to FIG. 15.

Figure 2A:
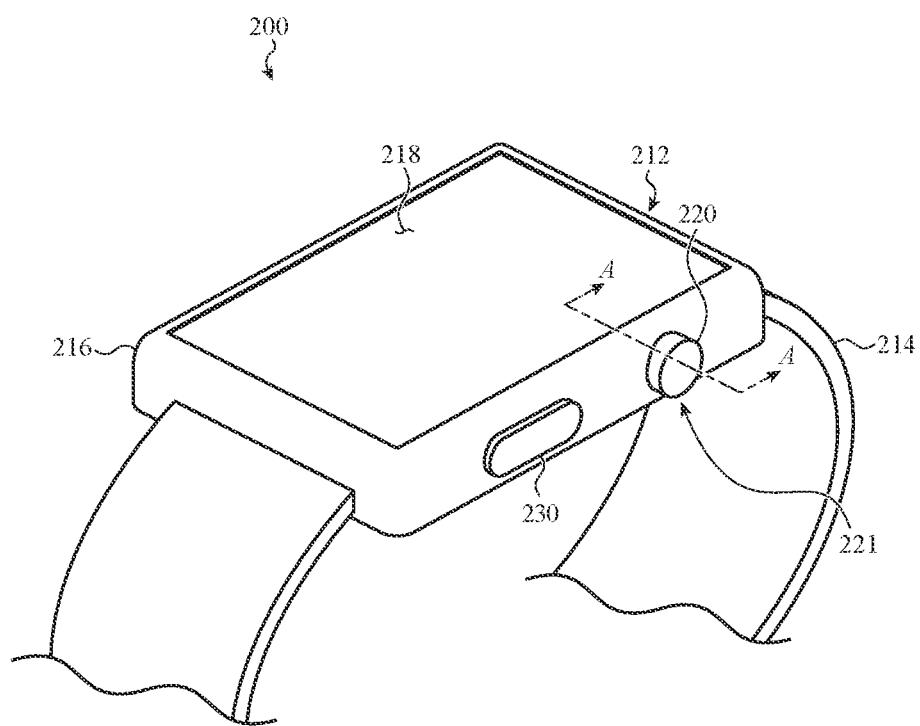
FIG. 2A shows an example of a watch that incorporates a crown.

FIG. 2A shows an example of a watch 200 (e.g., an electronic watch) that incorporates a crown 221 as described herein. The watch may include a watch body 212 and a watch band 214. Other devices that may incorporate a crown include other wearable electronic devices, other timekeeping devices, other health monitoring or fitness devices, other portable computing devices, mobile phones (including smart phones), tablet computing devices, digital media players, virtual reality devices, audio devices (including earbuds and headphones), and the like.

The watch body 212 may include an enclosure 216. The enclosure 216 may include a front side housing member that faces away from a user's skin when the watch 200 is worn by a user, and a back side housing member that faces toward the user's skin. Alternatively, the enclosure 216 may include a singular housing member, or more than two housing members. The one or more housing members may be metallic, plastic, ceramic, glass, or other types of housing members (or combinations of such materials).

A cover sheet 218 may be mounted to a front side of the watch body 212 (i.e., facing away from a user's skin) and may protect a display mounted within the enclosure 216. The display may be viewable by a user through the cover sheet 218. In some cases, the cover sheet 218 may be part of a display stack, which display stack may include a touch sensing or force sensing capability. The display may be configured to depict a graphical output of the watch 200, and a user may interact with the graphical output (e.g., using a finger, stylus, or other pointer). As one example, the user may select (or otherwise interact with) a graphic, icon, or the like presented on the display by touching or pressing (e.g., providing touch input) on the display at the location of the graphic. As used herein, the term "cover sheet" may be used to refer to any transparent, semi-transparent, or translucent surface made out of glass, a crystalline material (such as sapphire or zirconia), plastic, or the like. Thus, it should be appreciated that the term "cover sheet," as used herein, encompasses amorphous solids as well as crystalline solids. The cover sheet 218 may form a part of the enclosure 216. In some examples, the cover sheet 218 may be a sapphire cover sheet. The cover sheet 218 may also be formed of glass, plastic, or other materials.

In some embodiments, the watch body 212 may include an additional cover sheet (not shown) that forms a part of the enclosure 216. The additional cover sheet may have one or more electrodes thereon. For example, the watch body 212 may include an additional cover sheet mounted to a back side of the watch body 212 (i.e., facing toward a user's skin). The one or more electrodes on the additional cover sheet may be used to determine a biological parameter, such as a heart rate, an ECG, or the like. In some cases, the electrodes are used in combination with one or more additional electrodes, such as a surface of a crown or other input device.

The watch body 212 may include at least one input device or selection device, such as a crown, scroll wheel, knob, dial, button, or the like, which input device may be operated by a user of the watch 200. In some embodiments, the watch 200 includes a crown 221 that includes a crown body 220 and a shaft (not shown in FIG. 2A). The enclosure 216 may define an opening through which the shaft extends. The crown body 220 may be attached and/or coupled to the shaft, and may be accessible to a user exterior to the enclosure 216. The crown body 220 may be user-rotatable, and may be manipulated (e.g., rotated, pressed) by a user to rotate or translate the shaft. The shaft may be mechanically, electrically, magnetically, and/or optically coupled to components within the enclosure 216. A user's manipulation of the crown body 220 and shaft may be used, in turn, to manipulate or select various elements displayed on the display, to adjust a volume of a speaker, to turn the watch 200 on or off, and so on. The enclosure 216 may also include an opening through which a button 230 protrudes. In some embodiments, the crown body 220, scroll wheel, knob, dial, button 230, or the like may be touch sensitive, conductive, and/or have a conductive surface, and a signal route may be provided between the conductive portion of the crown body 220, scroll wheel, knob, dial, button 230, or the like and a circuit within the watch body 212.

The enclosure 216 may include structures for attaching the watch band 214 to the watch body 212. In some cases, the structures may include elongate recesses or openings through which ends of the watch band 214 may be inserted and attached to the watch body 212. In other cases (not shown), the structures may include indents (e.g., dimples or depressions) in the enclosure 216, which indents may receive ends of spring pins that are attached to or threaded through ends of a watch band to attach the watch band to the watch body. The watch band 214 may be used to secure the watch 200 to a user, another device, a retaining mechanism, and so on.

In some examples, the watch 200 may lack any or all of the cover sheet 218, the display, the crown 221, or the button 230. For example, the watch 200 may include an audio input or output interface, a touch input interface, a force input or haptic output interface, or other input or output interface that does not require the display, crown 221, or button 230. The watch 200 may also include the aforementioned input or output interfaces in addition to the display, crown 221, or button 230. When the watch 200 lacks the display, the front side of the watch 200 may be covered by the cover sheet 218, or by a metallic or other type of housing member.

Figure 2B:
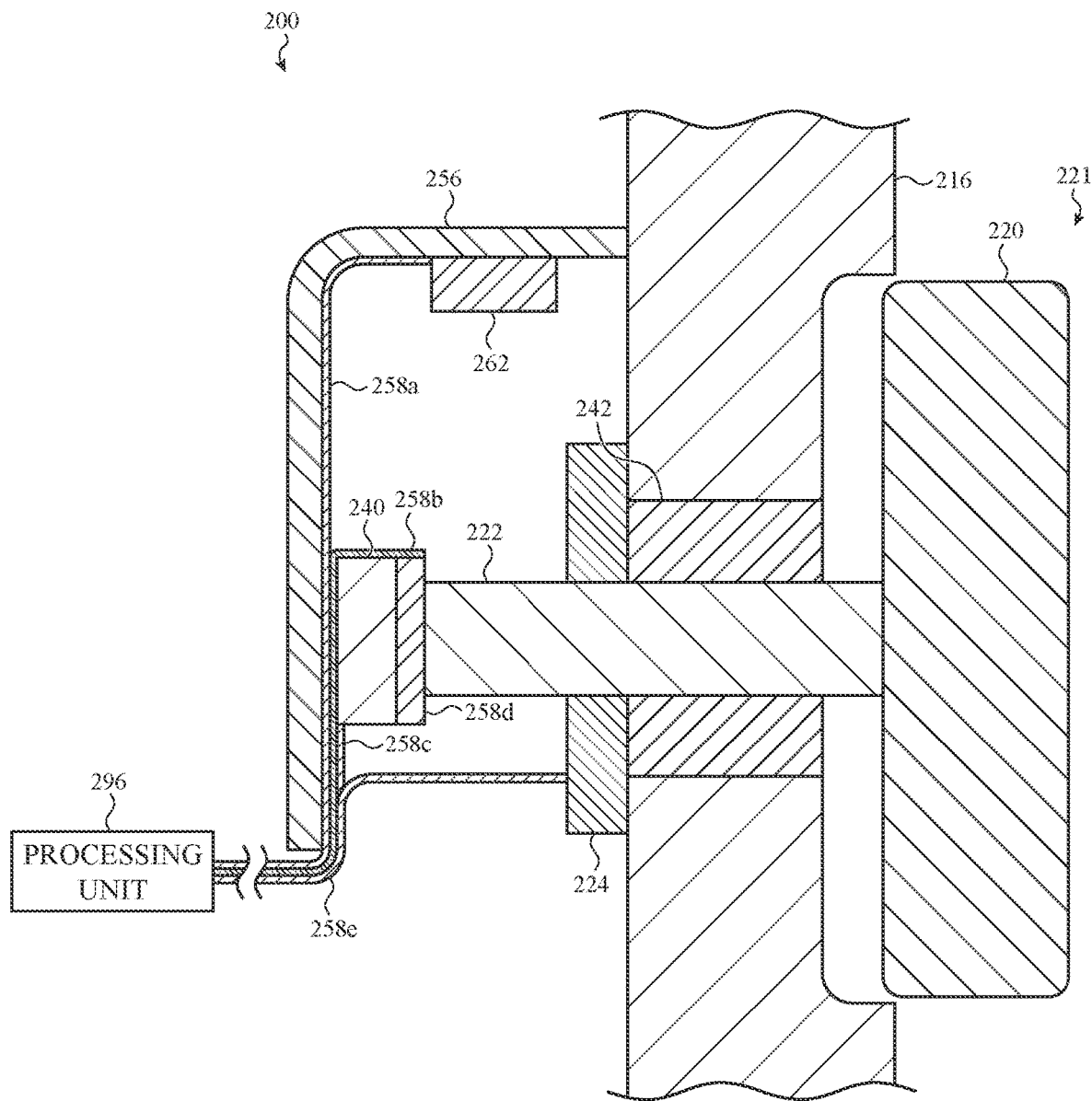
FIG. 2B shows a cross-section view of an example crown and a variable friction mechanism in an electronic watch, taken through section line A-A of FIG. 2A.

FIG. 2B shows a cross-section view of an example crown 221 and a variable friction mechanism 224 in the electronic watch 200, taken through section line A-A of FIG. 2A, as viewed from the front or rear face of a watch body. As shown in FIG. 2B, the crown 221 includes a crown body 220 and a shaft 222 coupled to the crown body. The crown body 220 may be rotated by a user of the electronic watch 200, to in turn rotate the shaft 222. In some cases, the crown body 220 may also be pulled or pushed by the user to translate the shaft 222 along its axis (e.g., left and right with respect to FIG. 2B). The crown body 220 may be operably coupled to a circuit within the enclosure 216 (e.g., a processing unit 296), but electrically isolated from the enclosure 216.

In some cases, the electronic watch 200 includes a variable friction mechanism 224 that produces a variable frictional feedback as the crown 221 is rotated. In some cases, the variable frictional feedback may correspond to inputs received by the electronic watch 200 (e.g., a rotational input received by the crown 221) and/or outputs provided by the electronic watch (e.g., a graphical output provided by a display). In some cases, the variable friction mechanism 224 produces the variable frictional feedback by varying a frictional force between the crown and the variable friction mechanism. The variable frictional feedback may result in a change in a resistive torque (e.g., a torque that resists rotation of the crown). In some cases, the variable frictional feedback may cause the crown 221 to require more or less torque to rotate. Similarly, the variable frictional feedback may cause the crown 221 to be easier or harder to rotate. In some cases, the variable frictional feedback may simulate one or more mechanisms, such as detents, ratchets, brakes, and the like.

The variable friction mechanism 224 may contact and exert a variable force on the crown 221 (e.g., a variable force having a component that is normal to a surface of the shaft 222, the crown body 220, and/or another component of the crown 221). As discussed above, the friction between the variable friction mechanism 224 and the crown 221 may be correlated with the force exerted on the crown by the variable friction mechanism. As a result, the force exerted on the crown 221 may be varied to vary the friction between the crown and the variable friction mechanism 224. The varying friction may be used to vary the resistive torque to produce variable frictional feedback as the crown 221 is rotated.

The variable friction mechanism 224 may be disposed within the enclosure, coupled to the enclosure, or otherwise positioned to contact the crown 221. In some cases, the variable friction mechanism 224 at least partially surrounds the shaft 222 and is configured to contact the shaft around a periphery of the shaft. The variable friction mechanism 224 may include one or more friction elements that contact the shaft 222 and one or more actuators coupled to the friction elements and configured to vary the force between the friction elements and the shaft, as discussed in more detail below with respect to FIGS. 5A-8.

The variable friction mechanism 224 may produce variable frictional feedback in response to receiving signals, such as from a processing unit 296 of the electronic watch 200. The variable frictional feedback may correspond to operational states, events, or other conditions at the electronic watch, including inputs received at the electronic watch 200 (e.g., touch inputs, rotational inputs, translational inputs), outputs of the electronic watch (e.g., graphical outputs, audio outputs, haptic outputs), applications and processes executing on the electronic watch, predetermined sequences, a rotational position of the crown, user interface commands (e.g., volume, zoom, or brightness controls, audio or video controls, scrolling on a list or page, and the like), and the like. The variable friction mechanism 224 may be operably coupled to the processing unit 296 via a connector 258*e* and/or via one or more additional components of the electronic device.

As discussed above, the shaft 222 extends through an opening in a device enclosure 216. In some cases, a collar 242 is disposed in an opening in the enclosure 216 and defines the opening through which the shaft 222 extends. In some embodiments, the collar 242 may be aligned with the opening in the enclosure 216. In some embodiments, the collar 242 be coupled to the enclosure 216 or another component internal to the enclosure (not shown) via threads on a male portion of the collar 242 and corresponding threads on a female portion of the enclosure 216. Optionally, one or more gaskets made of a synthetic rubber and fluoropolymer elastomer (e.g., Viton), silicone, or another compressible material may be disposed between the collar 242, the enclosure 216, and/or the shaft 222 to provide stability to the collar 242 and/or the shaft and/or provide a moisture barrier between the collar 242, the enclosure 216, and/or the shaft 222. Example gaskets are discussed in more detail below with respect to FIGS. 5A-5B.

In some cases, a rotation sensor 262 for detecting rotation of the crown 221 is disposed within the enclosure 216. In some cases, the rotation sensor 262 do not cause substantial friction on the crown 221, for example because the rotation sensor does not contact the crown. This allows for easy rotation, but it does not provide tactile feedback to the user. The rotation sensor 262 may include one or more light emitters and/or light detectors. The light emitter(s) may illuminate an encoder pattern or other rotating portion of the shaft 222 or shaft retainer (not shown). The encoder pattern may be carried on (e.g., formed on, printed on, etc.) the shaft 222 or the shaft retainer. In some cases, the light emitter(s) may illuminate trackable elements (e.g., surface defects of the shaft 222 or another component of the crown 221) instead of or in addition to an encoder pattern. The shaft 222 or another component of the crown 221 may reflect light emitted by the light emitter(s). In some cases, the reflected light is reflected off of the encoder pattern and/or the trackable elements.

The light detector(s) may receive the reflected light, and the processing unit 296 may determine a direction of rotation, speed of rotation, rotational position, translation, or other state(s) of the crown 221 based on the reflected light. In some embodiments, the rotation sensor 262 may detect rotation of the crown 221 by detecting rotation of the shaft 222. The rotation sensor 262 may be operably coupled to the processing unit 296 of the electronic device by a connector 258*a*.

In some cases, a translation sensor 240 for detecting translation of the crown 221 is disposed within the enclosure 216. In some embodiments, the translation sensor 240 includes an electrical switch, such as a tactile dome switch, which may be actuated or change state in response to translation of the crown 221. Thus, when a user presses on the crown body 220, the shaft 222 may translate into the enclosure 216 (e.g., into the enclosure of a watch body) and actuate the switch, placing the switch in one of a number of states. When the user releases pressure on the crown body 220 or pulls the crown body 220 outward from the enclosure 216, the switch may retain the state in which it was placed when pressed, or advance to another state, or toggle between two states, depending on the type or configuration of the switch.

In some embodiments, the translation sensor 240 includes one or more light emitters and/or light detectors. The light emitter(s) may illuminate an encoder pattern or other portion of the shaft 222 or shaft retainer. The light detector(s) may receive reflections of the light emitted by the light emitter(s), and a processing unit 296 may determine a direction of rotation, speed of rotation, rotational position, translation, or other state(s) of the crown 221. In some embodiments, the translation sensor 240 may detect translation of the crown 221 by detecting translation of the shaft 222. The translation sensor 240 may be operably coupled to a processing unit 296 of the electronic device by a connector 258c.

In various embodiments, the shaft 222 and the crown body 220 are operably coupled to a processing unit 296 and/or one or more other circuits of an electronic device. One or more connectors may operably couple the shaft 222 to the processing unit 296 and/or one or more other circuits. In various cases, a connector 258d is in mechanical and electrical contact with the shaft 222 or shaft retainer. In some cases, the connector 258d may be formed (e.g., stamped or bent) from a piece of metal (e.g., stainless steel). In other cases, the connector 258d may take on any of several forms and materials. When the shaft 222 is translatable, translation of the shaft 222 into the enclosure (e.g., into the enclosure of a watch body) may cause the connector 258d to deform or move. However, the connector 258d may have a spring bias or other mechanism which causes the connector 258d to maintain electrical contact with the shaft retainer or shaft, regardless of whether the shaft 222 is in a first position or a second position with reference to translation of the shaft 222.

In some embodiments of the crown 221, the connector 258d may include a conductive brush that is biased to contact a side of the shaft 222 or a side of the shaft retainer. The conductive brush may maintain electrical contact with the shaft 222 or shaft retainer through rotation or translation of the shaft 222, and may be electrically connected to the processing unit 296 and/or another circuit such that the shaft remains operably coupled to the processing unit as the shaft rotates. This allows the crown 221, and in particular the crown body 220, to remain operably coupled to the processing unit 296 as the crown 221 is manipulated (e.g., rotated and/or translated) by a user, which allows the electrode(s) on the crown to maintain their functionality as the crown is manipulated.

The processing unit 296 or other circuit of the electronic device may be operably coupled to the crown 221 via the connector 258d, the shaft retainer, and/or the shaft 222. In some cases, the connector 258d is coupled to the processing unit 296 via an additional connector 258b (e.g., a cable, flex, or other conductive member). In some cases, as shown in FIG. 2B, the connector 258d may be positioned between the shaft 222 and/or the shaft retainer and the translation sensor 240. The connector 258d may be attached to the shaft, the shaft retainer, and/or the translation sensor 240. In some cases, the connector 258d may be connected to the processing unit 296 via the translation sensor 240 and/or the connector 258c. In some cases, the connector 258d is integrated with the translation sensor 240. For example, the shaft and/or the shaft retainer may be operably coupled to the translation sensor 240 to couple the crown 221 to the processing unit 296.

In some embodiments, a bracket 256 may be attached (e.g., laser welded) to the enclosure 216 or another element within the enclosure. The rotation sensor 262 and/or the translation sensor 240 may be mechanically coupled to bracket 256, and the bracket may support the rotation sensor 262 and/or the translation sensor 240 within the enclosure 216. In the embodiment shown in FIG. 2B, the rotation sensor 262 and the translation sensor 240 are shown as separate components, but in various embodiments, the rotation sensor 262 and the translation sensor 240 may be combined and/or located in different positions from those shown.

The connectors 258a-e may be operably coupled to the processing unit 296, for example as discussed with respect to FIG. 15 below. The processing unit 296 may determine whether a user is touching the touch-sensitive surface of the crown body 220, and/or determine a biological parameter of the user based on a signal received from or provided to the user via the touch-sensitive surface of the crown body 220. In some cases, the processing unit 296 may determine other parameters based on signals received from or provided to the touch-sensitive surface of the crown body 220. In some cases, the processing unit 296 may operate the crown 221 and/or one or more additional electrodes as an electrocardiogram measurement device and provide an electrocardiogram to a user of the watch 200 including the crown 221.

As discussed above, in some cases, the crown body 220 includes a conductive portion defining a portion of the external surface of the crown body. In some cases, the crown body 220 defines the touch-sensitive surface, and is operably coupled to the shaft 222. The crown body 220 may be a separate part that is mechanically coupled to the shaft 222 or the crown body 220 and the shaft 222 may be a single part. The crown body 220 may function as an electrode as discussed above.

In various embodiments, the shaft 222 and the crown body 220 may be formed of any suitable conductive material or combination of materials, including titanium, steel, brass, ceramic, doped materials (e.g., plastics), or the like. One or more surfaces of the crown body 220 and/or the shaft 222 may be coated or otherwise treated to prevent or mitigate corrosion, wear, grounding effects, and the like. Coating processes may include electrophoretic deposition, physical vapor deposition, and the like. The shaft 222 and/or the crown body 220 may include various features for coupling the shaft to the enclosure, a collar, and/or other component(s) of the electronic device. In some embodiments, one or more attachment mechanism(s) may mechanically couple the crown body 220 to other components of the crown 221. In some cases, an attachment mechanism that mechanically and/or operably couples the crown body 220 to the shaft 222 also mechanically couples the crown body 220 to other components of the crown 221.

In some embodiments, one or more components of the crown 221 may have a conductive surface covered by a thin non-conductive coating. The non-conductive coating may provide a dielectric for capacitive coupling between a conductive surface and a finger of a user of the crown 221 (or an electronic watch or other device that includes the crown 221). In the same or different embodiments, the crown 221 may have a non-conductive coating on a surface of the crown body 220 facing the enclosure 216. In some examples, the conductive material(s) may include a PVD deposited layer of aluminum titanium nitride (AlTiN) or chromium silicon carbonitride (CrSiCN).

In some cases, the crown body 220 includes one or more non-conductive portions, such as an outer crown body that surrounds a conductive inner crown body. The outer crown body may be formed of any suitable material, including conductive and non-conductive materials (e.g., aluminum, stainless steel, ceramics, or the like). The crown body 220 may include a conductive portion, such as an inner crown body, which defines the touch-sensitive surface for receiving touch inputs, and an outer crown body at least partially surrounding the conductive portion. In some embodiments, the outer crown body is electrically isolated from the inner crown body to prevent electrical grounding of the inner crown body with other components of the electronic device, such as the device enclosure 216, and/or to allow users to provide rotational and/or translational inputs at the crown 221 without accidentally providing touch inputs by contacting the touch-sensitive surface of the inner crown body.

In various embodiments, the crown 221 may include adhesive and/or other fasteners for coupling the components and/or coupling the crown 221 to an electronic device. Any gaps or empty spaces shown in FIG. 2B may be filled with adhesive or other substances to couple the components of the crown, electrically isolate the shaft from other components of the crown 221 and/or protect components of the crown (e.g., provide lubrication, mitigate corrosion, and the like). The example arrangements of components discussed with respect to FIG. 2B are for illustrative purposes, and are not meant to be limiting or exhaustive. In some cases, the crown 221 may include more or fewer components, and the illustrated components may be combined with one another and/or additional components. Similarly, the illustrated components may be divided into multiple separate components.

As discussed above, the variable friction mechanism may produce variable frictional feedback in response to receiving signals, such as from a processing unit of the electronic watch. The variable frictional feedback may correspond to operational states, events, or other conditions at the electronic watch, including inputs received at the electronic watch (e.g., touch inputs, rotational inputs, translational inputs), outputs of the electronic watch (e.g., graphical outputs, audio outputs, haptic outputs), applications and processes executing on the electronic watch, predetermined sequences, a rotational position of the crown, user interface commands (e.g., volume, zoom, or brightness controls, audio or video controls, scrolling on a list or page, and the like), and the like.

Figure 3:
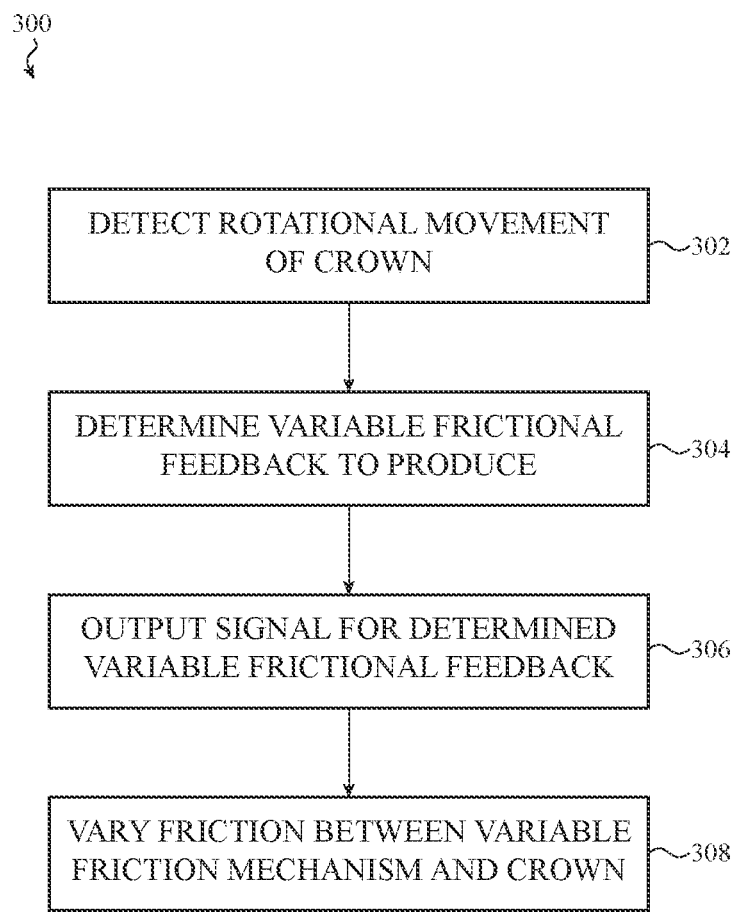
FIG. 3 shows an example method for providing variable frictional feedback as a crown of an electronic watch is rotated.

FIG. 3 shows an example method 300 for providing variable frictional feedback as a crown of an electronic watch is rotated. At block 302, the electronic watch detects a rotational input at a crown by detecting rotational movement of the crown (e.g., a crown 221). The electronic watch may detect the rotational input using a rotation sensor (e.g., rotation sensor 262) operably coupled to a processing unit (e.g., processing unit 296). Detecting the rotational input may include detecting rotational speed(s) and/or rotational position(s) of the crown. In some cases, the processing unit may determine whether the rotational input exceeds a threshold level of rotational movement (e.g., a threshold rotation speed or a threshold rotation distance). In some cases, the method only proceeds if the rotational input exceeds the threshold level of rotational movement.

At block 304, the processing unit determines a variable frictional feedback to produce as the crown rotates. In some cases, the variable frictional feedback is determined in response to detecting the rotational input at block 302. In some cases, the variable frictional feedback corresponds to one or more characteristics of the rotational input detected at block 302. For example, the variable frictional feedback may correspond to a rotational speed or position of the crown, an output associated with the rotational input, a user interface command associated with the user input, or the like. The processing unit may determine one or more characteristics of the rotational input.

In some cases, determining the variable frictional feedback may include determining an amount of variable frictional feedback to be produced. The amount of variable frictional feedback may be used to refer to an amount of resistive torque, an amount of change in resistive torque, a length of variable frictional feedback, a pattern of variable frictional feedback, or the like. The processing unit may determine an amount of the variable frictional feedback to be produced based, at least in part, on a characteristic of the rotational input.

At block 306, the processing unit outputs a signal that corresponds to the variable frictional feedback determined at block 304. The signal may be transmitted to a variable friction mechanism of the electronic watch (e.g., variable friction mechanism 224) to direct the variable friction mechanism to produce the variable frictional feedback.

At block 308, in response to receiving the signal from the processing unit, the variable friction mechanism varies a friction between the variable friction mechanism and the crown to produce the variable frictional feedback as the crown is rotated. In some cases, varying the friction between the variable friction mechanism and the crown varies a resistive torque associated with rotating the crown. As a result, a user rotating the crown may perceive (e.g., by touch) that the crown becomes harder or easier to rotate and/or that the rotation of the crown simulates one or more mechanisms, such as detents, ratchets, brakes, and the like.

In various embodiments, varying the friction between the variable friction mechanism and the crown includes increasing and/or decreasing the friction between the variable friction mechanism and the crown. The friction may be changed multiple times in response to a single signal, and multiple signals may be provided in sequence to produce multiple changes in the friction. The variable frictional feedback may be provided by changing the friction as the crown is rotated over a range of time, across a range of rotational positions of the crown, or some combination thereof. The variable frictional feedback may be provided by changing the friction in a continuous manner, at discrete times or rotational positions, and/or in a cyclical or otherwise patterned manner.

As discussed above, in some cases, the variable friction mechanism is positioned around or at least partially surrounds a portion of the crown. The variable friction mechanism may contact a surface of the crown to produce the friction between the variable friction mechanism and the crown. In some cases, the variable friction mechanism is capable of being brought out of contact with the crown, thereby removing the friction between the variable friction mechanism and the crown.

The method 300 is an example method for providing variable frictional feedback and is not meant to be limiting. Methods for providing variable frictional feedback may omit and/or add steps to the method 300. Similarly, steps of the method 300 may be performed in different orders than the example order discussed above.

FIGS. 4A-4D illustrate graphs of example variable frictional feedback sequences. As discussed above, in some cases, the variable friction mechanism provides variable frictional feedback as the crown is rotated, such as during a rotational input. The variable friction mechanism may vary the friction between the crown and the variable friction mechanism, which causes a varying resistive torque associated with rotating the crown. In some cases, the resistive torque associated with rotating the crown is proportional to the friction between the crown and the variable friction mechanism.

In various embodiments, the variable friction mechanism may be configured to increase the resistive torque for a first portion of a rotational input and decrease the resistive torque for a second portion of the rotational input. In some cases, the resistive torque may be increased and/or decreased in response to receiving a signal from a processing unit.

In some cases, the variable friction mechanism may increase and/or decrease the resistive torque in accordance with a predetermined number of times per complete rotation of the crown and/or at predetermined intervals of time. In some cases, an electronic watch may have multiple different graphical output modes in which different variable frictional feedback is provided. In some cases, in a first graphical output mode, the variable friction mechanism may alternately increase and decrease the resistive torque associated with rotating the crown in accordance with a first predetermined number of times per complete rotation of the crown and/or at first predetermined intervals of time having a first duration. In a second graphical output mode, the variable friction mechanism may alternately increase and decrease the resistive torque associated with rotating the crown in accordance with a second predetermined number of times per complete rotation of the crown and/or at predetermined intervals of time having a second duration.

Figure 4A:
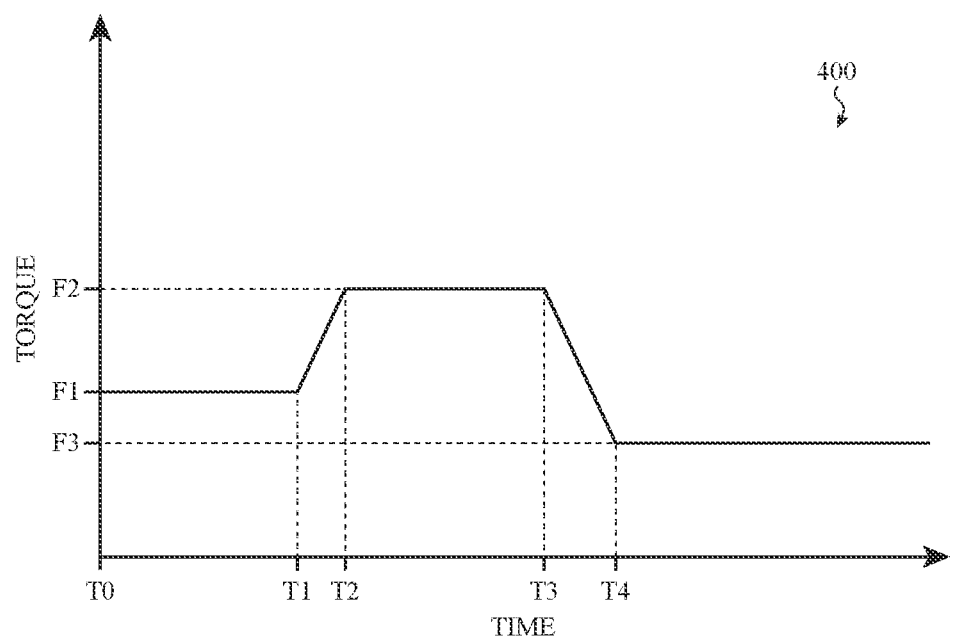
FIGS. 4A-4D illustrate graphs of example variable frictional feedback sequences.

In some cases, the variable friction mechanism may vary the friction between the crown and the variable friction mechanism, and thus the resistive torque associated with rotating the crown, over time. FIG. 4A illustrates a graph 400 of varying resistive torque over time for an example sequence of variable frictional feedback. From T0 to T1, the resistive torque at the crown is F1. From T1 to T2, the resistive torque increases to F2. The resistive torque may be increased, for example, in response to receiving a first signal from a processing unit as discussed above with respect to FIG. 3. From T2 to T3, the resistive torque remains constant at F2. Between T3 and T4, the resistive torque decreases to F3. The resistive torque may be decreased, for example, in response to receiving a second signal from the processing unit as discussed above with respect to FIG. 3. After T4, the resistive torque remains constant at F3. In various embodiments, changes in resistive torque at predetermined intervals of time may result in variable frictional feedback as the crown is rotated.

As discussed above, in some cases, the friction between the shaft and the variable friction mechanism, and thus the resistive torque associated with rotating the crown, is based on (e.g., is a function of) a rotational position of the crown. The rotational position of the crown may refer to an angular position of the crown across a range of positions. In some cases, the rotational position may correspond to an absolute angular position of the crown as it rotates (e.g., from 0 to 360 degrees as the crown completes one rotation). In some cases, the rotational position may correspond to a position of the crown that corresponds to an event or condition at the electronic watch, such as a volume or display brightness level, a position or selection on a scrollable or selectable page or list, a position in an audio track or video, as described in more detail with respect to FIGS. 12A-14B.

Figure 4B:
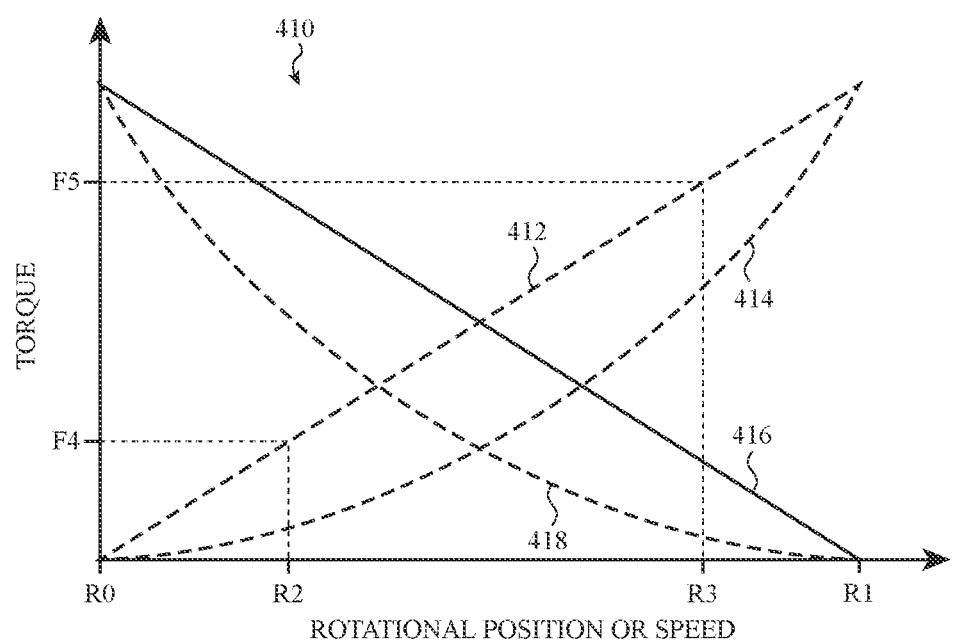

FIG. 4B illustrates a graph 410 of varying resistive torque versus rotational position or speed for example sequences of variable frictional feedback. As shown in FIG. 4B, the resistive torque associated with rotating the crown continuously increase or decrease between a first rotational position and a second rotational position. In some cases, as shown by curves 412 and 416, the increase or decrease may be linear. In some cases, as shown by curves 414 and 418, the increase or decrease may be non-linear. As described above, the variable frictional feedback may correspond to operational states, events, or other conditions at the electronic watch, including user interface commands. For example, the variable frictional feedback may be provided in accordance with a volume adjustment process in which the crown may be used to set and change a volume level at the electronic watch. The rotational position R0 may correspond to a first volume level and the rotational position R1 may correspond to a second different (e.g., higher or lower) volume level. A user may rotate the crown between R0 and R1 to adjust the output volume of the electronic watch or a connected device. In some cases, R0 corresponds to a volume of zero and R1 corresponds to a maximum volume. As shown by the example resistive torque curves 412, 414, 416, and 418, the friction between the variable friction mechanism and the shaft, and thus the resistive torque associated with rotating the crown, may continuously increase or decrease between R0 and R1 to give the user variable frictional feedback that indicates a current volume level in the range of possible volume levels. For example, with respect to curve 412, the resistive torque may have a value of F4 at a first rotational position R2 that corresponds to a first volume and the resistive torque may have a higher value of F5 at a second rotational position R3 that corresponds to a second volume that is closer to the maximum volume. In some cases, the variable frictional feedback may result in the crown to be substantially non-rotatable at position R0 and/or R1 to indicate the ends of the volume range to the user.

In some cases, the sequences of variable frictional feedback shown in FIG. 4B may correspond to a position on a scrollable and/or selectable page or list of items (e.g., selectable elements) displayed by the electronic watch. For example, R0 may correspond to the top of the page or list and R1 may correspond to the bottom of the page or list, and a user may rotate the crown between R0 and R1 to navigate along the page or list. As shown by the example resistive torque curves 412, 414, 416, and 418, the resistive torque between the variable friction mechanism and the shaft may continuously increase or decrease between R0 and R1 to give the user variable frictional feedback that indicates a position on the page or list. For example, with respect to curve 412, the resistive torque may have a value of F4 at a first rotational position R2 that corresponds to a first position and the resistive torque may have a higher value of F5 at a second rotational position R3 that corresponds to a second position that is closer to the end of the page or list. In some cases, the variable frictional feedback may result in the crown to be substantially non-rotatable at position R0 and/or R1 to indicate the top and/or bottom of the page or list to the user. For example, if a selected element in a scrollable list is not a last item of the scrollable list, the variable friction mechanism may allow rotation of the crown in both directions, and if the selected element in a scrollable list is the last item of the scrollable list, the variable friction mechanism may allow rotation of the crown in only one direction, such as the direction that allows scrolling away from the last item in the scrollable list. While the curves shown in FIG. 4B are continuous, variable frictional feedback may include non-continuous curves as well.

The examples above of variable frictional feedback corresponding to a volume level or position on a page or list are not meant to be limiting. In various embodiments, the variable frictional feedback may correspond to any number of operational states, events, or other conditions at the electronic watch, including inputs received at the electronic watch (e.g., touch inputs, rotational inputs, translational inputs), outputs of the electronic watch (e.g., graphical outputs, audio outputs, haptic outputs), applications and processes executing on the electronic watch, predetermined sequences, a rotational position of the crown, user interface commands (e.g., volume, zoom, or brightness controls, audio or video controls, scrolling on a list or page, and the like), and the like.

In some cases, the resistive torque associated with rotating the crown may vary based on a rotational speed of the rotation of the crown. For example, the resistive torque associated with rotating the crown at a first rotational speed may be greater or less than the resistive torque associated with rotating the crown at a second rotational speed. The resistive torque may continuously increase or decrease as a rotational speed changes and/or different ranges of rotational speed may have different associated resistive torque. As shown by the example resistive torque curves 412, 414, 416, and 418, the friction between the variable friction mechanism and the shaft, and thus the resistive torque associated with rotating the crown, may continuously increase or decrease between rotational speed R0 and rotational speed R1 to give the user variable frictional feedback based on the rotational speed of the crown. For example, with respect to curve 412, the resistive torque may have a value of F4 at a first rotational speed R2 and the resistive torque may have a higher value of F5 at a second, faster rotational speed R3. In some cases, the variable frictional feedback may result in the crown to be substantially non-rotatable at position R0 and/or R1 to indicate the ends of the volume range to the user. In some cases, as shown in curves 416 and 418, the resistive torque may have a first value for a first rotational speed and a second, lower value for a greater rotational speed. This allows for finer movements at slower speeds and easier rotation (e.g., for scrolling) at higher speeds.

In some cases, the variable frictional feedback includes alternating increases and decreases of resistive torque and/or cyclical or otherwise patterned changes in resistive torque. As discussed above, the variable frictional feedback may be used to provide a tactile output or haptic output that may be perceived through user touch. In some cases, the variable frictional feedback may simulate one or more mechanisms, such as detents, ratchets, brakes, and the like.

Figure 4C:
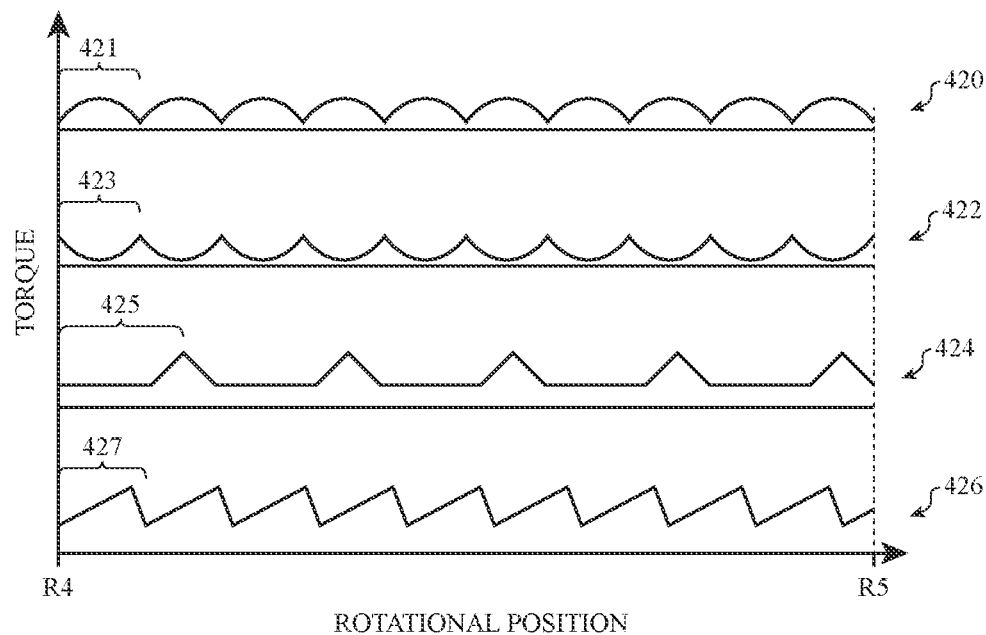

FIG. 4C illustrates curves 420, 422, 424, and 426 of resistive torque versus rotational position for example sequences of variable frictional feedback. Curves 420, 422, and 424 may result in a sensation to a user that simulates a detent mechanism in which the resistance to rotation changes based on the rotational position of the crown. Curve 426 may result in a sensation to a user (e.g., a haptic output or tactile output) that simulates a ratchet mechanism in which rotating the crown in a first direction has a different sensation than rotating the crown in a second direction.

As discussed above, the variable frictional feedback sequences shown in FIG. 4C may be described as cyclical, in which a pattern is repeated to create the variable frictional feedback. For example, in curve 420, a pattern 421 is repeated 10 times between rotational position R4 and rotational position R5. In curve 422, a pattern 423 is repeated 10 times between rotational position R4 and rotational position R5. In curve 424, a pattern 425 is repeated 5 times between rotational position R4 and rotational position R5. In curve 426, a pattern 427 is repeated 9 times between rotational position R4 and rotational position R5.

In some cases, the number of repetitions of a pattern may be varied to provide different variable frictional feedback. For example, in a first graphical output mode, a pattern may be repeated a first predetermined number of times per complete rotation of the crown and in a second graphical output mode, the pattern may be repeated a second predetermined number of times per complete rotation of the crown. For example, with respect to curve 422, in a first mode in which rotational position R5 has an angular difference of 360 degrees from rotational position R4, the pattern 421 repeats 10 times per complete rotation of the crown. In a second mode in which rotational position R5 has an angular difference of 180 degrees from rotational position R4, the pattern 421 repeats 10 times per half rotation of the crown or 20 times per complete rotation of the crown.

Figure 4D:
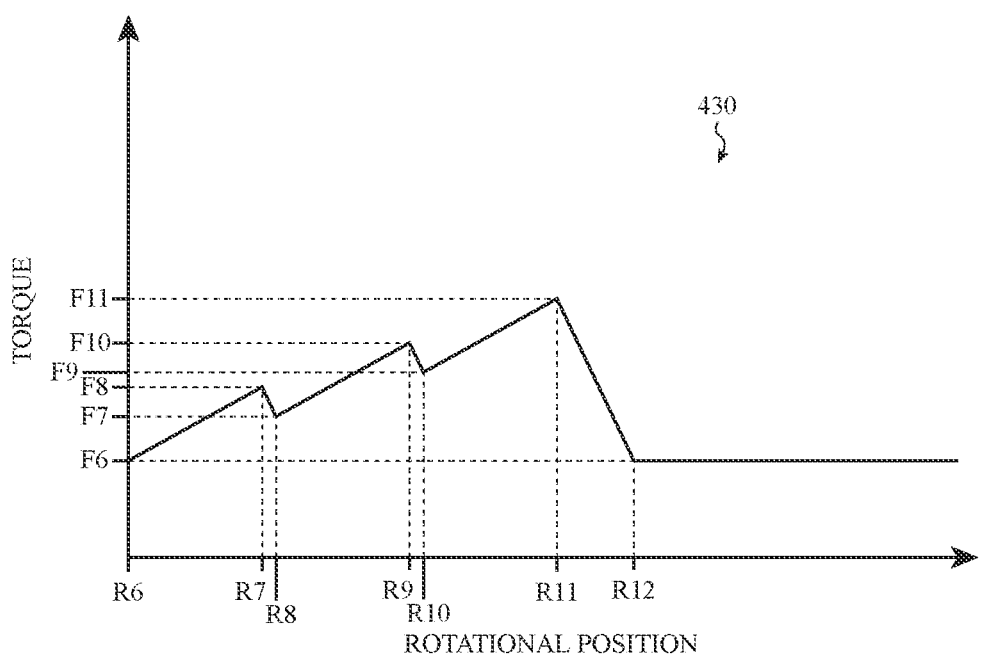

In some cases, the variable frictional feedback is not cyclical but includes one or more increases and/or decreases of resistive torque based on angular position or time. FIG. 4D illustrates a graph 430 of resistive torque versus rotational position for an example sequence of variable frictional feedback. As shown in graph 430, the resistive torque increases from F6 to F8 between rotational positions R6 and R7 and decreases from F8 to F7 between rotational positions R7 and R8. Similarly, the resistive torque increases from F7 to F10 between rotational positions R8 and R9 and decreases from F10 to F9 between rotational positions R9 and R10. The resistive torque increases from F9 to F11 between rotational positions R10 and R11 and decreases from F11 back to F6 between rotational positions R11 and R12. The variable frictional feedback provided in the sequence shown in FIG. 4D may simulate a combination of a continuous increase (or decrease) in resistive torque as shown and described with respect to FIG. 4B and simulated mechanisms as shown and described with respect to FIG. 4C.

In some cases, the decreases in resistive torque between R7 and R8 and R9 and R10 may represent feedback features that are perceptible to a user and correspond to an event or condition at the electronic watch. For example, the feedback features may correspond to a particular value of an input or user interface command, such as a particular volume, zoom, or brightness level, a particular location in an audio file or video (e.g., beginnings or ends of segments, chapters, scenes, episodes, and the like), a particular position on a list or page, and the like. The feedback features may also correspond to a change in the rotational input. For example, in the case of seeking in an audio track or video, a first feedback feature (e.g., the decrease in resistive torque between R7 and R8) may represent a first time from a current position (e.g., 10 seconds ahead) and a second feedback feature (e.g., the decrease in resistive torque between R9 and R10) may represent a second time from a current position (e.g., 1 minute ahead), allowing users to easily skip back and forth at different increments of time.

FIGS. 4A-4D are illustrative and are not meant to be limiting. Different sequences of variable frictional feedback may be provided in addition to what is shown in FIGS. 4A-4D. For example, graphs that are shown as resistive torque versus time may apply to sequences of resistive torque versus rotational position and/or speed, and vice versa. Additionally, the movement between rotational positions may be bidirectional, such that a particular sequence of variable frictional feedback may travel in either or both directions along the curves shown in FIGS. 4A-4D.

Figure 5A:
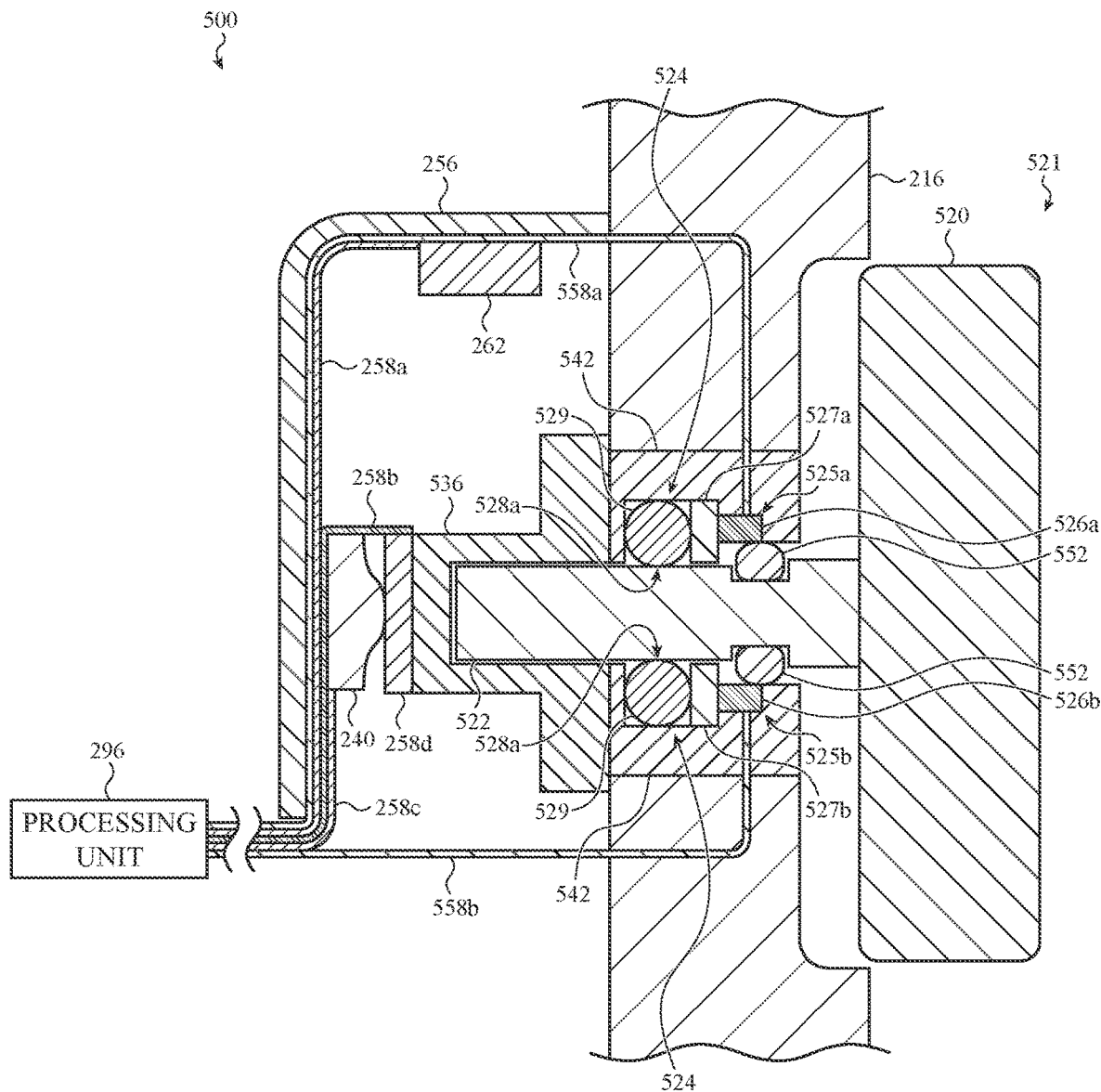
FIGS. 5A-5B show cross-section views of an example crown installed in an electronic watch having a variable friction mechanism.
Figure 5B:
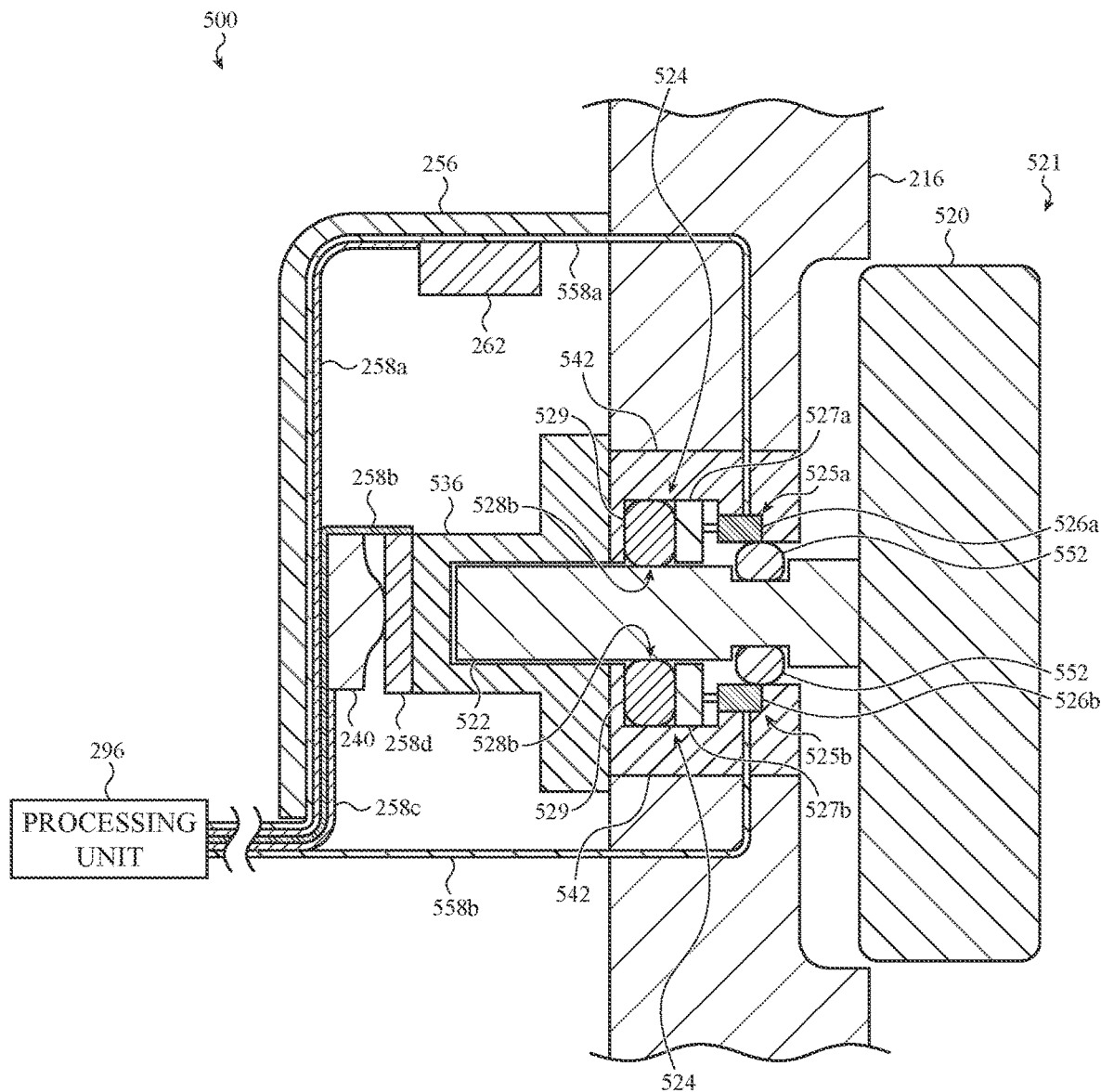

FIGS. 5A-5B illustrate an example of a crown 521 installed in an electronic watch 500 having a variable friction mechanism 524, taken through section line A-A of FIG. 2A, as viewed from the front or rear face of a watch body. The crown 521 includes a crown body 520 and a shaft 522, and may have similar functionality and/or features as the crowns discussed herein (e.g., crown 121, crown 221). The electronic watch 500 may have similar components and/or functionality as the electronic watches described herein (e.g., electronic watches 100, 200).

FIG. 5A depicts an example of a crown having a variable friction mechanism 524 positioned around a portion of the crown 521. The friction mechanism 524 may also be described as being positioned at least partially about the crown 512. In various embodiments, the variable friction mechanism 524 may extend all or part of the way around one or more components of the crown 512, such as the shaft 522.

As discussed above, in some cases, a variable friction mechanism 524 is positioned in the electronic watch 500 and adapted to produce a variable frictional feedback as the crown 521 is rotated by varying a frictional force between the crown and the variable friction mechanism. In some cases, the variable friction mechanism 524 may be disposed within a collar 542. The variable friction mechanism 524 may include one or more friction elements 529 that contact the crown 521 (e.g., the shaft 522 or the crown body 520) and exert a frictional force on the crown as the crown is rotated. In some cases, the friction element 529 is a ring of compressible (e.g., elastic) material disposed around a periphery of the shaft. The variable friction mechanism 524 may include one or more actuators 525a and 525b that variably compress the friction element 529 to change the frictional force exerted on the crown 521 by the friction element. By variably changing the compression of the friction element 529, variable frictional feedback as described herein may be provided. In some cases, the compression may occur in a direction that is substantially parallel to a rotational axis of the shaft 522. In some cases, the compression may occur in different directions, such as substantially perpendicular to a rotational axis of the shaft 522, radially inward toward the rotational axis of the shaft 522, and the like.

In FIG. 5A, the friction element 529 of the variable friction mechanism 524 is in an uncompressed configuration. In FIG. 5B, the friction element 529 is in a compressed configuration. As the friction element 529 is compressed in a direction that is substantially parallel to a rotational axis of the shaft 522, the compression causes the force applied by the friction element 529 to the shaft 522 to increase, thereby increasing the frictional force between the friction element and the shaft as the shaft rotates.

In some cases, compressing the friction element 529 causes a surface area of the friction element 529 that contacts the shaft 522 to increase. For example, as shown in FIG. 5A, in an uncompressed configuration, a portion of 528a the surface of the friction element 529 may contact the shaft 522. As shown in FIG. 5B, in a compressed configuration, a portion of 528b the surface of the friction element 529 that is larger than the portion 528a may contact the shaft 522. This may increase the frictional force between the friction element 529 and the shaft 522. The friction element 529 may be formed of a synthetic rubber and fluoropolymer elastomer, silicone, or another compressible material As shown in FIGS. 5A and 5B, each of the actuators 525a and 525b includes a base portion 526a and 526b and a contact portion 527a and 527b. The base portion may include a motor or other mechanism that causes the contact portion to move relative to the base portion to compress the friction element 529. The actuators 525a and 525b may be any suitable type of actuator for compressing the friction element 529, including hydraulic actuators, pneumatic actuators, electric actuators, piezoelectric actuators, electroactive polymers, and the like. In some cases, the friction element 529 may be an actuator itself. For example, the friction element 529 may be formed of an electroactive material that changes dimension to change the force exerted on the shaft 522 in response to a change in electrical current applied to the friction element. In various embodiments, the variable friction mechanism 524 may include any suitable number of actuators. In some cases, the electronic watch 500 includes one or more connectors 558a and 558b that operably couple the variable friction mechanism 524 to the processing unit 296.

As shown in FIGS. 5A and 5B, the collar 542 is disposed in an opening in the enclosure 216 and defines an opening through which the shaft 522 extends. As discussed above, in some embodiments, the variable friction mechanism 524 may be coupled and/or attached to the collar 542.

In some cases, the crown 521 includes a shaft retainer 536 to retain the crown 521 within the opening in the enclosure 216. In some cases, the shaft retainer 536 may be mechanically connected to the shaft 522, interior to the enclosure 216 (e.g., interior to a watch body housing), after the shaft is inserted through the opening in the enclosure 216 with the crown body 520 positioned exterior to the enclosure 216. In some cases, the shaft retainer 536 may include a nut, and the shaft 522 may have a threaded male portion that engages a threaded female portion of the nut. In some cases, the shaft retainer 536 may be conductive, or have a conductive coating thereon, and mechanical connection of the shaft retainer 536 to the shaft 522 may form an electrical connection between the shaft retainer 536 and the shaft 522. In some embodiments, the shaft retainer 536 may be integrally formed with the shaft 522, and the shaft 522 may be inserted through the opening in the enclosure 216 from inside the enclosure and then attached to the crown body 520 (e.g., the crown body 520 may screw onto the shaft 522).

As shown in FIGS. 5A and 5B, in some cases, the electronic watch 500 may include one or more gaskets made of a synthetic rubber and fluoropolymer elastomer (e.g., Viton), silicone, or another compressible material may be disposed between the collar 542, the enclosure 216, and/or the shaft 522 to provide stability to the collar and/or the shaft and/or provide a moisture barrier between the collar, the enclosure, and/or the shaft. In some cases, the gaskets include one or more O-rings 552 or other gaskets disposed around the shaft 522. In some cases, the O-rings 552 may provide a seal between the shaft 522 and the collar 542. The O-rings 552 may also function as an electrical insulator between the shaft 522 and the collar 542. In some embodiments, the O-rings 552 may be fitted to recesses in the shaft 522.

In some cases, the O-rings 552 may define a bearing surface between the shaft 522 and the electronic watch 500 (e.g., the collar 542). In some cases, the bearing surface contacts a surface of the collar 542 to stabilize the crown 521 and/or to facilitate consistent rotation of the crown 521. In some cases, the variable friction mechanism 524 (e.g., the friction element 529) may define an alternative or additional bearing surface between the shaft 522 and the electronic watch 500 (e.g., the collar 542). In some cases the one or more O-rings 552 may cooperate with the variable friction mechanism 524 to stabilize the crown 521 and/or to facilitate consistent rotation of the crown 521.

Figure 6:
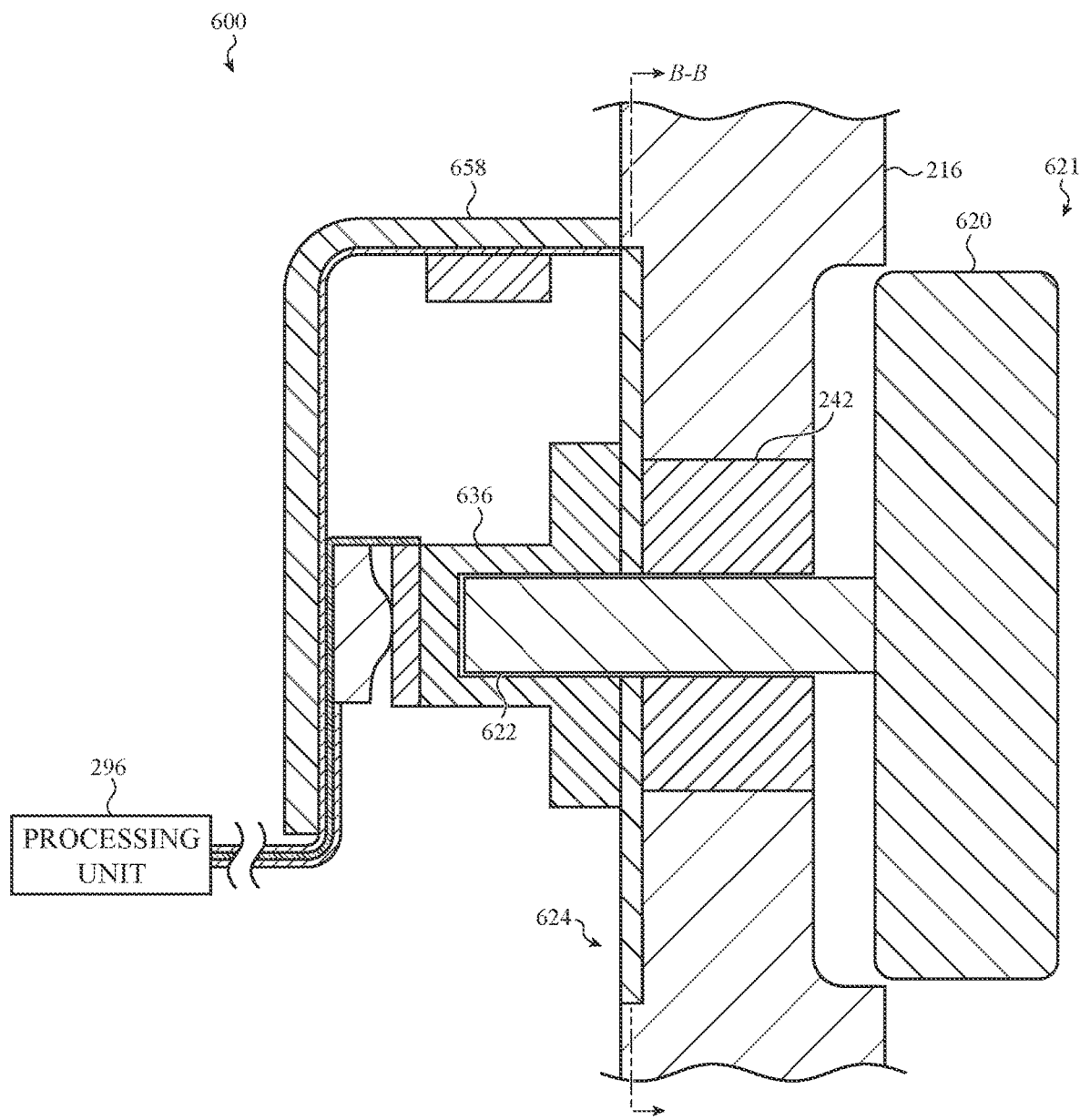
FIG. 6 shows a cross-section view of an example crown installed in an electronic watch having a variable friction mechanism.

FIG. 6 illustrates an example of a crown 621 installed in an electronic watch 600 having a variable friction mechanism 624 adapted to produce a variable frictional feedback as the crown is rotated, taken through section line A-A of FIG. 2A, as viewed from the front or rear face of a watch body. The crown 621 includes a crown body 620 and a shaft 622, and may have similar functionality and/or features as the crowns discussed herein (e.g., crown 121, crown 221, crown 521). The electronic watch 600 may have similar components and/or functionality as the electronic watches described herein (e.g., electronic watches 100, 200, 500).

Figure 7:
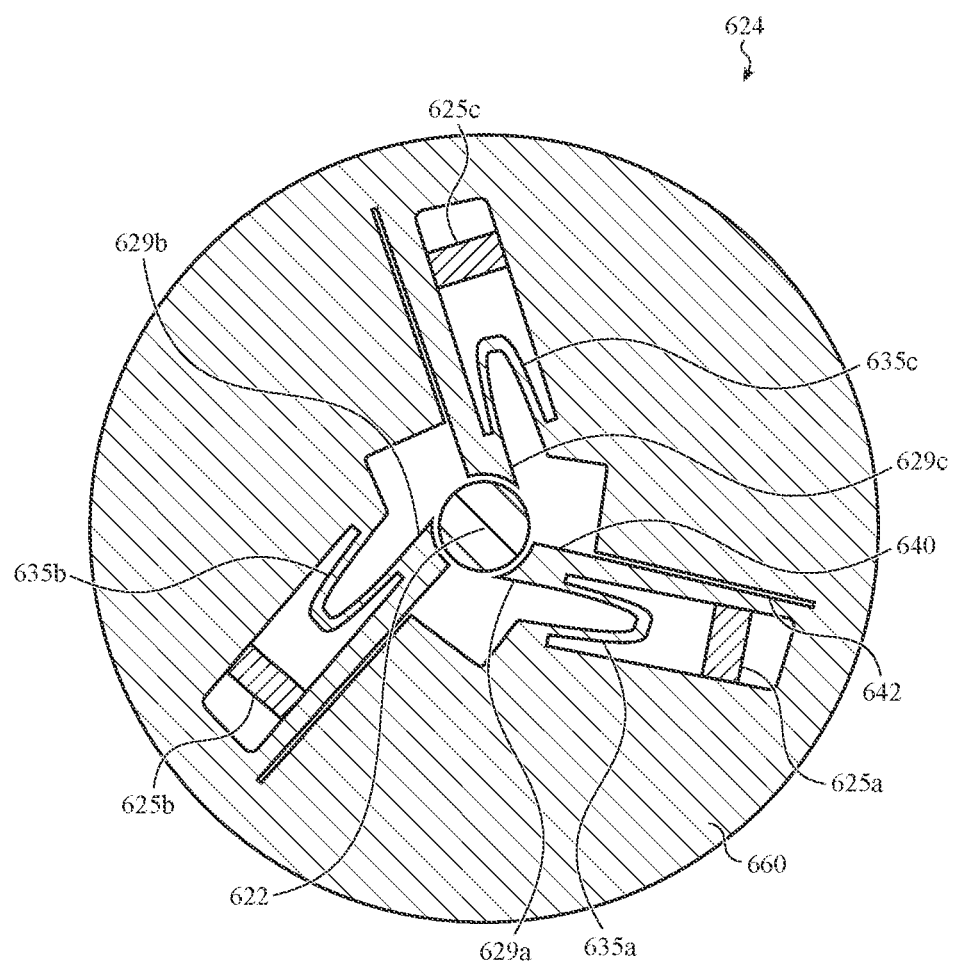
FIG. 7 illustrates an example of a variable friction mechanism taken through section line B-B of FIG. 6.

As discussed above, in some cases, a variable friction mechanism 624 is positioned in the electronic watch 600 and adapted to produce a variable frictional feedback as the crown 621 is rotated by varying a frictional force between the crown and the variable friction mechanism. In some cases, the variable friction mechanism 624 may be disposed in the enclosure 216. The variable friction mechanism 624 may be operably coupled to the processing unit 296 via a connector 658. FIG. 7 illustrates an example of the variable friction mechanism 624 taken through section line B-B of FIG. 6. FIG. 7 shows an example configuration of the variable friction mechanism 624.

The variable friction mechanism 624 may include one or more friction elements 629a, 629b, and 629c that contact the shaft 622 and exert a frictional force on the crown as the crown is rotated. In some cases, the friction elements 629a-c are disposed around a periphery of the shaft 622 and cooperate to at least partially surround the shaft. The variable friction mechanism 624 may include one or more actuators 625a, 625b, and 625c that each apply a force to a respective friction element 629a-c to change the frictional force exerted on the crown 621 by the friction element. As shown in FIG. 7, each of the friction elements 629a-c may be a cantilever beam structure having a fixed end 640 and a free end 642. The free end 642 may be adapted contact the shaft 222 to create friction between the friction element and the shaft. The fixed end 640 may be fixed with respect to an outer structure 660. Each actuator 625a-c may expand to exert a force against a respective friction element 629a-c to cause the friction element to move and/or to change a force exerted on the shaft by the free end 642 of the friction element.

As shown in FIG. 7, the variable friction mechanism 624 may include flexures 635a, 635b, and 639c positioned between each friction element 629a-c and the outer structure 660. In various embodiments, the flexures 635a-c may stabilize the friction elements 629a-c and/or oppose movement of the friction elements. For example, each flexure 635a-c may oppose a force applied by a respective actuator 625a-c.

In some cases, the cantilever beam structure of the friction elements 629a-c may allow the free end 642 of the friction element to move more or less than a movement or dimensional change of an actuator. For example, an actuator 625 may move a first distance (or changing length by the first distance) and cause a corresponding movement of a friction element 629 at the location of the actuator. Due to the beam structure and/or the flexure 635, the free end 642 of the friction element 629 may move a second, larger distance in response to the actuator moving the first distance. Similarly, the actuator 625 may exert a first force on the friction element 629 at the location of the actuator. Due to the beam structure and/or the flexure 635, the free end 642 of the friction element 629 may exert a second, smaller force on the shaft 622.

In some cases, the actuators 625a-c may be piezoelectric actuators, but any suitable type of actuator may be used. In some cases, the friction elements 629a-c and the flexures 635a-c are integrally formed with one another. For example, all of the friction elements 629a-c and the flexures 635a-c may be arranged in an array and formed from a single part.

Returning to FIG. 6, in some cases, the crown 621 includes a shaft retainer 636 to retain the crown 621 within the opening in the enclosure 216 similar to the shaft retainer 536 discussed above with respect to FIGS. 5A and 5B. In some cases, a variable friction mechanism may be combined with a shaft retainer, for example as discussed below with respect to FIG. 8.

Figure 8:
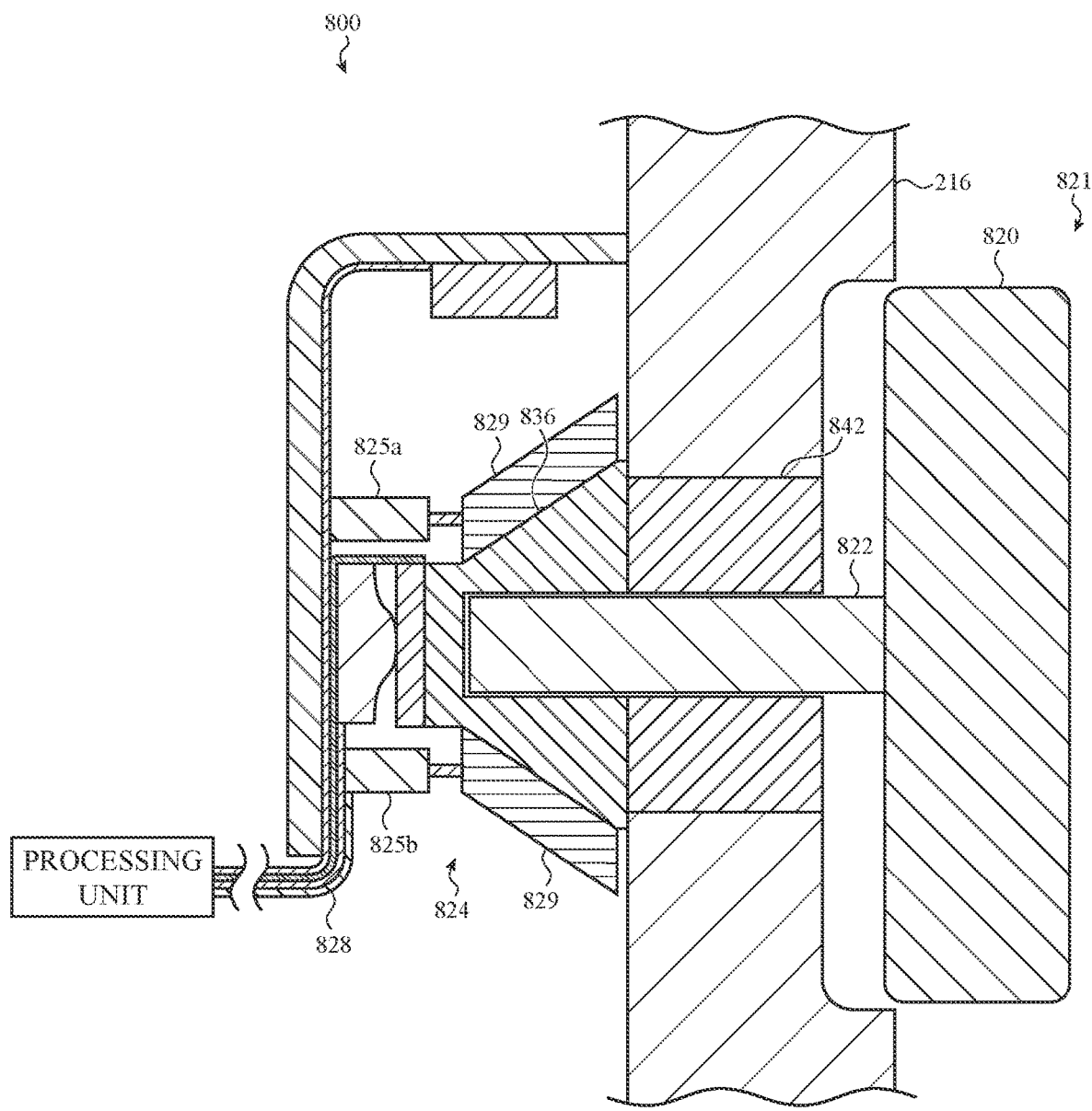
FIG. 8 shows a cross-section view of an example crown installed in an electronic watch having a variable friction mechanism.

FIG. 8 illustrates an example of a crown 821 installed in an electronic watch 800 having a variable friction mechanism 824 adapted to produce a variable frictional feedback as the crown 821 is rotated, taken through section line A-A of FIG. 2A, as viewed from the front or rear face of a watch body. The crown 821 includes a crown body 820 and a shaft 822, and may have similar functionality and/or features as the crowns discussed herein (e.g., crown 121, crown 221, crown 521, crown 621). The electronic watch 800 may have similar components and/or functionality as the electronic watches described herein (e.g., electronic watches 100, 200, 500, 600).

As discussed above, in some cases, a variable friction mechanism 824 is positioned in the electronic watch 800 and adapted to produce a variable frictional feedback as the crown 821 is rotated by varying a frictional force between the crown and the variable friction mechanism. In some cases, the variable friction mechanism may be combined with a shaft retainer 836. The shaft retainer 836 may be similar to the shaft retainers 536 and 636 discussed above with respect to FIGS. 5A-6. In some cases, the shaft retainer 836 may have a conical cross-section along an outer surface, as shown in FIG. 8. The variable friction mechanism 824 may include a friction element having a conical cross section on an inner surface that is configured to contact the outer surface of the shaft retainer 836, as shown in FIG. 8. The variable friction mechanism 824 may include actuators 825a and 825b that are configured to change a force between the friction element 829 and the shaft retainer 836, thereby changing a frictional force between the friction element and the crown 821. For example, the actuators 825a-b may cause the friction element 829 to travel left and right with respect to FIG. 8 to change the force between the friction element and the shaft retainer 836. The variable friction mechanism 824 may be operably coupled to the processing unit 296 by a connector 828. The processing unit 296 may provide signals to the variable friction mechanism 824 to change the friction between the friction element 829 and the shaft retainer 836. One or more changes in friction may be used to produce variable frictional feedback as discussed herein.

Figure 9:
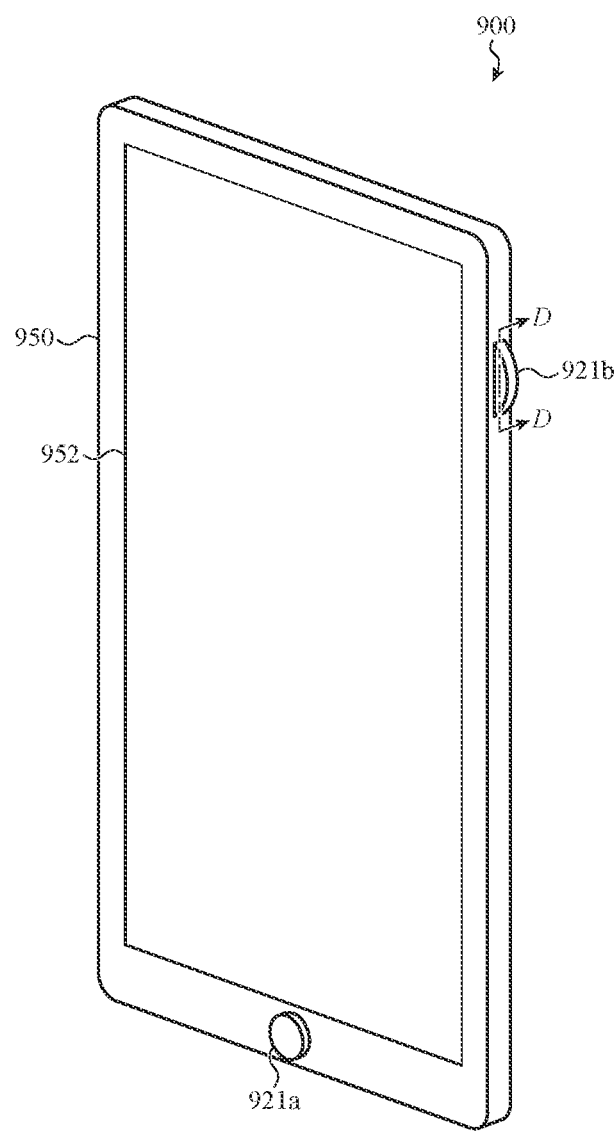
FIGS. 9-11 illustrate example electronic devices that may incorporate a variable friction mechanism for producing variable frictional feedback.

FIG. 9 illustrates an example electronic device 900 that may incorporate a variable friction mechanism for producing variable frictional feedback. The electronic device may include a crown or similar input devices 921a and 921b as described herein. The electronic device 900 is a portable electronic device such as a smartphone, tablet, portable, media player, mobile device, or the like. The electronic device 900 includes an enclosure 950 at least partially surrounding a display 952, and one or more input devices 921*a* and 921*b*. The input devices 921*a* and 921*b* of the electronic device 900 may be similar to the crowns (e.g., crowns 121, 221, 521, 621, 821) discussed herein and may include similar structure and/or functionality. The electronic device 900 can also include one or more internal components (not shown) typical of a computing or electronic device, such as, for example, one or more processors, memory components, network interfaces, and so on.

The input devices 921*a* and 921*b* may be configured to control various functions and components of the electronic device, such as a graphical output of a display 952, an audio output, powering the electronic device on and off, and the like. An input device 921*a-b* may be configured, for example, as a power button, a control button (e.g., volume control), a home button, or the like.

The enclosure 950 provides a device structure, defines an internal volume of the electronic device 900, and houses device components. In various embodiments, the enclosure 950 may be constructed from any suitable material, including metals (e.g., aluminum, titanium, and the like), polymers, ceramics (e.g., glass, sapphire), and the like. In one embodiment, the enclosure 950 is constructed from multiple materials. The enclosure 950 can form an outer surface or partial outer surface and protective case for the internal components of the electronic device 900, and may at least partially surround the display 952. The enclosure 950 can be formed of one or more components operably connected together, such as a front piece and a back piece. Alternatively, the enclosure 950 can be formed of a single piece operably connected to the display 952.

The display 952 can be implemented with any suitable technology, including, but not limited to liquid crystal display (LCD) technology, light emitting diode (LED) technology, organic light-emitting display (OLED) technology, organic electroluminescence (OEL) technology, or another type of display technology. The display 952 provides a graphical output, for example associated with an operating system, user interface, and/or applications of the electronic device 900. In one embodiment, the display 952 includes one or more sensors and is configured as a touch-sensitive (e.g., single-touch, multi-touch) and/or force-sensitive display to receive inputs from a user. In various embodiments, a graphical output of the display 952 is responsive to inputs provided to the input devices 921*a-b*.

Figure 10:
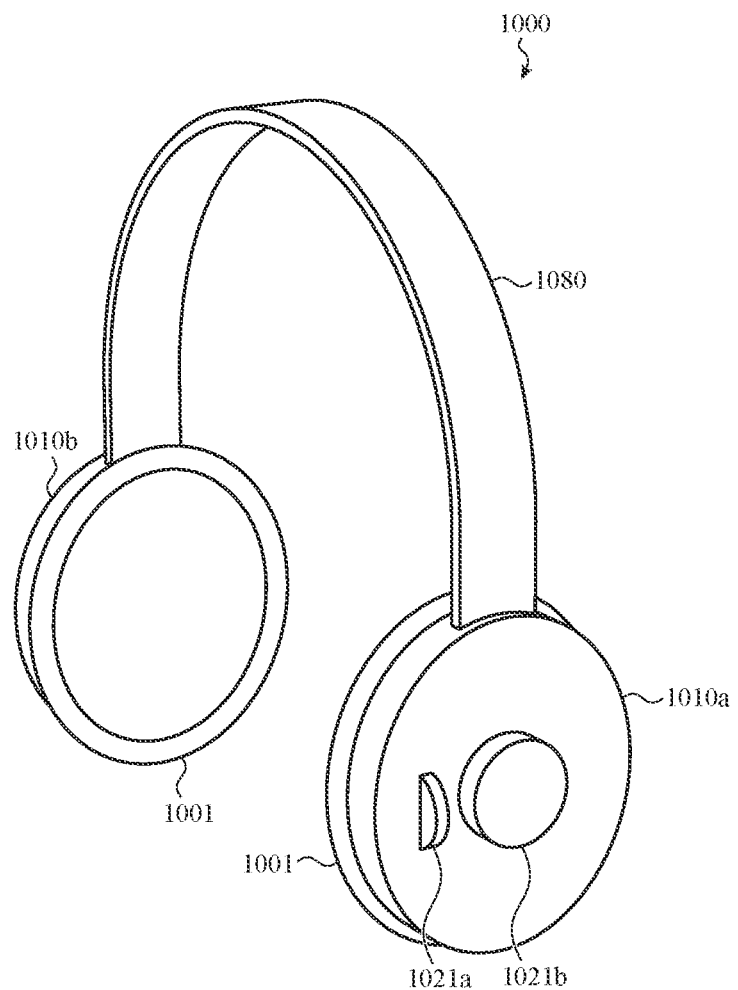

FIG. 10 illustrates an example electronic device 1000 that may incorporate a variable friction mechanism for producing variable frictional feedback. The electronic device 1000 may incorporate a crown or similar input device, configured as a wearable audio device. The electronic device 1000 is similar to the electronic devices discussed herein (e.g., electronic watches 100, 200, 500, 600, 800), and may include similar features and/or components. The electronic device 1000 is depicted as headphones. In some embodiments, the headphones 1000 include enclosures 1010*a* and 1010*b* coupled by a headband 1080. The headphones 1000 include one or more input devices (e.g., input devices 1021*a* and 1021*b*) coupled to the enclosures 1010. The input devices 1021*a* and 1021*b* of the headphones 1000 may be similar to the crowns (e.g., crowns 121, 221, 521, 621, 821) discussed herein and may include similar structure and/or functionality.

In some embodiments, each of the enclosures 1010 is configured to interface with the head and/or ear of a user to provide audio outputs to the user. Each enclosure may include an audio output element 1001. In various embodiments, an audio output of the audio output element(s) is responsive to inputs provided to the input devices 1021*a-b*. In The headband 1080 may be used to secure the headphones 1000 to the head of the user.

Figure 11:
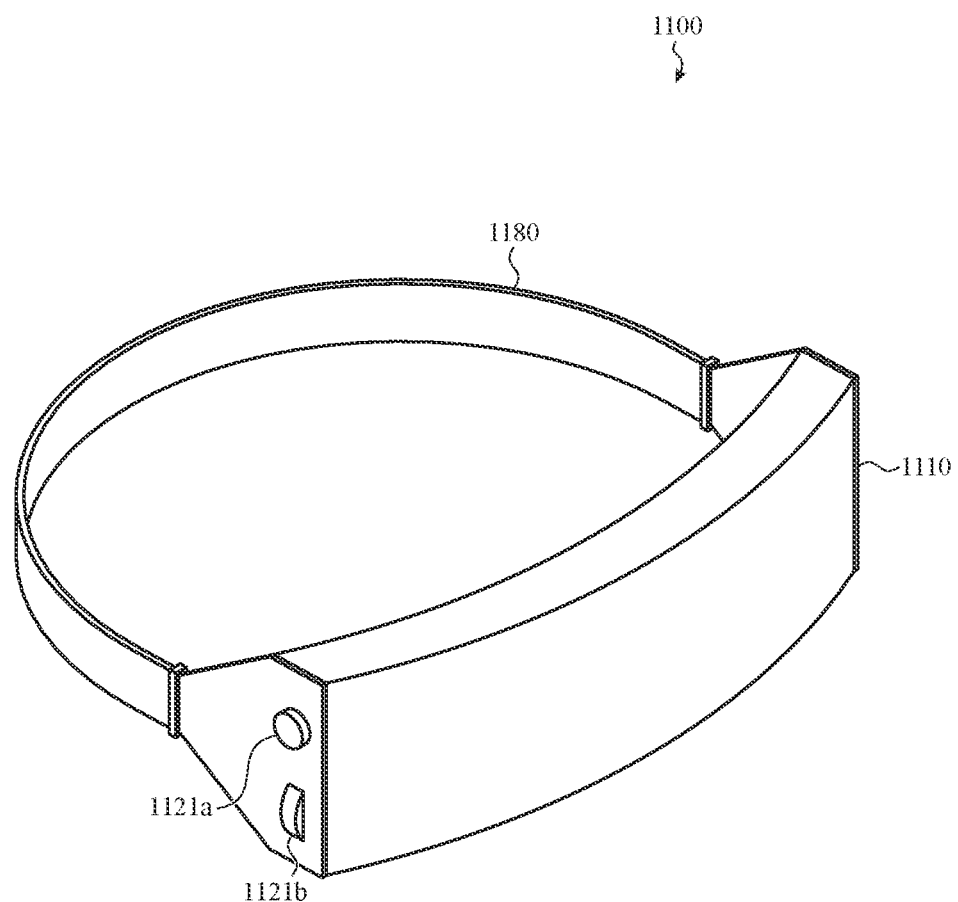

FIG. 11 illustrates an example electronic device 1100 that may incorporate a variable friction mechanism for producing variable frictional feedback, configured as a wearable device. The electronic device 1100 is similar to the electronic devices discussed herein (e.g., electronic watch 100), and may include similar features and/or components. The electronic device 1100 is depicted as a virtual reality device. In some embodiments, the virtual reality device 1100 includes an enclosure 1110 and a headband 1080. The virtual reality device 1100 includes one or more input devices (e.g., input devices 1121*a* and 1121*b*) coupled to the enclosure 1110. The input devices 1121*a* and 1121*b* of the virtual reality device 1100 may be similar to the crowns (e.g., crowns 121, 221, 521, 621, 821) discussed herein and may include similar structure and/or functionality.

In some embodiments, the enclosure 1110 is configured to interface with the head and/or ears of a user to provide visual and/or audio outputs to the user. The enclosure may include one or more displays and/or audio output elements. In various embodiments, a graphical output of the display(s) is responsive to inputs provided to the input devices 1121*a-b*. In various embodiments, an audio output of the audio output element(s) is responsive to inputs provided to the input devices 1121*a-b*. The headband 1180 may be used to secure the virtual reality device 1100 to the head of the user.

Figure 12A:
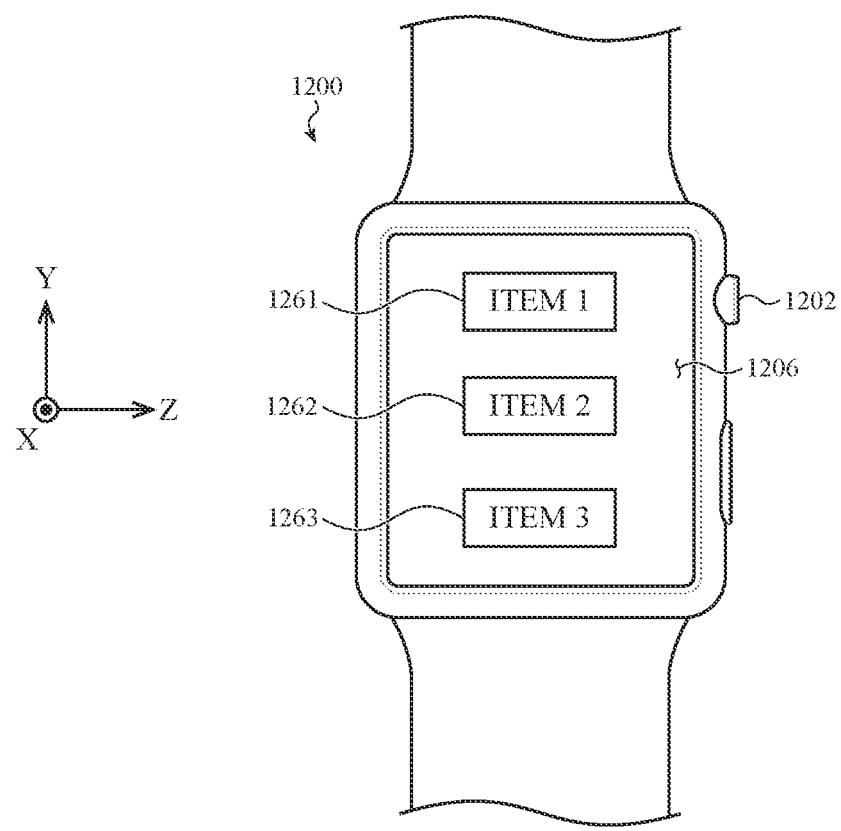
FIGS. 12A-14B generally depict examples of manipulating graphics displayed on an electronic device through inputs provided by force and/or rotational inputs to a crown of the device.

FIG. 12A depicts an example electronic device 1221 (shown here as an electronic watch) that may incorporate a variable friction mechanism for producing variable frictional feedback. The electronic device includes a crown 1202. The crown 1202 may be similar to the examples described above, and may receive force inputs along a first lateral direction, a second lateral direction, or an axial direction of the crown. The crown 1202 may also receive rotational inputs, for example at an outer crown body. A display 1206 provides a graphical output (e.g., shows information and/or other graphics). In some embodiments, the display 1206 may be configured as a touch-sensitive display capable of receiving touch and/or force input. In the current example, the display 1206 depicts a list of various items 1261, 1262, 1263, all of which are example indicia.

Figure 12B:
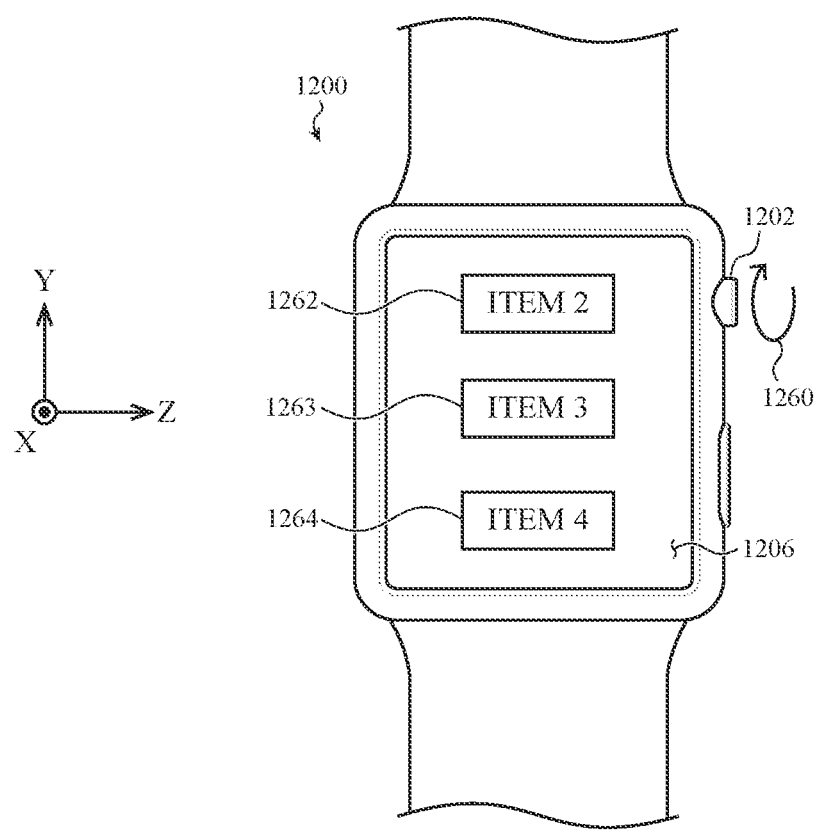

FIG. 12B illustrates how the graphical output shown on the display 1206 changes as the crown 1202 rotates, partially or completely (as indicated by the arrow 1260). Rotating the crown 1202 causes the list to scroll or otherwise move on the screen, such that the first item 1261 is no longer displayed, the second and third items 1262, 1263 each move upwards on the display, and a fourth item 1264 is now shown at the bottom of the display. This is one example of a scrolling operation that can be executed by rotating the crown 1202. Such scrolling operations may provide a simple and efficient way to depict multiple items relatively quickly and in sequential order. A speed of the scrolling operation may be controlled by the amount of rotational force applied to the crown 1202 and/or the speed at which the crown 1202 is rotated. Faster or more forceful rotation may yield faster scrolling, while slower or less forceful rotation yields slower scrolling. The crown 1202 may receive an axial force (e.g., a force inward toward the display 1206 or watch body) to select an item from the list, in certain embodiments.

In various embodiments, the electronic device 1221 may provide variable frictional feedback using the crown 1202, as discussed herein. In some cases, the variable frictional feedback corresponds to changes to the graphical output, such as those described with respect to FIGS. 12A and 12B.

For example, the variable frictional feedback may simulate an analog detent corresponding to each new item that moves onto the screen. Similarly, as discussed above, the variable frictional feedback may indicate a length of the list and/or a position with respect to a beginning or end of the list.

In some cases, the variable frictional feedback may correspond to states of the electronic device and/or transitions between states of the electronic device. For example, in a first state, a first selectable element (e.g., item 1261) may be selected or highlighted. In a second state, a second selectable element (e.g., item 1262) may be selected or highlighted. The crown 1202 may be used to transition between the first and second states, and the variable frictional feedback may be produced during the transition from the first state to the second state.

Figure 13A:
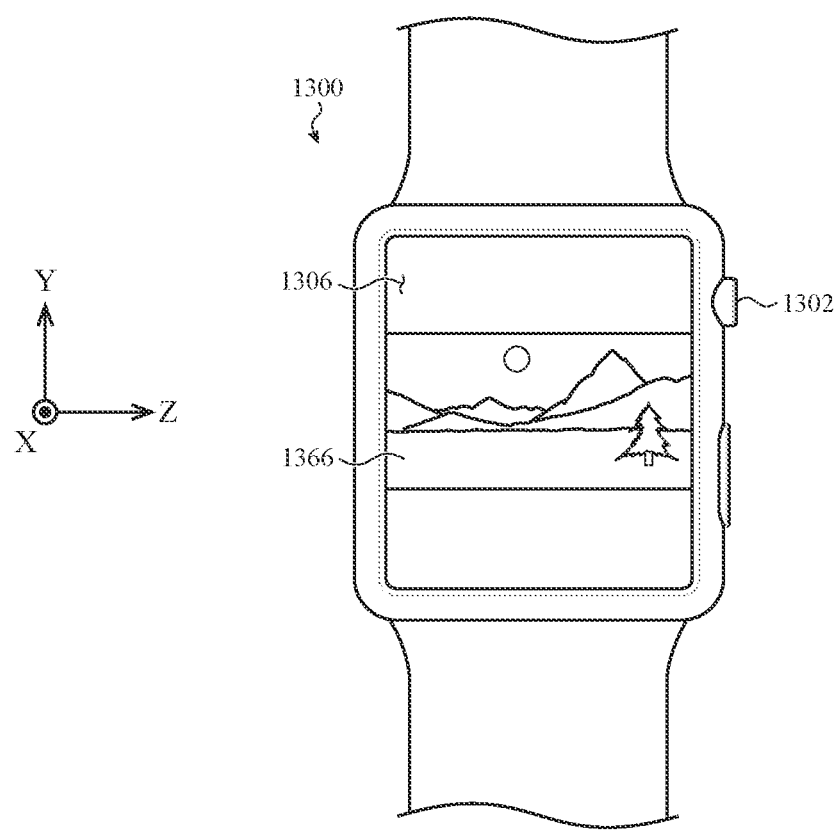
Figure 13B:
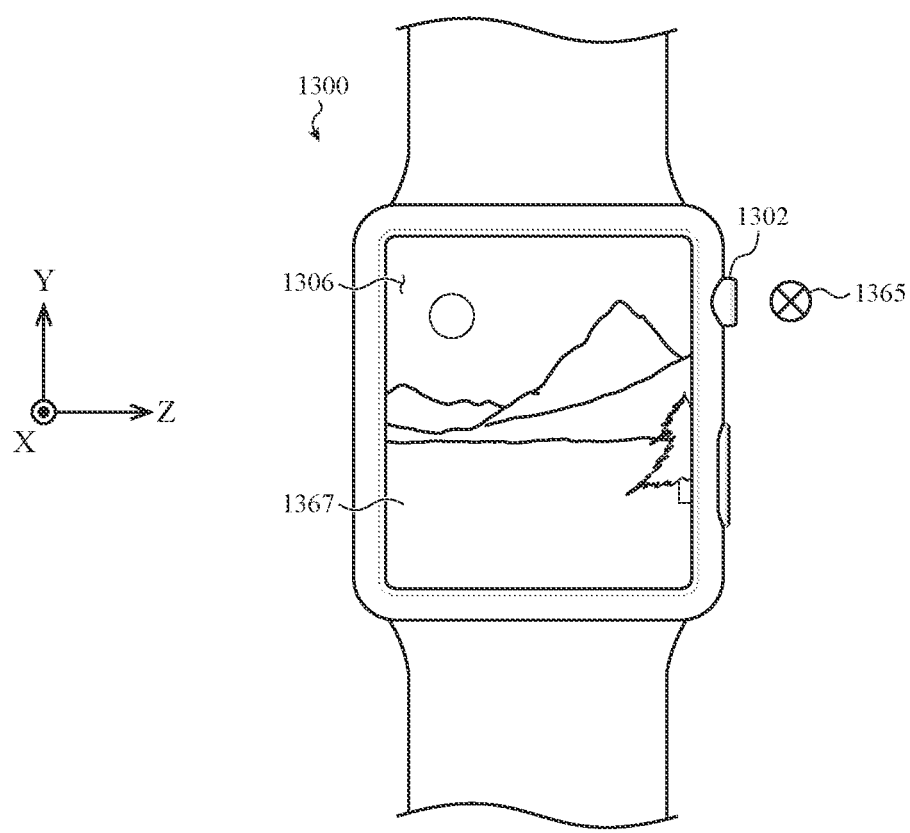

FIGS. 13A and 13B illustrate an example zoom operation. The display 1306 depicts a picture 1366 at a first magnification, shown in FIG. 13A; the picture 1366 is yet another example of an indicium. A user may apply a lateral force (e.g., a force along the x-axis) to the crown 1302 of the electronic device 1300 (illustrated by arrow 1365), and in response the display may zoom into the picture 1366, such that a portion 1367 of the picture is shown at an increased magnification. This is shown in FIG. 13B. The direction of zoom (in vs. out) and speed of zoom, or location of zoom, may be controlled through force applied to the crown 1302, and particularly through the direction of applied force and/or magnitude of applied force. Applying force to the crown 1302 in a first direction may zoom in, while applying force to the crown 1302 in an opposite direction may zoom out. Alternately, rotating or applying force to the crown 1302 in a first direction may change the portion of the picture subject to the zoom effect. In some embodiments, applying an axial force (e.g., a force along the z-axis) to the crown 1302 may toggle between different zoom modes or inputs (e.g., direction of zoom vs. portion of picture subject to zoom). In yet other embodiments, applying force to the crown 1302 along another direction, such as along the y-axis, may return the picture 1366 to the default magnification shown in FIG. 13A.

In various embodiments, the electronic device 1321 may provide variable frictional feedback using the crown 1302, as discussed herein. In some cases, the variable frictional feedback corresponds to changes to the zoom as described with respect to FIGS. 13A and 13B. For example, the variable frictional feedback may indicate various zoom levels (e.g., using simulated detents) such as 1×, 10×, 100×, etc. Similarly, as discussed above, the variable frictional feedback may indicate the current zoom level in relation to a maximum or minimum zoom level.

Figure 14A:
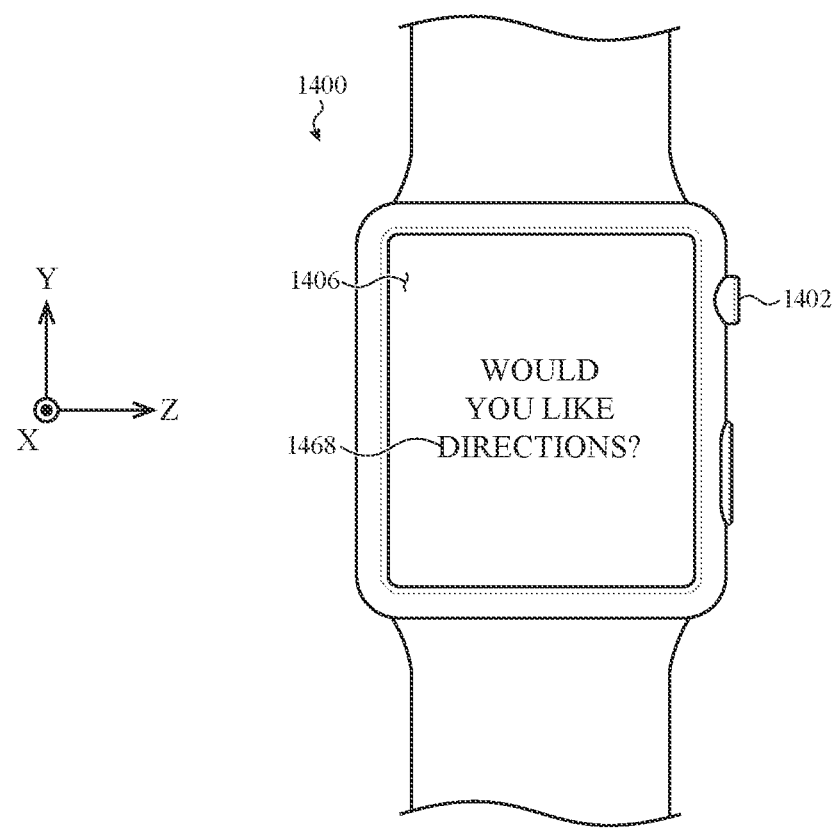
Figure 14B:
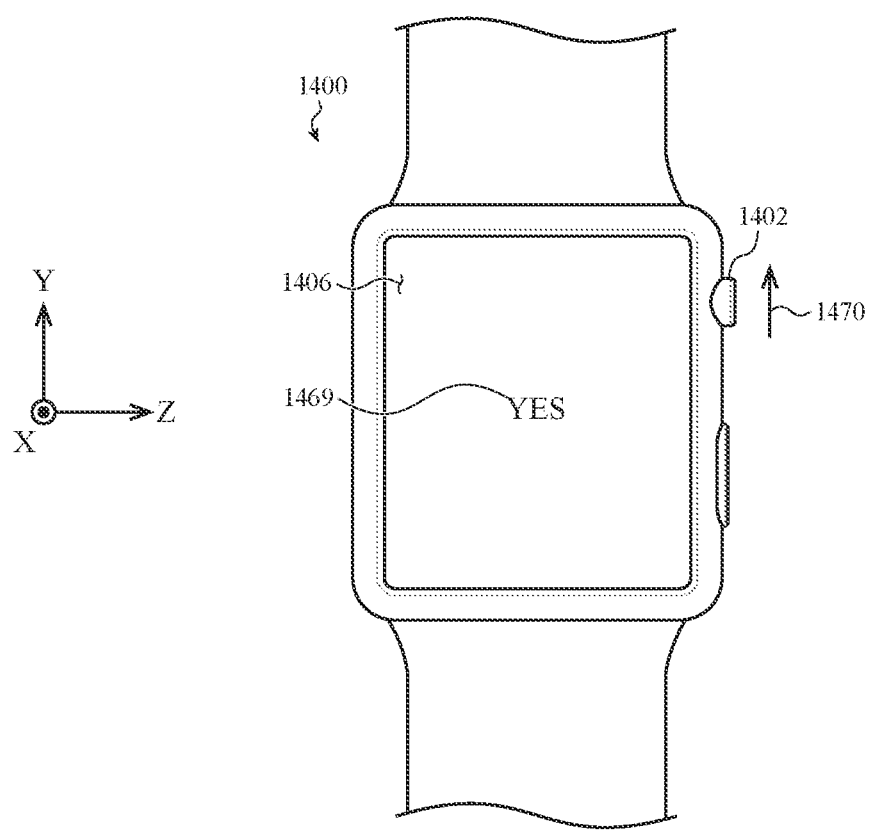

FIGS. 14A and 14B illustrate possible use of the crown 1402 to change an operational state of the electronic device 1400, provide a user interface command, transition between modes, or otherwise toggle between inputs. Turning first to FIG. 14A, the display 1406 depicts a question 1468, namely, "Would you like directions?" As shown in FIG. 14B, a lateral force may be applied to the crown 1402 (illustrated by arrow 1470) to answer the question. Applying force to the crown 1402 provides an input interpreted by the electronic device 1400 as "yes," and so "YES" is displayed as a graphic 1469 on the display 1406. Applying force to the crown 1402 in an opposite direction may provide a "no" input. Both the question 1468 and graphic 1469 are examples of indicia.

In the embodiment shown in FIGS. 14A and 14B, the force applied to the crown 1402 is used to directly provide the input, rather than select from options in a list (as discussed above with respect to FIGS. 12A and 12B).

In various embodiments, the electronic device 1421 may provide variable frictional feedback using the crown 1402, as discussed herein. In some cases, the variable frictional feedback corresponds to changes to the operational state of the electronic device 1400 described with respect to FIGS. 14A and 14B. In some cases, the variable frictional feedback corresponds to an operational state at the electronic device. For example, in a first operational state, a first variable frictional feedback may be provided, and in a second operational state, a second variable frictional feedback may be provided.

In various embodiments, operational states may include graphical output modes of the user interface of the electronic device, such as scrollable pages or lists, images, videos, user interfaces made of up graphical objects or icons, and the like. For example, in a first graphical output mode, for example in which a scrollable list is displayed, a first variable frictional feedback may be provided, and in a second graphical output mode, for example in which an image is displayed, a second variable frictional feedback may be provided. In some cases, operational states may include applications or commands executing on the electronic device. For example, in a user interface for a first application, a first variable frictional feedback may be provided, and in a user interface for a second application, a second variable frictional feedback may be provided.

As mentioned previously, force or rotational input to a crown of an electronic device may control many functions beyond those listed here. The crown may receive distinct force or rotational inputs to adjust a volume of an electronic device, a brightness of a display, or other operational parameters of the device. A force or rotational input applied to the crown may rotate to turn a display on or off, or turn the device on or off. A force or rotational input to the crown may launch or terminate an application on the electronic device. Further, combinations of inputs to the crown may likewise initiate or control any of the foregoing functions, as well.

In some cases, the graphical output of a display may be responsive to inputs applied to a touch-sensitive display (e.g., displays 1206, 1306, 1406, and the like) in addition to inputs applied to a crown. The touch-sensitive display may include or be associated with one or more touch and/or force sensors that extend along an output region of a display and which may use any suitable sensing elements and/or sensing techniques to detect touch and/or force inputs applied to the touch-sensitive display. The same or similar graphical output manipulations that are produced in response to inputs applied to the crown may also be produced in response to inputs applied to the touch-sensitive display. For example, a swipe gesture applied to the touch-sensitive display may cause the graphical output to move in a direction corresponding to the swipe gesture. As another example, a tap gesture applied to the touch-sensitive display may cause an item to be selected or activated. In this way, a user may have multiple different ways to interact with and control an electronic watch, and in particular the graphical output of an electronic watch. Further, while the crown may provide overlapping functionality with the touch-sensitive display, using the crown allows for the graphical output of the display to be visible (without being blocked by the finger that is providing the touch input).

Figure 15:
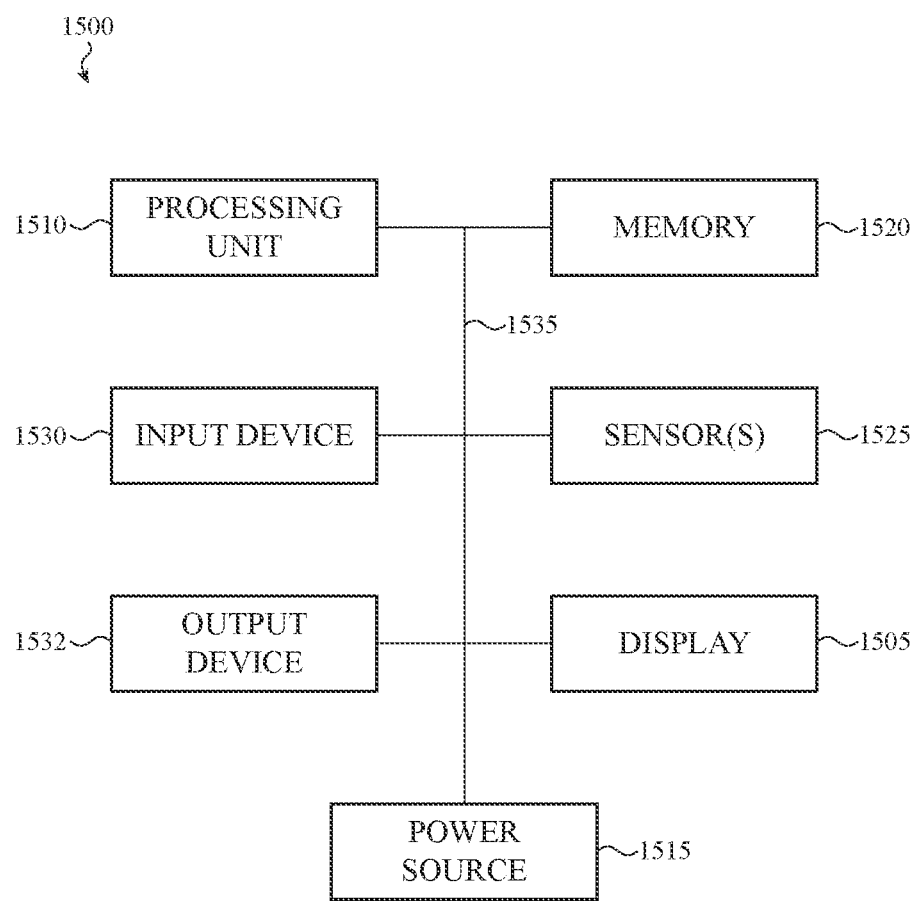
FIG. 15 shows a sample electrical block diagram of an electronic device such as a watch or other wearable electronic device.

FIG. 15 shows a sample electrical block diagram of an electronic device 1500 that may incorporate a variable friction mechanism for producing variable frictional feedback. The electronic device may in some cases take the form of any of the electronic watches or other wearable electronic devices described with reference to FIGS. 1-14, or other portable or wearable electronic devices. The electronic device 1500 can include a display 1505 (e.g., a light-emitting display), a processing unit 1510, a power source 1515, a memory 1520 or storage device, a sensor 1525, an input device 1530 (e.g., a crown, an), and an output device 1532 (e.g., a crown, a variable friction mechanism).

The processing unit 1510 can control some or all of the operations of the electronic device 1500. The processing unit 1510 can communicate, either directly or indirectly, with some or all of the components of the electronic device 1500. For example, a system bus or other communication mechanism 1535 can provide communication between the processing unit 1510, the power source 1515, the memory 1520, the sensor 1525, and the input device(s) 1530 and the output device(s) 1532.

The processing unit 1510 can be implemented as any electronic device capable of processing, receiving, or transmitting data or instructions. For example, the processing unit 1510 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1500 can be controlled by multiple processing units. For example, select components of the electronic device 1500 (e.g., a sensor 1525) may be controlled by a first processing unit and other components of the electronic device 1500 (e.g., the display 1505) may be controlled by a second processing unit, where the first and second processing units may or may not be in communication with each other. In some cases, the processing unit 1510 may determine a biological parameter of a user of the electronic device, such as an ECG for the user.

The power source 1515 can be implemented with any device capable of providing energy to the electronic device 1500. For example, the power source 1515 may be one or more batteries or rechargeable batteries. Additionally or alternatively, the power source 1515 can be a power connector or power cord that connects the electronic device 1500 to another power source, such as a wall outlet.

The memory 1520 can store electronic data that can be used by the electronic device 1500. For example, the memory 1520 can store electrical data or content such as, for example, audio and video files, documents and applications, device settings and user preferences, timing signals, control signals, and data structures or databases. The memory 1520 can be configured as any type of memory. By way of example only, the memory 1520 can be implemented as random access memory, read-only memory, Flash memory, removable memory, other types of storage elements, or combinations of such devices.

The electronic device 1500 may also include one or more sensors 1525 positioned almost anywhere on the electronic device 1500. The sensor(s) 1525 can be configured to sense one or more type of parameters, such as but not limited to, pressure, light, touch, heat, movement, relative motion, biometric data (e.g., biological parameters), and so on. For example, the sensor(s) 1525 may include a heat sensor, a position sensor, a light or optical sensor, an accelerometer, a pressure transducer, a gyroscope, a magnetometer, a health monitoring sensor, and so on. Additionally, the one or more sensors 1525 can utilize any suitable sensing technology, including, but not limited to, capacitive, ultrasonic, resistive, optical, ultrasound, piezoelectric, and thermal sensing technology. In some examples, the sensors 1525 may include one or more of the electrodes described herein (e.g., one or more electrodes on an exterior surface of a cover sheet that forms part of an enclosure for the electronic device 1500 and/or an electrode on a crown body, button, or other housing member of the electronic device).

In various embodiments, the display 1505 provides a graphical output, for example associated with an operating system, user interface, and/or applications of the electronic device 1500. In one embodiment, the display 1505 includes one or more sensors and is configured as a touch-sensitive (e.g., single-touch, multi-touch) and/or force-sensitive display to receive inputs from a user. For example, the display 1505 may be integrated with a touch sensor (e.g., a capacitive touch sensor) and/or a force sensor to provide a touch- and/or force-sensitive display. The display 1505 is operably coupled to the processing unit 1510 of the electronic device 1500.

The display 1505 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 1505 is positioned beneath and viewable through a cover sheet that forms at least a portion of an enclosure of the electronic device 1500.

In various embodiments, the input devices 1530 may include any suitable components for detecting inputs. Examples of input devices 1530 include audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1530 may be configured to detect one or more particular types of input and provide a signal (e.g., an input signal) corresponding to the detected input. The signal may be provided, for example, to the processing unit 111.

As discussed above, in some cases, the input device(s) 1530 include a touch sensor (e.g., a capacitive touch sensor) integrated with the display 1505 to provide a touch-sensitive display. Similarly, in some cases, the input device(s) 1530 include a force sensor (e.g., a capacitive force sensor) integrated with the display 1505 to provide a force-sensitive display.

In some cases, the input devices 1530 include set of one or more electrodes. An electrode may be a conductive portion of the device 1500 that contacts or is configured to be in contact with a user. The electrodes may be disposed on one or more exterior surfaces of the device 1500, including a surface of an input device 1530 (e.g., a crown), a device enclosure, and the like. The processing unit 1510 may monitor for voltages or signals received on at least one of the electrodes. In some embodiments, one of the electrodes may be permanently or switchably coupled to a device ground. The electrodes may be used to provide an electrocardiogram (ECG) function for the device 1500. For example, a 2-lead ECG function may be provided when a user of the device 1500 contacts first and second electrodes that receive signals from the user. As another example, a 3-lead ECG function may be provided when a user of the device 1500 contacts first and second electrodes that receive signals from the user, and a third electrode that grounds the user to the device 1500. In both the 2-lead and 3-lead ECG embodiments, the user may press the first electrode against a first part of their body and press the second electrode against a second part of their body. The third electrode may be pressed against the first or second body part, depending on where it is located on the device 1500. In some cases, an enclosure of the device 1500 may function as an electrode. In some cases, input devices, such as buttons, crowns, and the like, may function as an electrode.

The output devices 1532 may include any suitable components for providing outputs. Examples of output devices 1532 include audio output devices (e.g., speakers), visual output devices (e.g., lights or displays), tactile output devices (e.g., haptic output devices), communication devices (e.g., wired or wireless communication devices), and so on, or some combination thereof. Each output device 1532 may be configured to receive one or more signals (e.g., an output signal provided by the processing unit 1510) and provide an output corresponding to the signal.

In some cases, input devices 1530 and output devices 1532 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1510 may be operably coupled to the input devices 1530 and the output devices 1532. The processing unit 1510 may be adapted to exchange signals with the input devices 1530 and the output devices 1532. For example, the processing unit 1510 may receive an input signal from an input device 1530 that corresponds to an input detected by the input device 1530. The processing unit 1510 may interpret the received input signal to determine whether to provide and/or change one or more outputs in response to the input signal. The processing unit 1510 may then send an output signal to one or more of the output devices 1532, to provide and/or change outputs as appropriate.

As described above, one aspect of the present technology is the gathering and use of data available from various sources to provide variable frictional feedback, electrocardiograms, and the like. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide electrocardiograms to the user and/or variable frictional feedback that is tailored to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of variable frictional feedback and electrocardiograms or other biometrics, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, variable frictional feedback may be provided based on non-personal information data or a bare minimum amount of personal information, such as events or states at the device associated with a user, other non-personal information, or publicly available information.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A head mounted device configured to be mounted to a head of a user, the head mounted device comprising:
   an enclosure;
   a band coupled to the enclosure and configured to secure the head mounted device to a user;
   a dial positioned along a side of the enclosure and configured to receive a rotational input, the dial comprising:
     a dial body; and
     a shaft extending from the dial body and extending into an interior volume of the enclosure;
   a rotation sensor configured to detect the rotational input;
   a variable resistance mechanism operably coupled to the dial and configured to produce a rotational resistance of the dial that varies as the dial rotates due to the rotational input; and
   a display coupled to the enclosure and configured to display a graphical output to the user, the graphical output responsive to the rotational input received by the dial.

2. The head mounted device of claim 1, wherein:
   the variable resistance mechanism comprises:
     a friction element positioned configured to contact the shaft; and
     an actuator configured to vary a force of the friction element on the shaft, thereby varying the rotational resistance.

3. The head mounted device of claim 2, wherein:
   the shaft defines an end surface and an outer peripheral surface; and
   the friction element is positioned along the outer peripheral surface of the shaft and is configured to contact the outer peripheral surface of the shaft.

4. The head mounted device of claim 3, wherein the friction element at least partially surrounds the outer peripheral surface of the shaft.

5. The head mounted device of claim 1, wherein:
   the variable resistance mechanism is configured to alternately increase and decrease the rotational resistance in accordance with at least one of:
     a predetermined number of times per complete rotation of the dial; or
     at predetermined intervals of time.

6. The head mounted device of claim 1, wherein:
   the rotational input is a first rotational input;
   the dial is further configured to receive a second rotational input;
   the head mounted device further includes a speaker configured to produce an audible output; and
   the audible output is responsive to the second rotational input.

7. The head mounted device of claim 6, wherein the variable resistance mechanism is further configured to produce the rotational resistance to the dial as the dial rotates due to the second rotational input.

8. The head mounted device of claim 1, wherein the head mounted device is a head-mounted virtual reality device.

9. A head mounted device comprising:
   an enclosure;
   a headband coupled to the enclosure;
   a display coupled to the enclosure and configured to display a graphical output;
   a speaker coupled to the enclosure and configured to produce an audible output;
   a dial coupled to the enclosure and configured to receive a rotational input and comprising:
     a body positioned along an exterior side of the enclosure; and
     a shaft assembly extending into the enclosure; and
   a variable resistance mechanism comprising a friction element configured to contact the shaft assembly with a varying force, thereby varying a resistive torque of the dial during the rotational input;
   wherein at least one of the audible output or the graphical output is responsive to the rotational input.

10. The head mounted device of claim 9, wherein the variable resistance mechanism further comprises an actuator configured to vary a force with which the friction element is applied to the shaft assembly during the rotational input.

11. The head mounted device of claim 10, wherein:
    the shaft assembly defines:
      an end surface positioned within the enclosure; and
      an outer peripheral surface positioned within the enclosure; and
    the friction element at least partially surrounds the outer peripheral surface of the shaft assembly and is configured to contact the outer peripheral surface of the shaft assembly.

12. The head mounted device of claim 11, wherein:
    the friction element is a first friction element; and
    the variable resistance mechanism further comprises a second friction element that at least partially surrounds the outer peripheral surface of the shaft assembly and is configured to contact the outer peripheral surface of the shaft assembly.

13. The head mounted device of claim 9, wherein the head mounted device is a head-mounted virtual reality device.

14. The head mounted device of claim 13, wherein:
    the graphical output comprises a first graphical element and a second graphical element;
    in a first state, the first graphical element is selected;
    in a second state, the second graphical element is selected;
    the rotational input causes a transition from the first state to the second state; and
    the resistive torque is varied during the transition from the first state to the second state.

15. The head mounted device of claim 9, wherein the friction element is a polymer member.

16. A virtual reality device comprising:
an enclosure;
a display coupled to the enclosure;
a headband extending from a first side of the enclosure to a second side of the enclosure, the headband configured to position the display in front of a wearer's eyes when the virtual reality device is being worn;
a dial positioned along an exterior side of the enclosure and configured to receive a rotational input and a translational input;
a rotation sensor configured to detect the rotational input;
a translation sensor configured to detect the translational input;
a variable resistance mechanism operably coupled to the dial and configured to produce a rotational resistance of the dial; and
a processing unit operably coupled to the display, the rotation sensor, and the variable resistance mechanism and configured to:
cause the display to change a graphical output in response to the rotational input; and
cause the variable resistance mechanism to vary the rotational resistance of the dial as the dial rotates due to the rotational input.

17. The virtual reality device of claim 16, wherein varying the rotational resistance comprises varying the rotational resistance according to a cyclic pattern.

18. The virtual reality device of claim 16, wherein:
the dial comprises:
a dial body; and
a shaft extending from the dial body and extending into the enclosure, the shaft defining an end surface and an outer peripheral surface; and
the variable resistance mechanism comprises a friction element at least partially surrounding the outer peripheral surface of the shaft and configured to contact the outer peripheral surface of the shaft to vary the rotational resistance of the dial.

19. The virtual reality device of claim 16, wherein:
the graphical output includes a first graphical element and a second graphical element; in a first state, the first graphical element is selected;
in a second state, the second graphical element is selected;
the rotational input causes a transition from the first state to the second state; and
the rotational resistance is varied during the transition from the first state to the second state.

20. The virtual reality device of claim 16, wherein varying the rotational resistance comprises varying the rotational resistance based on an angular position of the dial.

* * * * *